(12) United States Patent
Ghazaleh

(10) Patent No.: US 11,042,549 B2
(45) Date of Patent: Jun. 22, 2021

(54) DATABASE SERVER EMBEDDED PROCESS AND CODE ACCELERATOR

(71) Applicant: SAS Institute Inc., Cary, NC (US)

(72) Inventor: David Abu Ghazaleh, Cary, NC (US)

(73) Assignee: SAS Institute Inc., Cary, NC (US)

( * ) Notice: Subject to any disclaimer, the term of this patent is extended or adjusted under 35 U.S.C. 154(b) by 0 days.

(21) Appl. No.: 16/567,799

(22) Filed: Sep. 11, 2019

(65) Prior Publication Data

US 2020/0327130 A1 Oct. 15, 2020

Related U.S. Application Data

(60) Provisional application No. 62/832,848, filed on Apr. 11, 2019.

(51) Int. Cl.
*G06F 16/2455* (2019.01)
*G06F 16/23* (2019.01)
(Continued)

(52) U.S. Cl.
CPC .... *G06F 16/24554* (2019.01); *G06F 16/2308* (2019.01); *G06F 16/2448* (2019.01); *G06F 16/24532* (2019.01)

(58) Field of Classification Search
CPC .......... G06F 16/24554; G06F 16/2448; G06F 16/2308; G06F 16/24532
See application file for complete search history.

(56) References Cited

U.S. PATENT DOCUMENTS 9,128,991 B2 9/2015 Shamlin et al.
2005/0188364 A1* 8/2005 Cockx .................... G06F 8/456
717/159
(Continued)

OTHER PUBLICATIONS

Ghazaleh, D., "Exploring SAS Embedded Process Technologies on Hadoop", Proceedings of the SAS Global Forum 2016 Conference, SAS5060-2016, Jan. 1, 2016, pp. 1-17, SAS.
(Continued)

*Primary Examiner* — Ashish Thomas
*Assistant Examiner* — Dustin D Eyers
(74) *Attorney, Agent, or Firm* — Coats + Bennett, PLLC

(57) ABSTRACT

A computing system receives a program. The program is in a first computer language and specifies computer operations on stored data. The computing system is configured to partition the stored data into sets of partitioned data for performing parallel execution on each of the sets of partitioned data. The computing system determines whether the program comprises a thread program component. The computing system, responsive to determining that the program comprises a thread program component, generates computer-generated computer instructions. The computer-generated computer instructions are in a second computer language. The computer-generated computer instructions are dependent on whether the thread program component specifies information for partitioning and grouping the stored data; whether the program comprises a data program component; or whether the data program component specifies information for partitioning and grouping the output data of the thread program component. The computing system executes the program according to the computer-generated computer instructions.

38 Claims, 35 Drawing Sheets

(51) Int. Cl.
*G06F 16/242* (2019.01)
*G06F 16/2453* (2019.01)

(56) References Cited

U.S. PATENT DOCUMENTS

| | | | | |
|---|---|---|---|---|
| 2011/0093837 A1* | 4/2011 | Guenthner | ................ | G06F 8/45 |
| | | | | 717/149 |
| 2013/0166601 A1* | 6/2013 | Chrapko | ................ | G06Q 10/00 |
| | | | | 707/798 |
| 2014/0279074 A1* | 9/2014 | Chen | ................ | G06Q 30/0201 |
| | | | | 705/14.73 |
| 2016/0098472 A1* | 4/2016 | Appleton | ................ | G06F 16/27 |
| | | | | 707/737 |

OTHER PUBLICATIONS

Secosky, J. et al., "Parallel Data Preparation with the DS2 Programming Language", Proceedings of the SAS Global Forum 2014 Conference, SAS329-2014, Jan. 1, 2014, pp. 1-11, SAS.

Ray, R. et al., "Data Analysis with User-Written DS2 Packages", Proceedings of the SAS Global Forum 2016 conference, SAS6462-2016, Jan. 1, 2016, pp. 1-11, SAS.

Apache Spark, "Spark Configuration", pp. 1-20, retrieved on Jul. 23, 2019, retrieved from internet: https://spark.apache.org/docs/latest/configuration.html.

\* cited by examiner

| Thread Program Component? 1810 | Thread BY Statement? 1812 | Data Program Component? 1814 | Data BY Statement? 1816 |
| --- | --- | --- | --- |
| Yes 1820 | Yes 1822 | Yes 1824 | Yes 1826 |

```
proc ds2 ds2accel=yes;
  thread work.thread1 / overwrite=yes;
    dcl double count;
    dcl double averagemsrp;
    dcl double totalmsrp;
    keep make type averagemsrp;

method run();                                    1830
      set hive.cars;
      by make type;

if first.type then do;
        count=0;
        totalmsrp=0;                                 1832
      end;

count+1;
      totalmsrp+msrp;

if last.type and count > 0 then do;
        averagemsrp = totalmsrp / count;
        output;
      end;
    end;
  endthread;

data hive.carsmsrpout (overwrite=yes);
    dcl thread work.thread1 p;
    method run();                                    1834
      set from p;
      by make;
      output;                                        1836
    end;
  enddata;
run; quit;
proc print data=hive.carsmsrpout; run;
```

```
proc ds2 ds2accel=yes;
   thread work.workthread / overwrite=yes;
      method run();
         set hive.cars;
         output;
      end;
   endthread;

data hive.dgcarsout (overwrite=yes);
      dcl thread work.workthread m;
      method run();
         set from m;
         output;
      end;
   enddata;
run; quit;
```

*FIG. 19C*

```
proc ds2 ds2accel=yes;
   thread work.workthread / overwrite=yes;
      method run();
         set hive.cars;
         output;
      end;
   endthread;
run;
```

```
   data hive.dgcarsout (overwrite=yes);
      dcl thread work.workthread m;
      dcl double count;
      keep count make model;
      method run();
         set from m;
         count+1;
         output;
      end;
   enddata;
run; quit;
```

*FIG. 20C*

```
proc ds2 ds2accel=yes;
   thread work.workthread / overwrite=yes;
      method run();
         set hive.cars;
         output;
      end;
   endthread;
run;
```
— 2192

```
data hive.dgcarsout (overwrite=yes);
   dcl thread work.workthread m;
   dcl double count;
   keep count make model;
   method run();
      set from m;
      by make model;
      count+1;
      output;
   end;
enddata;
run; quit;
```
— 2196
— 2194
— 2198

```
proc ds2 ds2accel=yes;
  thread work.thread1 / overwrite=yes;
    dcl double count;
    dcl double averagemsrp;
    dcl double totalmsrp;
    keep make type averagemsrp;

method run();
      set hive.cars;
      by make type;

if first.type then do;
        count=0;
        totalmsrp=0;
      end;

count+1;
      totalmsrp+msrp;

if last.type and count > 0 then do;
        averagemsrp = totalmsrp / count;
        output;
      end;
    end;
  endthread;

data hive.carsmsrpout (overwrite=yes);
  dcl thread work.thread1 p;
  method run();
    set from p;
    output;
  end;
enddata;
run; quit;
```

FIG. 22C

```
proc ds2 ds2accel=yes;
   thread work.thread1 / overwrite=yes;
      dcl double count;
      dcl double averagemsrp;
      dcl double totalmsrp;
      keep make type averagemsrp;

method run();
         set hive.cars;
         by make type;

if first.type then do;
            count=0;
            totalmsrp=0;
         end;

count+1;
         totalmsrp+msrp;

if last.type and count > 0 then do;
            averagemsrp = totalmsrp / count;
            output;
         end;
      end;
   endthread;

data hive.carsmsrpout (overwrite=yes);
      dcl thread work.thread1 p;
      dcl int i;
      method run();
         set from p;
         i+1;
         output;
      end;
   enddata;
run; quit;
```

*FIG. 23C*

DATABASE SERVER EMBEDDED PROCESS AND CODE ACCELERATOR

RELATED APPLICATIONS

This application claims the benefit of U.S. Provisional Application No. 62/832,848, filed Apr. 11, 2019, the disclosure of which is incorporated herein by reference in their entirety.

SUMMARY

In an example embodiment, a computer-program product tangibly embodied in a non-transitory machine-readable storage medium is provided. The computer-program product includes instructions to cause a computing system to receive, at a server of the computing system, a program. The program is in a first computer language and specifies computer operations on stored data. The computing system is configured to partition the stored data into multiple sets of partitioned data for performing parallel execution of one or more of the computer operations on each of the multiple sets of partitioned data. The computer-program product includes instructions to cause a computing system to determine whether the program comprises a thread program component. Thread operations of the thread program component comprise computer instructions for execution in parallel of the one or more of the computer operations on each of the multiple sets of partitioned data. The computer-program product includes instructions to cause a computing system, responsive to determining that the program comprises a thread program component, to generate, at the server, computer-generated computer instructions. The computer-generated computer instructions are in a second computer language different than the first computer language and are for executing the one or more of the computer operations in parallel. The computer-generated computer instructions are dependent on one or more of: whether the thread program component specifies data key information for partitioning and grouping the stored data using a first key indicated by the data key information; whether the program comprises a data program component comprising data program instructions for operations capable of execution in parallel on output data that is output from execution of the thread program component; and whether the data program component specifies output key information for partitioning and grouping the output data of the thread program component using a second key indicated by the output key information. The computer-program product includes instructions to cause a computing system to execute, by the server, the program according to the computer-generated computer instructions.

In another example embodiment, a computing system is provided. The computing system includes, but is not limited to, a processor and memory. The memory contains instructions that when executed by the processor control the computing system to receive a program, and to execute the program according to computer-generated computer instructions.

In another example embodiment, a method of receiving a program and executing the program according to computer-generated computer instructions is provided.

Other features and aspects of example embodiments are presented below in the Detailed Description when read in connection with the drawings presented with this application.

BRIEF DESCRIPTION OF THE DRAWINGS

FIG. 18 illustrates an example program and program indicators in at least one embodiment of the present technology.

FIG. 19C illustrates a received program in at least one embodiment of the present technology.

FIG. 20C illustrates a received program in at least one embodiment of the present technology.

FIG. 21C illustrates a received program in at least one embodiment of the present technology.

FIG. 22C illustrates a received program in at least one embodiment of the present technology.

FIG. 23C illustrates a received program in at least one embodiment of the present technology.

DETAILED DESCRIPTION

In the following description, for the purposes of explanation, specific details are set forth in order to provide a thorough understanding of embodiments of the technology. However, it will be apparent that various embodiments may be practiced without these specific details. The figures and description are not intended to be restrictive.

The ensuing description provides example embodiments only, and is not intended to limit the scope, applicability, or configuration of the disclosure. Rather, the ensuing description of the example embodiments will provide those skilled in the art with an enabling description for implementing an example embodiment. It should be understood that various changes may be made in the function and arrangement of elements without departing from the spirit and scope of the technology as set forth in the appended claims.

Specific details are given in the following description to provide a thorough understanding of the embodiments. However, it will be understood by one of ordinary skill in the art that the embodiments may be practiced without these specific details. For example, circuits, systems, networks, processes, and other components may be shown as components in block diagram form in order not to obscure the embodiments in unnecessary detail. In other instances, well-known circuits, processes, algorithms, structures, and techniques may be shown without unnecessary detail in order to avoid obscuring the embodiments.

Also, it is noted that individual embodiments may be described as a process which is depicted as a flowchart, a flow diagram, a data flow diagram, a structure diagram, or a block diagram. Although a flowchart may describe the operations as a sequential process, many of the operations can be performed in parallel or concurrently. In addition, the order of the operations may be re-arranged. A process is terminated when its operations are completed, but could have additional operations not included in a figure. A process may correspond to a method, a function, a procedure, a subroutine, a subprogram, etc. When a process corresponds to a function, its termination can correspond to a return of the function to the calling function or the main function.

Systems depicted in some of the figures may be provided in various configurations. In some embodiments, the systems may be configured as a distributed system where one or more components of the system are distributed across one or more networks in a cloud computing system.

Figure 1:
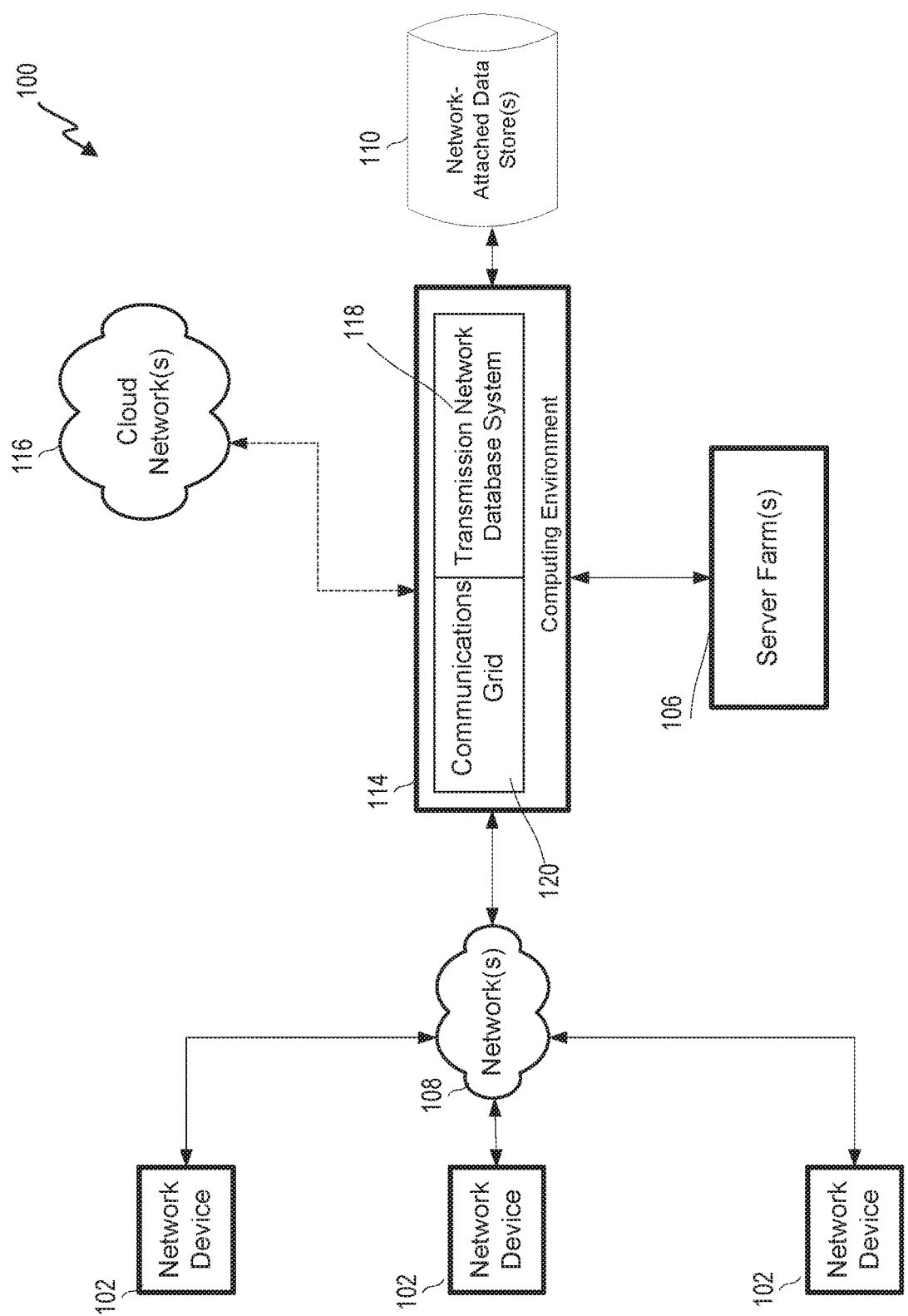
FIG. 1 illustrates a block diagram that provides an illustration of the hardware components of a computing system, according to at least one embodiment of the present technology.

FIG. 1 is a block diagram that provides an illustration of the hardware components of a data transmission network 100, according to embodiments of the present technology. Data transmission network 100 is a specialized computer system that may be used for processing large amounts of data where a large number of computer processing cycles are required.

Data transmission network 100 may also include computing environment 114. Computing environment 114 may be a specialized computer or other machine that processes the data received within the data transmission network 100. Data transmission network 100 also includes one or more network devices 102. Network devices 102 may include client devices that attempt to communicate with computing environment 114. For example, network devices 102 may send data to the computing environment 114 to be processed, may send signals to the computing environment 114 to control different aspects of the computing environment or the data it is processing, among other reasons. Network devices 102 may interact with the computing environment 114 through a number of ways, such as, for example, over one or more networks 108. As shown in FIG. 1, computing environment 114 may include one or more other systems. For example, computing environment 114 may include a database system 118 and/or a communications grid 120.

Figure 8:
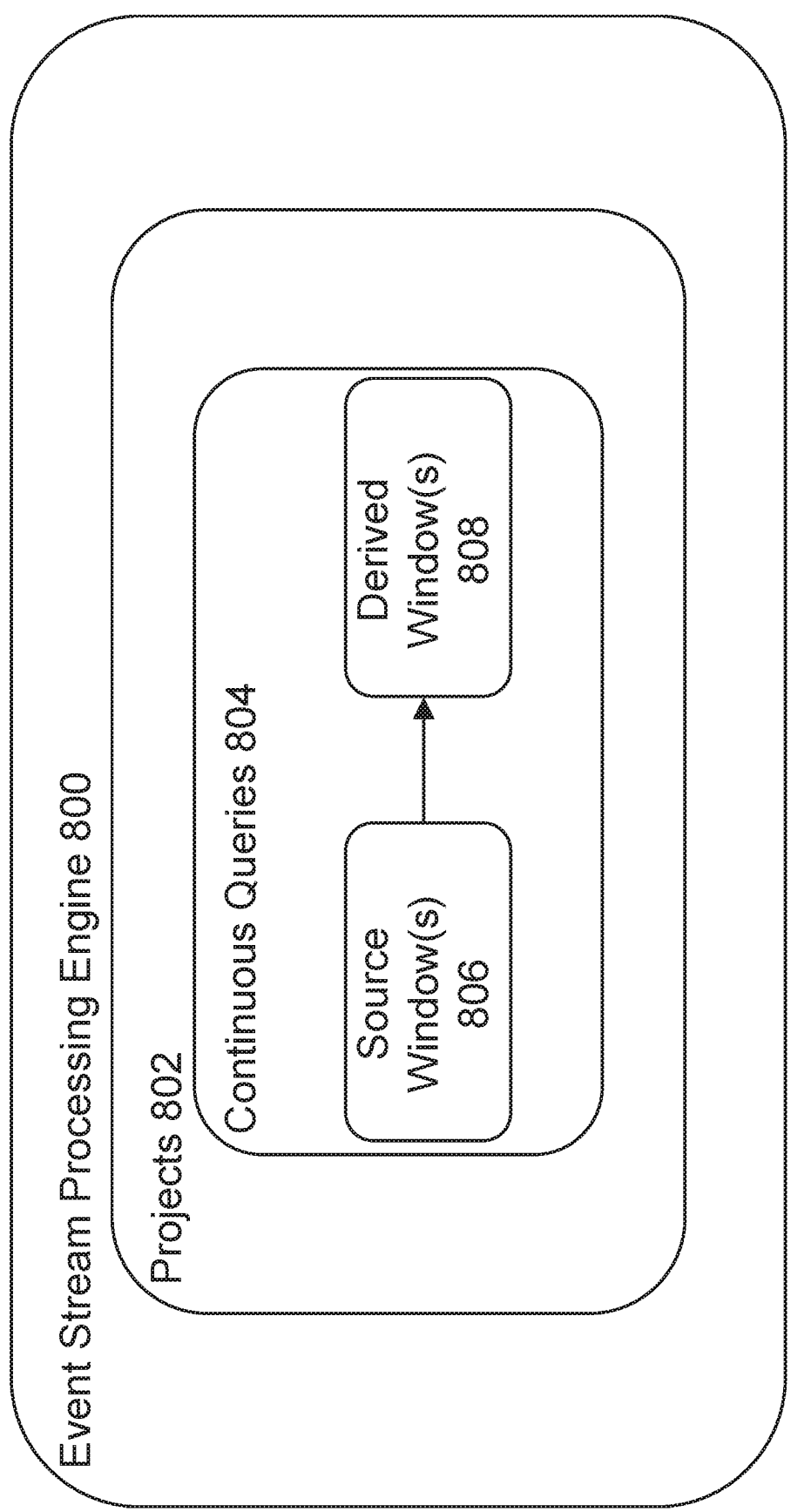
FIG. 8 illustrates a block diagram including components of an Event Stream Processing Engine (ESPE), according to at least one embodiment of the present technology.
Figure 9:
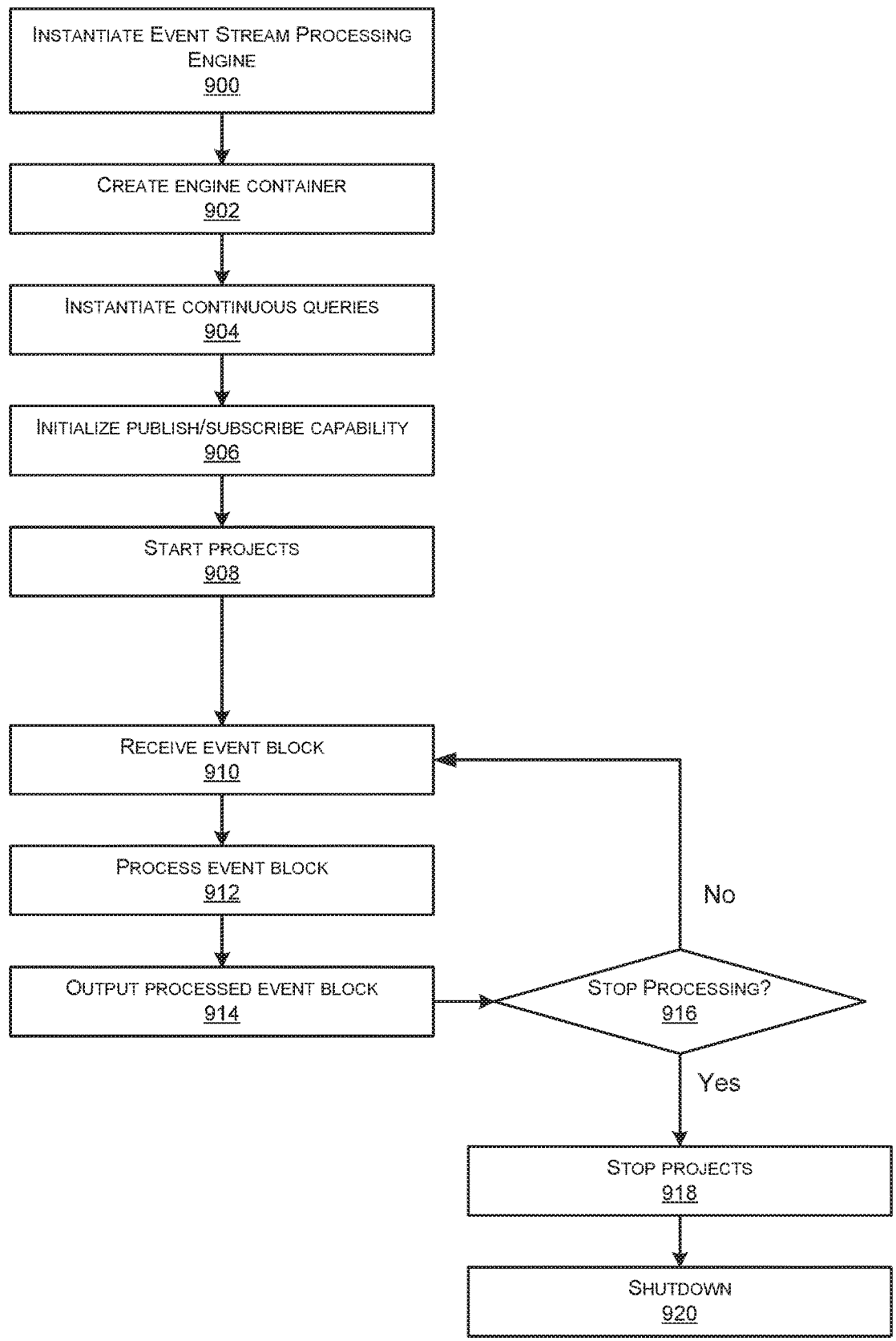
FIG. 9 illustrates a flow chart showing an example process including operations performed by an event stream processing engine, according to at least one embodiment of the present technology.
Figure 10:
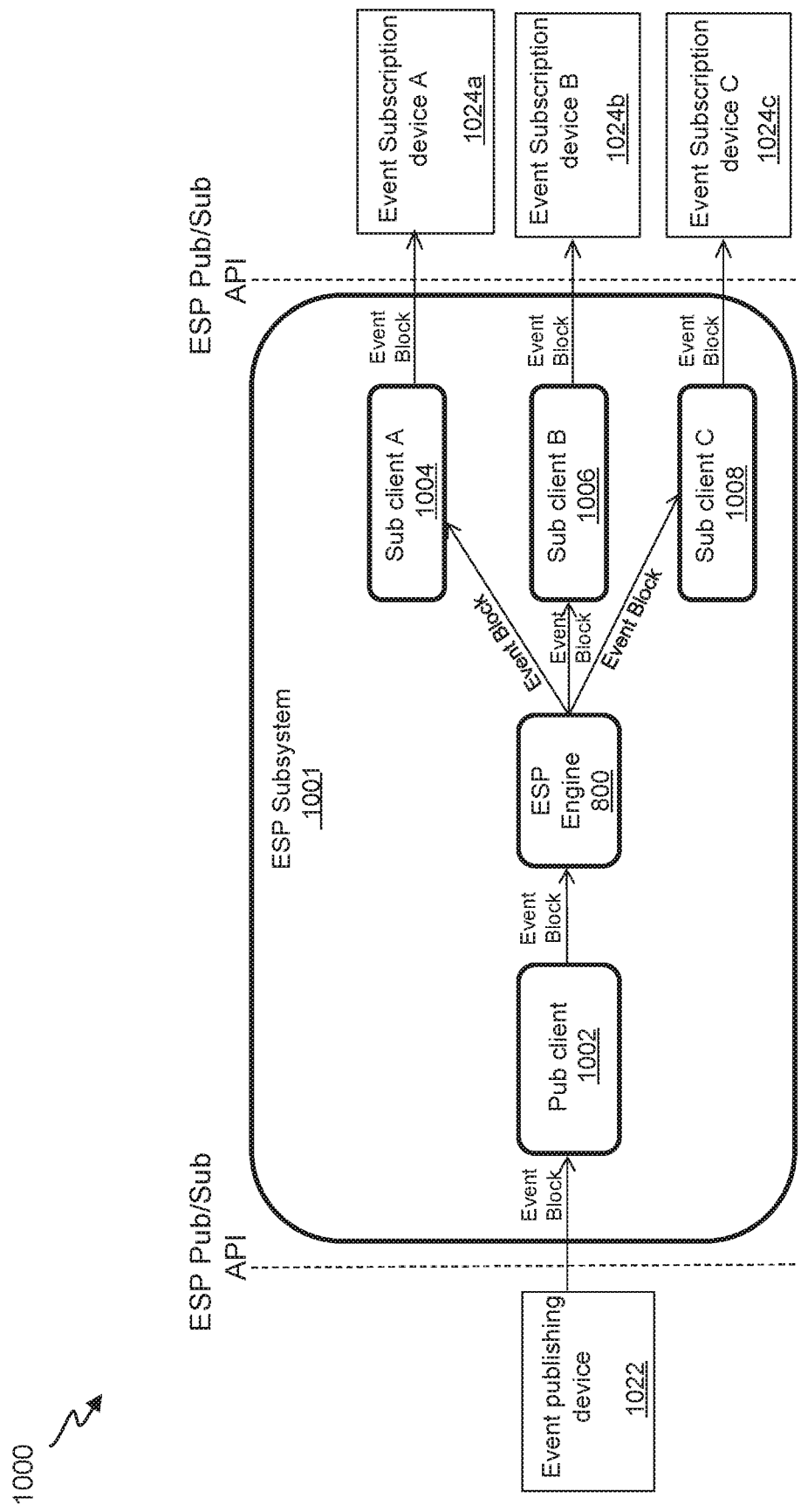
FIG. 10 illustrates an ESP system interfacing between a publishing device and multiple event subscribing devices, according to at least one embodiment of the present technology.

In other embodiments, network devices may provide a large amount of data, either all at once or streaming over a period of time (e.g., using event stream processing (ESP), described further with respect to FIGS. 8-10), to the computing environment 114 via networks 108. For example, network devices 102 may include network computers, sensors, databases, or other devices that may transmit or otherwise provide data to computing environment 114. For example, network devices may include local area network devices, such as routers, hubs, switches, or other computer networking devices. These devices may provide a variety of stored or generated data, such as network data or data specific to the network devices themselves. Network devices may also include sensors that monitor their environment or other devices to collect data regarding that environment or those devices, and such network devices may provide data they collect over time. Network devices may also include devices within the internet of things, such as devices within a home automation network. Some of these devices may be referred to as edge devices, and may involve edge computing circuitry. Data may be transmitted by network devices directly to computing environment 114 or to network-attached data stores, such as network-attached data stores 110 for storage so that the data may be retrieved later by the computing environment 114 or other portions of data transmission network 100.

Data transmission network 100 may also include one or more network-attached data stores 110. Network-attached data stores 110 are used to store data to be processed by the computing environment 114 as well as any intermediate or final data generated by the computing system in non-volatile memory. However in certain embodiments, the configuration of the computing environment 114 allows its operations to be performed such that intermediate and final data results can be stored solely in volatile memory (e.g., RAM), without a requirement that intermediate or final data results be stored to non-volatile types of memory (e.g., disk). This can be useful in certain situations, such as when the computing environment 114 receives ad hoc queries from a user and when responses, which are generated by processing large amounts of data, need to be generated on-the-fly. In this non-limiting situation, the computing environment 114 may be configured to retain the processed information within memory so that responses can be generated for the user at different levels of detail as well as allow a user to interactively query against this information.

Network-attached data stores may store a variety of different types of data organized in a variety of different ways and from a variety of different sources. For example, network-attached data storage may include storage other than primary storage located within computing environment 114 that is directly accessible by processors located therein. Network-attached data storage may include secondary, tertiary or auxiliary storage, such as large hard drives, servers, virtual memory, among other types. Storage devices may include portable or non-portable storage devices, optical storage devices, and various other mediums capable of storing, containing data. A machine-readable storage medium or computer-readable storage medium may include a non-transitory medium in which data can be stored and that does not include carrier waves and/or transitory electronic signals. Examples of a non-transitory medium may include, for example, a magnetic disk or tape, optical storage media such as compact disk or digital versatile disk, flash memory, memory or memory devices. A computer-program product may include code and/or machine-executable instructions that may represent a procedure, a function, a subprogram, a program, a routine, a subroutine, a module, a software package, a class, or any combination of instructions, data structures, or program statements. A code segment may be coupled to another code segment or a hardware circuit by passing and/or receiving information, data, arguments, parameters, or memory contents. Information, arguments, parameters, data, etc. may be passed, forwarded, or transmitted via any suitable means including memory sharing, message passing, token passing, network transmission, among others. Furthermore, the data stores may hold a variety of different types of data. For example, network-attached data stores 110 may hold unstructured (e.g., raw) data, such as manufacturing data (e.g., a database containing records identifying products being manufactured with parameter data for each product, such as colors and models) or product sales databases (e.g., a database containing individual data records identifying details of individual product sales).

The unstructured data may be presented to the computing environment 114 in different forms such as a flat file or a conglomerate of data records, and may have data values and accompanying time stamps. The computing environment 114 may be used to analyze the unstructured data in a variety of ways to determine the best way to structure (e.g., hierarchically) that data, such that the structured data is tailored to a type of further analysis that a user wishes to perform on the data. For example, after being processed, the unstructured time stamped data may be aggregated by time (e.g., into daily time period units) to generate time series data and/or structured hierarchically according to one or more dimensions (e.g., parameters, attributes, and/or variables). For example, data may be stored in a hierarchical data structure, such as a ROLAP OR MOLAP database, or may be stored in another tabular form, such as in a flat-hierarchy form.

Data transmission network 100 may also include one or more server farms 106. Computing environment 114 may route select communications or data to the one or more sever farms 106 or one or more servers within the server farms. Server farms 106 can be configured to provide information in a predetermined manner. For example, server farms 106 may access data to transmit in response to a communication. Server farms 106 may be separately housed from each other device within data transmission network 100, such as computing environment 114, and/or may be part of a device or system.

Server farms 106 may host a variety of different types of data processing as part of data transmission network 100. Server farms 106 may receive a variety of different data from network devices, from computing environment 114, from cloud network 116, or from other sources. The data may have been obtained or collected from one or more sensors, as inputs from a control database, or may have been received as inputs from an external system or device. Server farms 106 may assist in processing the data by turning raw data into processed data based on one or more rules implemented by the server farms. For example, sensor data may be analyzed to determine changes in an environment over time or in real-time.

Data transmission network 100 may also include one or more cloud networks 116. Cloud network 116 may include a cloud infrastructure system that provides cloud services. In certain embodiments, services provided by the cloud network 116 may include a host of services that are made available to users of the cloud infrastructure system on demand. Cloud network 116 is shown in FIG. 1 as being connected to computing environment 114 (and therefore having computing environment 114 as its client or user), but cloud network 116 may be connected to or utilized by any of the devices in FIG. 1. Services provided by the cloud network can dynamically scale to meet the needs of its users. The cloud network 116 may include one or more computers, servers, and/or systems. In some embodiments, the computers, servers, and/or systems that make up the cloud network 116 are different from the user's own on-premises computers, servers, and/or systems. For example, the cloud network 116 may host an application, and a user may, via a communication network such as the Internet, on demand, order and use the application.

While each device, server and system in FIG. 1 is shown as a single device, it will be appreciated that multiple devices may instead be used. For example, a set of network devices can be used to transmit various communications from a single user, or remote server 140 may include a server stack. As another example, data may be processed as part of computing environment 114.

Each communication within data transmission network 100 (e.g., between client devices, between a device and connection management system 150, between servers 106 and computing environment 114 or between a server and a device) may occur over one or more networks 108. Networks 108 may include one or more of a variety of different types of networks, including a wireless network, a wired network, or a combination of a wired and wireless network. Examples of suitable networks include the Internet, a personal area network, a local area network (LAN), a wide area network (WAN), or a wireless local area network (WLAN). A wireless network may include a wireless interface or combination of wireless interfaces. As an example, a network in the one or more networks 108 may include a short-range communication channel, such as a Bluetooth or a Bluetooth Low Energy channel. A wired network may include a wired interface. The wired and/or wireless networks may be implemented using routers, access points, bridges, gateways, or the like, to connect devices in the network 114, as will be further described with respect to FIG. 2. The one or more networks 108 can be incorporated entirely within or can include an intranet, an extranet, or a combination thereof. In one embodiment, communications between two or more systems and/or devices can be achieved by a secure communications protocol, such as secure sockets layer (SSL) or transport layer security (TLS). In addition, data and/or transactional details may be encrypted.

Some aspects may utilize the Internet of Things (IoT), where things (e.g., machines, devices, phones, sensors) can be connected to networks and the data from these things can be collected and processed within the things and/or external to the things. For example, the IoT can include sensors in many different devices, and high value analytics can be applied to identify hidden relationships and drive increased efficiencies. This can apply to both big data analytics and real-time (e.g., ESP) analytics. IoT may be implemented in various areas, such as for access (technologies that get data and move it), embed-ability (devices with embedded sensors), and services. Industries in the IoT space may automotive (connected car), manufacturing (connected factory), smart cities, energy and retail. This will be described further below with respect to FIG. 2.

As noted, computing environment 114 may include a communications grid 120 and a transmission network database system 118. Communications grid 120 may be a grid-based computing system for processing large amounts of data. The transmission network database system 118 may be for managing, storing, and retrieving large amounts of data that are distributed to and stored in the one or more network-attached data stores 110 or other data stores that reside at different locations within the transmission network database system 118. The compute nodes in the grid-based computing system 120 and the transmission network database system 118 may share the same processor hardware, such as processors that are located within computing environment 114.

Figure 2:
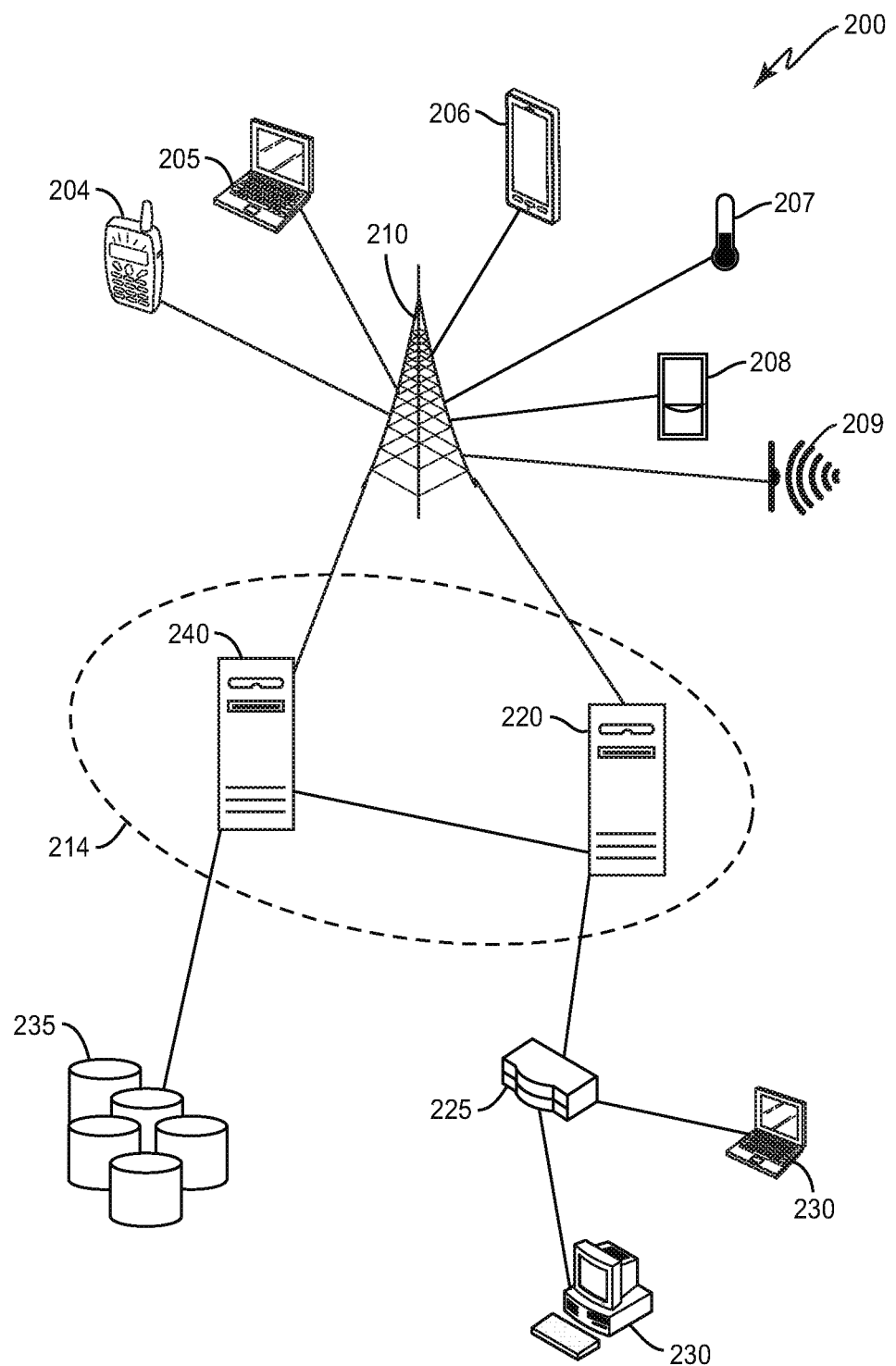
FIG. 2 illustrates an example network including an example set of devices communicating with each other over an exchange system and via a network, according to at least one embodiment of the present technology.

FIG. 2 illustrates an example network including an example set of devices communicating with each other over an exchange system and via a network, according to embodiments of the present technology. As noted, each communication within data transmission network 100 may occur over one or more networks. System 200 includes a network device 204 configured to communicate with a variety of types of client devices, for example client devices 230, over a variety of types of communication channels.

As shown in FIG. 2, network device 204 can transmit a communication over a network (e.g., a cellular network via a base station 210). The communication can be routed to another network device, such as network devices 205-209, via base station 210. The communication can also be routed to computing environment 214 via base station 210. For example, network device 204 may collect data either from its surrounding environment or from other network devices (such as network devices 205-209) and transmit that data to computing environment 214.

Although network devices 204-209 are shown in FIG. 2 as a mobile phone, laptop computer, tablet computer, temperature sensor, motion sensor, and audio sensor respectively, the network devices may be or include sensors that are sensitive to detecting aspects of their environment. For example, the network devices may include sensors such as water sensors, power sensors, electrical current sensors, chemical sensors, optical sensors, pressure sensors, geographic or position sensors (e.g., GPS), velocity sensors, acceleration sensors, flow rate sensors, among others. Examples of characteristics that may be sensed include force, torque, load, strain, position, temperature, air pressure, fluid flow, chemical properties, resistance, electromagnetic fields, radiation, irradiance, proximity, acoustics, moisture, distance, speed, vibrations, acceleration, electrical potential, electrical current, among others. The sensors may be mounted to various components used as part of a variety of different types of systems (e.g., an oil drilling operation). The network devices may detect and record data related to the environment that it monitors, and transmit that data to computing environment 214.

As noted, one type of system that may include various sensors that collect data to be processed and/or transmitted to a computing environment according to certain embodiments includes an oil drilling system. For example, the one or more drilling operation sensors may include surface sensors that measure a hook load, a fluid rate, a temperature and a density in and out of the wellbore, a standpipe pressure, a surface torque, a rotation speed of a drill pipe, a rate of penetration, a mechanical specific energy, etc. and downhole sensors that measure a rotation speed of a bit, fluid densities, downhole torque, downhole vibration (axial, tangential, lateral), a weight applied at a drill bit, an annular pressure, a differential pressure, an azimuth, an inclination, a dog leg severity, a measured depth, a vertical depth, a downhole temperature, etc. Besides the raw data collected directly by the sensors, other data may include parameters either developed by the sensors or assigned to the system by a client or other controlling device. For example, one or more drilling operation control parameters may control settings such as a mud motor speed to flow ratio, a bit diameter, a predicted formation top, seismic data, weather data, etc. Other data may be generated using physical models such as an earth model, a weather model, a seismic model, a bottom hole assembly model, a well plan model, an annular friction model, etc. In addition to sensor and control settings, predicted outputs, of for example, the rate of penetration, mechanical specific energy, hook load, flow in fluid rate, flow out fluid rate, pump pressure, surface torque, rotation speed of the drill pipe, annular pressure, annular friction pressure, annular temperature, equivalent circulating density, etc. may also be stored in the data warehouse.

In another example, another type of system that may include various sensors that collect data to be processed and/or transmitted to a computing environment according to certain embodiments includes a home automation or similar automated network in a different environment, such as an office space, school, public space, sports venue, or a variety of other locations. Network devices in such an automated network may include network devices that allow a user to access, control, and/or configure various home appliances located within the user's home (e.g., a television, radio, light, fan, humidifier, sensor, microwave, iron, and/or the like), or outside of the user's home (e.g., exterior motion sensors, exterior lighting, garage door openers, sprinkler systems, or the like). For example, network device 102 may include a home automation switch that may be coupled with a home appliance. In another embodiment, a network device can allow a user to access, control, and/or configure devices, such as office-related devices (e.g., copy machine, printer, or fax machine), audio and/or video related devices (e.g., a receiver, a speaker, a projector, a DVD player, or a television), media-playback devices (e.g., a compact disc player, a CD player, or the like), computing devices (e.g., a home computer, a laptop computer, a tablet, a personal digital assistant (PDA), a computing device, or a wearable device), lighting devices (e.g., a lamp or recessed lighting), devices associated with a security system, devices associated with an alarm system, devices that can be operated in an automobile (e.g., radio devices, navigation devices), and/or the like. Data may be collected from such various sensors in raw form, or data may be processed by the sensors to create parameters or other data either developed by the sensors based on the raw data or assigned to the system by a client or other controlling device.

In another example, another type of system that may include various sensors that collect data to be processed and/or transmitted to a computing environment according to certain embodiments includes a power or energy grid. A variety of different network devices may be included in an energy grid, such as various devices within one or more power plants, energy farms (e.g., wind farm, solar farm, among others) energy storage facilities, factories, homes and businesses of consumers, among others. One or more of such devices may include one or more sensors that detect energy gain or loss, electrical input or output or loss, and a variety of other efficiencies. These sensors may collect data to inform users of how the energy grid, and individual devices within the grid, may be functioning and how they may be made more efficient.

Network device sensors may also perform processing on data it collects before transmitting the data to the computing environment 114, or before deciding whether to transmit data to the computing environment 114. For example, network devices may determine whether data collected meets certain rules, for example by comparing data or values calculated from the data and comparing that data to one or more thresholds. The network device may use this data and/or comparisons to determine if the data should be transmitted to the computing environment 214 for further use or processing.

Computing environment 214 may include machines 220 and 240. Although computing environment 214 is shown in FIG. 2 as having two machines, 220 and 240, computing environment 214 may have only one machine or may have more than two machines. The machines that make up computing environment 214 may include specialized computers, servers, or other machines that are configured to individually and/or collectively process large amounts of data. The computing environment 214 may also include storage devices that include one or more databases of structured data, such as data organized in one or more hierarchies, or unstructured data. The databases may communicate with the processing devices within computing environment 214 to distribute data to them. Since network devices may transmit data to computing environment 214, that data may be received by the computing environment 214 and subsequently stored within those storage devices. Data used by computing environment 214 may also be stored in data stores 235, which may also be a part of or connected to computing environment 214.

Computing environment 214 can communicate with various devices via one or more routers 225 or other inter-network or intra-network connection components. For example, computing environment 214 may communicate with devices 230 via one or more routers 225. Computing environment 214 may collect, analyze and/or store data from or pertaining to communications, client device operations, client rules, and/or user-associated actions stored at one or more data stores 235. Such data may influence communication routing to the devices within computing environment 214, how data is stored or processed within computing environment 214, among other actions.

Notably, various other devices can further be used to influence communication routing and/or processing between devices within computing environment 214 and with devices outside of computing environment 214. For example, as shown in FIG. 2, computing environment 214 may include a web server 240. Thus, computing environment 214 can retrieve data of interest, such as client information (e.g., product information, client rules, etc.), technical product details, news, current or predicted weather, and so on.

In addition to computing environment 214 collecting data (e.g., as received from network devices, such as sensors, and client devices or other sources) to be processed as part of a big data analytics project, it may also receive data in real time as part of a streaming analytics environment. As noted, data may be collected using a variety of sources as communicated via different kinds of networks or locally. Such data may be received on a real-time streaming basis. For example, network devices may receive data periodically from network device sensors as the sensors continuously sense, monitor and track changes in their environments. Devices within computing environment 214 may also perform pre-analysis on data it receives to determine if the data received should be processed as part of an ongoing project. The data received and collected by computing environment 214, no matter what the source or method or timing of receipt, may be processed over a period of time for a client to determine results data based on the client's needs and rules.

Figure 3:
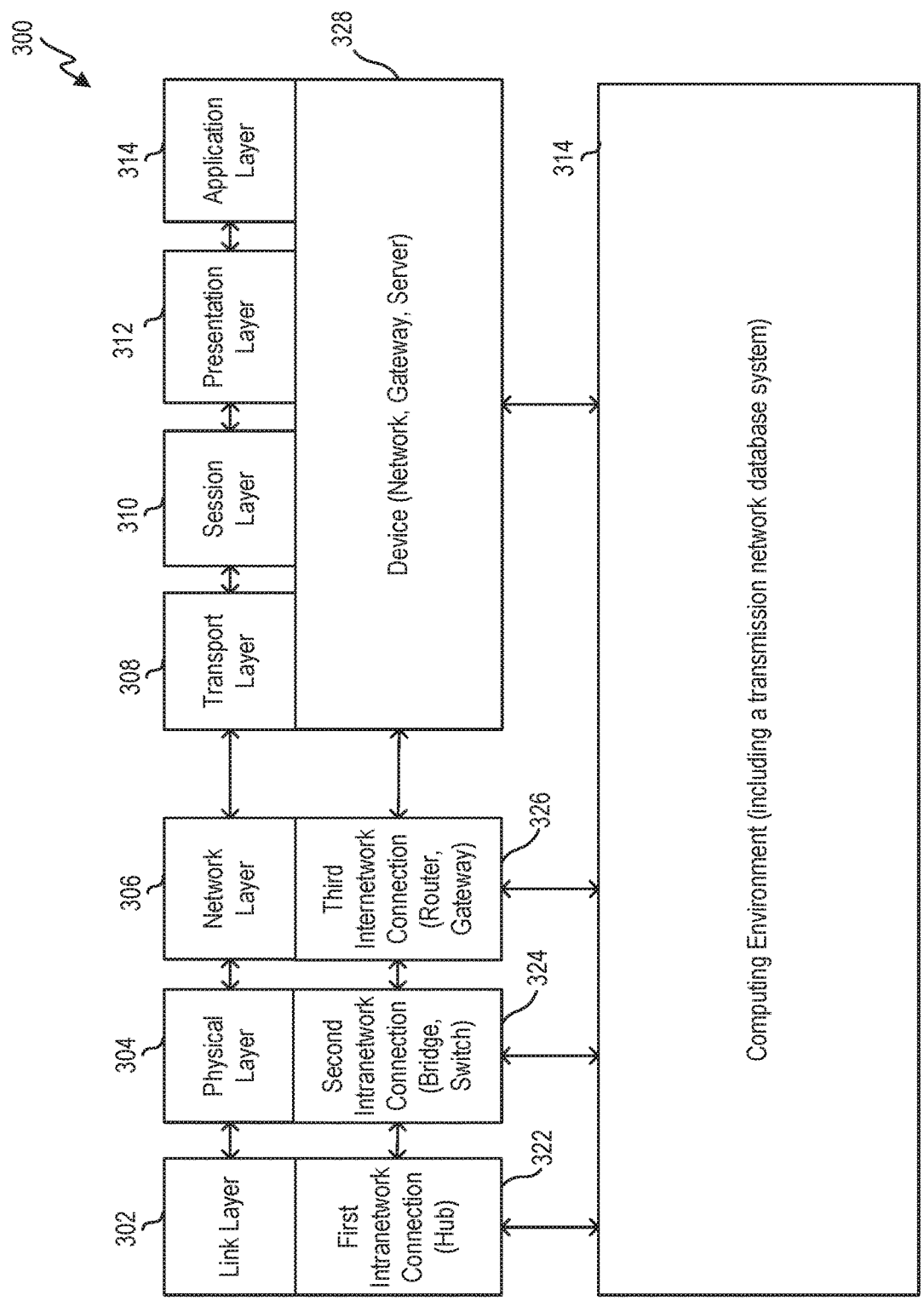
FIG. 3 illustrates a representation of a conceptual model of a communications protocol system, according to at least one embodiment of the present technology.

FIG. 3 illustrates a representation of a conceptual model of a communications protocol system, according to embodiments of the present technology. More specifically, FIG. 3 identifies operation of a computing environment in an Open Systems Interaction model that corresponds to various connection components. The model 300 shows, for example, how a computing environment, such as computing environment 314 (or computing environment 214 in FIG. 2) may communicate with other devices in its network, and control how communications between the computing environment and other devices are executed and under what conditions.

The model can include layers 302-314. The layers are arranged in a stack. Each layer in the stack serves the layer one level higher than it (except for the application layer, which is the highest layer), and is served by the layer one level below it (except for the physical layer, which is the lowest layer). The physical layer is the lowest layer because it receives and transmits raw bites of data, and is the farthest layer from the user in a communications system. On the other hand, the application layer is the highest layer because it interacts directly with a software application.

As noted, the model includes a physical layer 302. Physical layer 302 represents physical communication, and can define parameters of that physical communication. For example, such physical communication may come in the form of electrical, optical, or electromagnetic signals. Physical layer 302 also defines protocols that may control communications within a data transmission network.

Link layer 304 defines links and mechanisms used to transmit (i.e., move) data across a network. The link layer manages node-to-node communications, such as within a grid computing environment. Link layer 304 can detect and correct errors (e.g., transmission errors in the physical layer 302). Link layer 304 can also include a media access control (MAC) layer and logical link control (LLC) layer.

Network layer 306 defines the protocol for routing within a network. In other words, the network layer coordinates transferring data across nodes in a same network (e.g., such as a grid computing environment). Network layer 306 can also define the processes used to structure local addressing within the network.

Transport layer 308 can manage the transmission of data and the quality of the transmission and/or receipt of that data. Transport layer 308 can provide a protocol for transferring data, such as, for example, a Transmission Control Protocol (TCP). Transport layer 308 can assemble and disassemble data frames for transmission. The transport layer can also detect transmission errors occurring in the layers below it.

Session layer 310 can establish, maintain, and manage communication connections between devices on a network. In other words, the session layer controls the dialogues or nature of communications between network devices on the network. The session layer may also establish checkpointing, adjournment, termination, and restart procedures.

Presentation layer 312 can provide translation for communications between the application and network layers. In other words, this layer may encrypt, decrypt and/or format data based on data types known to be accepted by an application or network layer.

Application layer 314 interacts directly with software applications and end users, and manages communications between them. Application layer 314 can identify destinations, local resource states or availability and/or communication content or formatting using the applications.

Intra-network connection components 322 and 324 are shown to operate in lower levels, such as physical layer 302 and link layer 304, respectively. For example, a hub can operate in the physical layer, a switch can operate in the physical layer, and a router can operate in the network layer. Inter-network connection components 326 and 328 are shown to operate on higher levels, such as layers 306-314. For example, routers can operate in the network layer and network devices can operate in the transport, session, presentation, and application layers.

As noted, a computing environment 314 can interact with and/or operate on, in various embodiments, one, more, all or any of the various layers. For example, computing environment 314 can interact with a hub (e.g., via the link layer) so as to adjust which devices the hub communicates with. The physical layer may be served by the link layer, so it may implement such data from the link layer. For example, the computing environment 314 may control which devices it will receive data from. For example, if the computing environment 314 knows that a certain network device has turned off, broken, or otherwise become unavailable or unreliable, the computing environment 314 may instruct the hub to prevent any data from being transmitted to the computing environment 314 from that network device. Such a process may be beneficial to avoid receiving data that is inaccurate or that has been influenced by an uncontrolled environment. As another example, computing environment 314 can communicate with a bridge, switch, router or gateway and influence which device within the system (e.g., system 200) the component selects as a destination. In some embodiments, computing environment 314 can interact with various layers by exchanging communications with equipment operating on a particular layer by routing or modifying existing communications. In another embodiment, such as in a grid computing environment, a node may determine how data within the environment should be routed (e.g., which node should receive certain data) based on certain parameters or information provided by other layers within the model.

As noted, the computing environment 314 may be a part of a communications grid environment, the communications of which may be implemented as shown in the protocol of FIG. 3. For example, referring back to FIG. 2, one or more of machines 220 and 240 may be part of a communications grid computing environment. A gridded computing environment may be employed in a distributed system with non-interactive workloads where data resides in memory on the machines, or compute nodes. In such an environment, analytic code, instead of a database management system, controls the processing performed by the nodes. Data is co-located by pre-distributing it to the grid nodes, and the analytic code on each node loads the local data into memory. Each node may be assigned a particular task such as a portion of a processing project, or to organize or control other nodes within the grid.

Figure 4:
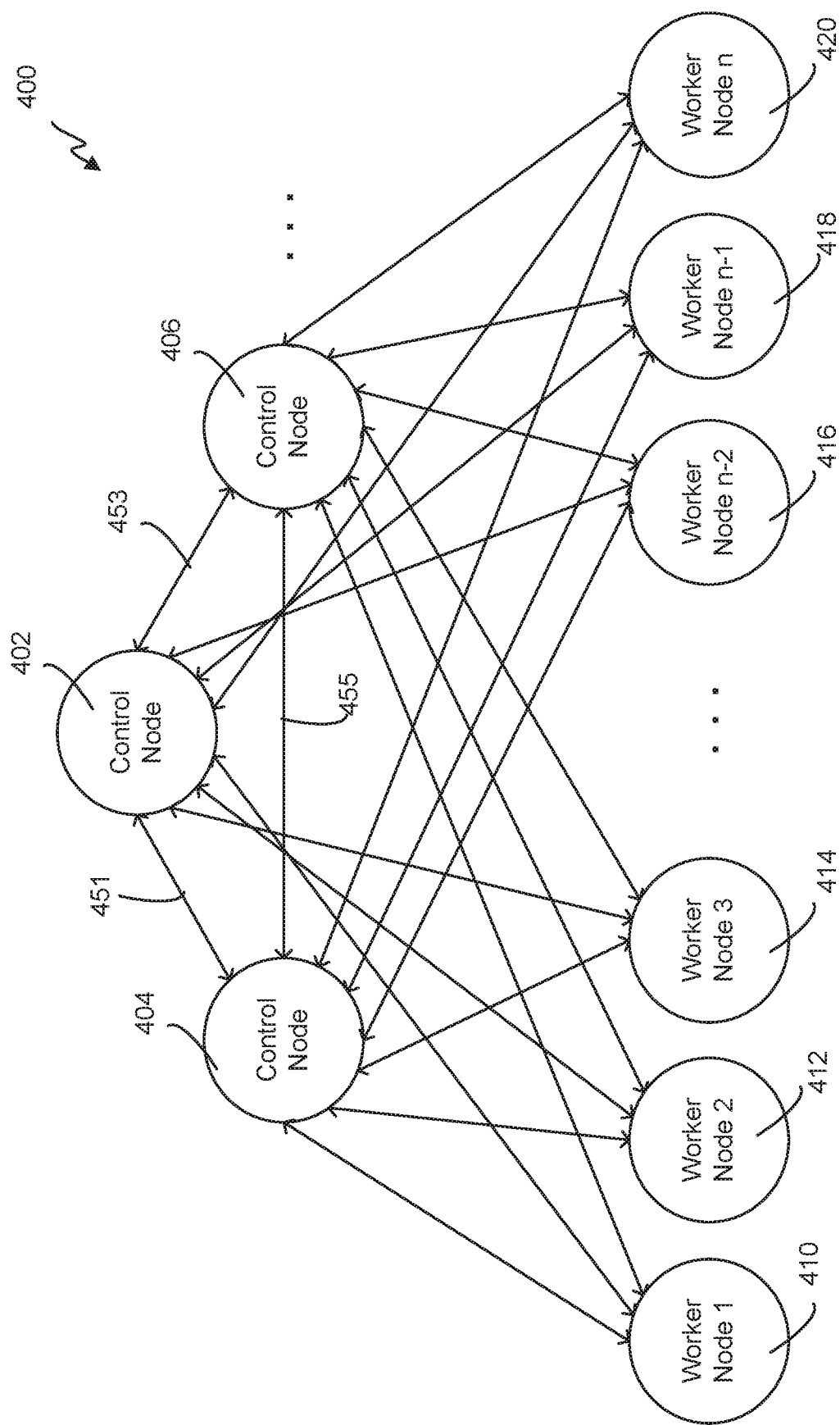
FIG. 4 illustrates a communications grid computing system including a variety of control and worker nodes, according to at least one embodiment of the present technology.

FIG. 4 illustrates a communications grid computing system 400 including a variety of control and worker nodes, according to embodiments of the present technology. Communications grid computing system 400 includes three control nodes and one or more worker nodes. Communications grid computing system 400 includes control nodes 402, 404, and 406. The control nodes are communicatively connected via communication paths 451, 453, and 455. Therefore, the control nodes may transmit information (e.g., related to the communications grid or notifications), to and receive information from each other. Although communications grid computing system 400 is shown in FIG. 4 as including three control nodes, the communications grid may include more or less than three control nodes.

Communications grid computing system (or just "communications grid") 400 also includes one or more worker nodes. Shown in FIG. 4 are six worker nodes 410-420. Although FIG. 4 shows six worker nodes, a communications grid according to embodiments of the present technology may include more or less than six worker nodes. The number of worker nodes included in a communications grid may be dependent upon how large the project or data set is being processed by the communications grid, the capacity of each worker node, the time designated for the communications grid to complete the project, among others. Each worker node within the communications grid 400 may be connected (wired or wirelessly, and directly or indirectly) to control nodes 402-406. Therefore, each worker node may receive information from the control nodes (e.g., an instruction to perform work on a project) and may transmit information to the control nodes (e.g., a result from work performed on a project). Furthermore, worker nodes may communicate with each other (either directly or indirectly). For example, worker nodes may transmit data between each other related to a job being performed or an individual task within a job being performed by that worker node. However, in certain embodiments, worker nodes may not, for example, be connected (communicatively or otherwise) to certain other worker nodes. In an embodiment, worker nodes may only be able to communicate with the control node that controls it, and may not be able to communicate with other worker nodes in the communications grid, whether they are other worker nodes controlled by the control node that controls the worker node, or worker nodes that are controlled by other control nodes in the communications grid.

A control node may connect with an external device with which the control node may communicate (e.g., a grid user, such as a server or computer, may connect to a controller of the grid). For example, a server or computer may connect to control nodes and may transmit a project or job to the node. The project may include a data set. The data set may be of any size. Once the control node receives such a project including a large data set, the control node may distribute the data set or projects related to the data set to be performed by worker nodes. Alternatively, for a project including a large data set, the data set may be receive or stored by a machine other than a control node (e.g., a Hadoop data node).

Control nodes may maintain knowledge of the status of the nodes in the grid (i.e., grid status information), accept work requests from clients, subdivide the work across worker nodes, coordinate the worker nodes, among other responsibilities. Worker nodes may accept work requests from a control node and provide the control node with results of the work performed by the worker node. A grid may be started from a single node (e.g., a machine, computer, server, etc.). This first node may be assigned or may start as the primary control node that will control any additional nodes that enter the grid.

When a project is submitted for execution (e.g., by a client or a controller of the grid) it may be assigned to a set of nodes. After the nodes are assigned to a project, a data structure (i.e., a communicator) may be created. The communicator may be used by the project for information to be shared between the project code running on each node. A communication handle may be created on each node. A handle, for example, is a reference to the communicator that is valid within a single process on a single node, and the handle may be used when requesting communications between nodes.

A control node, such as control node 402, may be designated as the primary control node. A server, computer or other external device may connect to the primary control node. Once the control node receives a project, the primary control node may distribute portions of the project to its worker nodes for execution. For example, when a project is initiated on communications grid 400, primary control node 402 controls the work to be performed for the project in order to complete the project as requested or instructed. The primary control node may distribute work to the worker nodes based on various factors, such as which subsets or portions of projects may be completed most efficiently and in the correct amount of time. For example, a worker node may perform analysis on a portion of data that is already local (e.g., stored on) the worker node. The primary control node also coordinates and processes the results of the work performed by each worker node after each worker node executes and completes its job. For example, the primary control node may receive a result from one or more worker nodes, and the control node may organize (e.g., collect and assemble) the results received and compile them to produce a complete result for the project received from the end user.

Any remaining control nodes, such as control nodes 404 and 406, may be assigned as backup control nodes for the project. In an embodiment, backup control nodes may not control any portion of the project. Instead, backup control nodes may serve as a backup for the primary control node and take over as primary control node if the primary control node were to fail. If a communications grid were to include only a single control node, and the control node were to fail (e.g., the control node is shut off or breaks) then the communications grid as a whole may fail and any project or job being run on the communications grid may fail and may not complete. While the project may be run again, such a failure may cause a delay (severe delay in some cases, such as overnight delay) in completion of the project. Therefore, a grid with multiple control nodes, including a backup control node, may be beneficial.

To add another node or machine to the grid, the primary control node may open a pair of listening sockets, for example. A socket may be used to accept work requests from clients, and the second socket may be used to accept connections from other grid nodes). The primary control node may be provided with a list of other nodes (e.g., other machines, computers, servers) that will participate in the grid, and the role that each node will fill in the grid. Upon startup of the primary control node (e.g., the first node on the grid), the primary control node may use a network protocol to start the server process on every other node in the grid. Command line parameters, for example, may inform each node of one or more pieces of information, such as: the role that the node will have in the grid, the host name of the primary control node, the port number on which the primary control node is accepting connections from peer nodes, among others. The information may also be provided in a configuration file, transmitted over a secure shell tunnel, recovered from a configuration server, among others. While the other machines in the grid may not initially know about the configuration of the grid, that information may also be sent to each other node by the primary control node. Updates of the grid information may also be subsequently sent to those nodes.

For any control node other than the primary control node added to the grid, the control node may open three sockets. The first socket may accept work requests from clients, the second socket may accept connections from other grid members, and the third socket may connect (e.g., permanently) to the primary control node. When a control node (e.g., primary control node) receives a connection from another control node, it first checks to see if the peer node is in the list of configured nodes in the grid. If it is not on the list, the control node may clear the connection. If it is on the list, it may then attempt to authenticate the connection. If authentication is successful, the authenticating node may transmit information to its peer, such as the port number on which a node is listening for connections, the host name of the node, information about how to authenticate the node, among other information. When a node, such as the new control node, receives information about another active node, it will check to see if it already has a connection to that other node. If it does not have a connection to that node, it may then establish a connection to that control node.

Any worker node added to the grid may establish a connection to the primary control node and any other control nodes on the grid. After establishing the connection, it may authenticate itself to the grid (e.g., any control nodes, including both primary and backup, or a server or user controlling the grid). After successful authentication, the worker node may accept configuration information from the control node.

When a node joins a communications grid (e.g., when the node is powered on or connected to an existing node on the grid or both), the node is assigned (e.g., by an operating system of the grid) a universally unique identifier (UUID). This unique identifier may help other nodes and external entities (devices, users, etc.) to identify the node and distinguish it from other nodes. When a node is connected to the grid, the node may share its unique identifier with the other nodes in the grid. Since each node may share its unique identifier, each node may know the unique identifier of every other node on the grid. Unique identifiers may also designate a hierarchy of each of the nodes (e.g., backup control nodes) within the grid. For example, the unique identifiers of each of the backup control nodes may be stored in a list of backup control nodes to indicate an order in which the backup control nodes will take over for a failed primary control node to become a new primary control node. However, a hierarchy of nodes may also be determined using methods other than using the unique identifiers of the nodes. For example, the hierarchy may be predetermined, or may be assigned based on other predetermined factors.

The grid may add new machines at any time (e.g., initiated from any control node). Upon adding a new node to the grid, the control node may first add the new node to its table of grid nodes. The control node may also then notify every other control node about the new node. The nodes receiving the notification may acknowledge that they have updated their configuration information.

Primary control node 402 may, for example, transmit one or more communications to backup control nodes 404 and 406 (and, for example, to other control or worker nodes within the communications grid). Such communications may sent periodically, at fixed time intervals, between known fixed stages of the project's execution, among other protocols. The communications transmitted by primary control node 402 may be of varied types and may include a variety of types of information. For example, primary control node 402 may transmit snapshots (e.g., status information) of the communications grid so that backup control node 404 always has a recent snapshot of the communications grid. The snapshot or grid status may include, for example, the structure of the grid (including, for example, the worker nodes in the grid, unique identifiers of the nodes, or their relationships with the primary control node) and the status of a project (including, for example, the status of each worker node's portion of the project). The snapshot may also include analysis or results received from worker nodes in the communications grid. The backup control nodes may receive and store the backup data received from the primary control node. The backup control nodes may transmit a request for such a snapshot (or other information) from the primary control node, or the primary control node may send such information periodically to the backup control nodes.

As noted, the backup data may allow the backup control node to take over as primary control node if the primary control node fails without requiring the grid to start the project over from scratch. If the primary control node fails, the backup control node that will take over as primary control node may retrieve the most recent version of the snapshot received from the primary control node and use the snapshot to continue the project from the stage of the project indicated by the backup data. This may prevent failure of the project as a whole.

A backup control node may use various methods to determine that the primary control node has failed. In one example of such a method, the primary control node may transmit (e.g., periodically) a communication to the backup control node that indicates that the primary control node is working and has not failed, such as a heartbeat communication. The backup control node may determine that the primary control node has failed if the backup control node has not received a heartbeat communication for a certain predetermined period of time. Alternatively, a backup control node may also receive a communication from the primary control node itself (before it failed) or from a worker node that the primary control node has failed, for example because the primary control node has failed to communicate with the worker node.

Different methods may be performed to determine which backup control node of a set of backup control nodes (e.g., backup control nodes 404 and 406) will take over for failed primary control node 402 and become the new primary control node. For example, the new primary control node may be chosen based on a ranking or "hierarchy" of backup control nodes based on their unique identifiers. In an alternative embodiment, a backup control node may be assigned to be the new primary control node by another device in the communications grid or from an external device (e.g., a system infrastructure or an end user, such as a server or computer, controlling the communications grid). In another alternative embodiment, the backup control node that takes over as the new primary control node may be designated based on bandwidth or other statistics about the communications grid.

A worker node within the communications grid may also fail. If a worker node fails, work being performed by the failed worker node may be redistributed amongst the operational worker nodes. In an alternative embodiment, the primary control node may transmit a communication to each of the operable worker nodes still on the communications grid that each of the worker nodes should purposefully fail also. After each of the worker nodes fail, they may each retrieve their most recent saved checkpoint of their status and re-start the project from that checkpoint to minimize lost progress on the project being executed.

Figure 5:
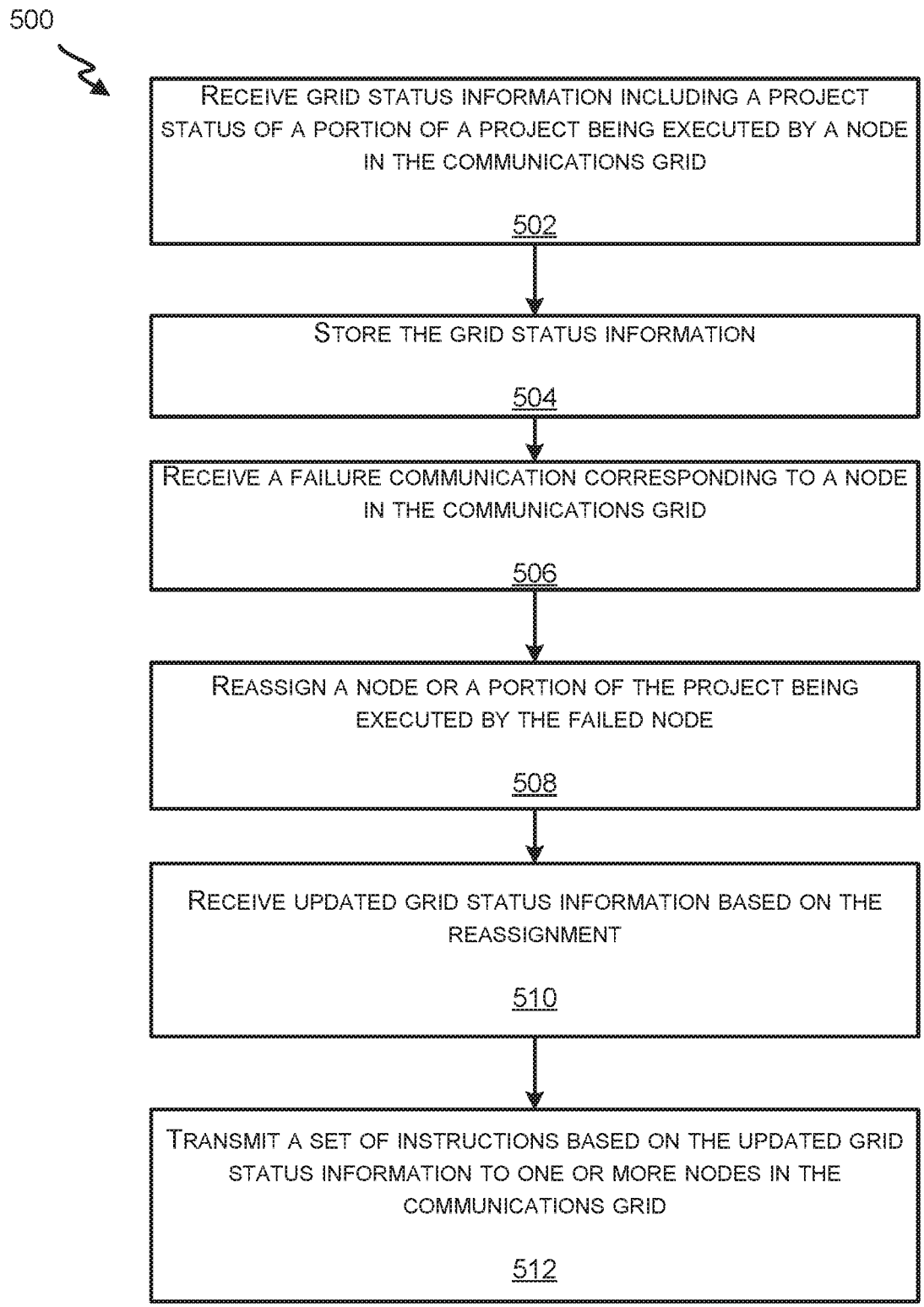
FIG. 5 illustrates a flow chart showing an example process for adjusting a communications grid or a work project in a communications grid after a failure of a node, according to at least one embodiment of the present technology.

FIG. 5 illustrates a flow chart showing an example process for adjusting a communications grid or a work project in a communications grid after a failure of a node, according to embodiments of the present technology. The process may include, for example, receiving grid status information including a project status of a portion of a project being executed by a node in the communications grid, as described in operation 502. For example, a control node (e.g., a backup control node connected to a primary control node and a worker node on a communications grid) may receive grid status information, where the grid status information includes a project status of the primary control node or a project status of the worker node. The project status of the primary control node and the project status of the worker node may include a status of one or more portions of a project being executed by the primary and worker nodes in the communications grid. The process may also include storing the grid status information, as described in operation 504. For example, a control node (e.g., a backup control node) may store the received grid status information locally within the control node. Alternatively, the grid status information may be sent to another device for storage where the control node may have access to the information.

The process may also include receiving a failure communication corresponding to a node in the communications grid in operation 506. For example, a node may receive a failure communication including an indication that the primary control node has failed, prompting a backup control node to take over for the primary control node. In an alternative embodiment, a node may receive a failure that a worker node has failed, prompting a control node to reassign the work being performed by the worker node. The process may also include reassigning a node or a portion of the project being executed by the failed node, as described in operation 508. For example, a control node may designate the backup control node as a new primary control node based on the failure communication upon receiving the failure communication. If the failed node is a worker node, a control node may identify a project status of the failed worker node using the snapshot of the communications grid, where the project status of the failed worker node includes a status of a portion of the project being executed by the failed worker node at the failure time.

The process may also include receiving updated grid status information based on the reassignment, as described in operation 510, and transmitting a set of instructions based on the updated grid status information to one or more nodes in the communications grid, as described in operation 512. The updated grid status information may include an updated project status of the primary control node or an updated project status of the worker node. The updated information may be transmitted to the other nodes in the grid to update their stale stored information.

Figure 6:
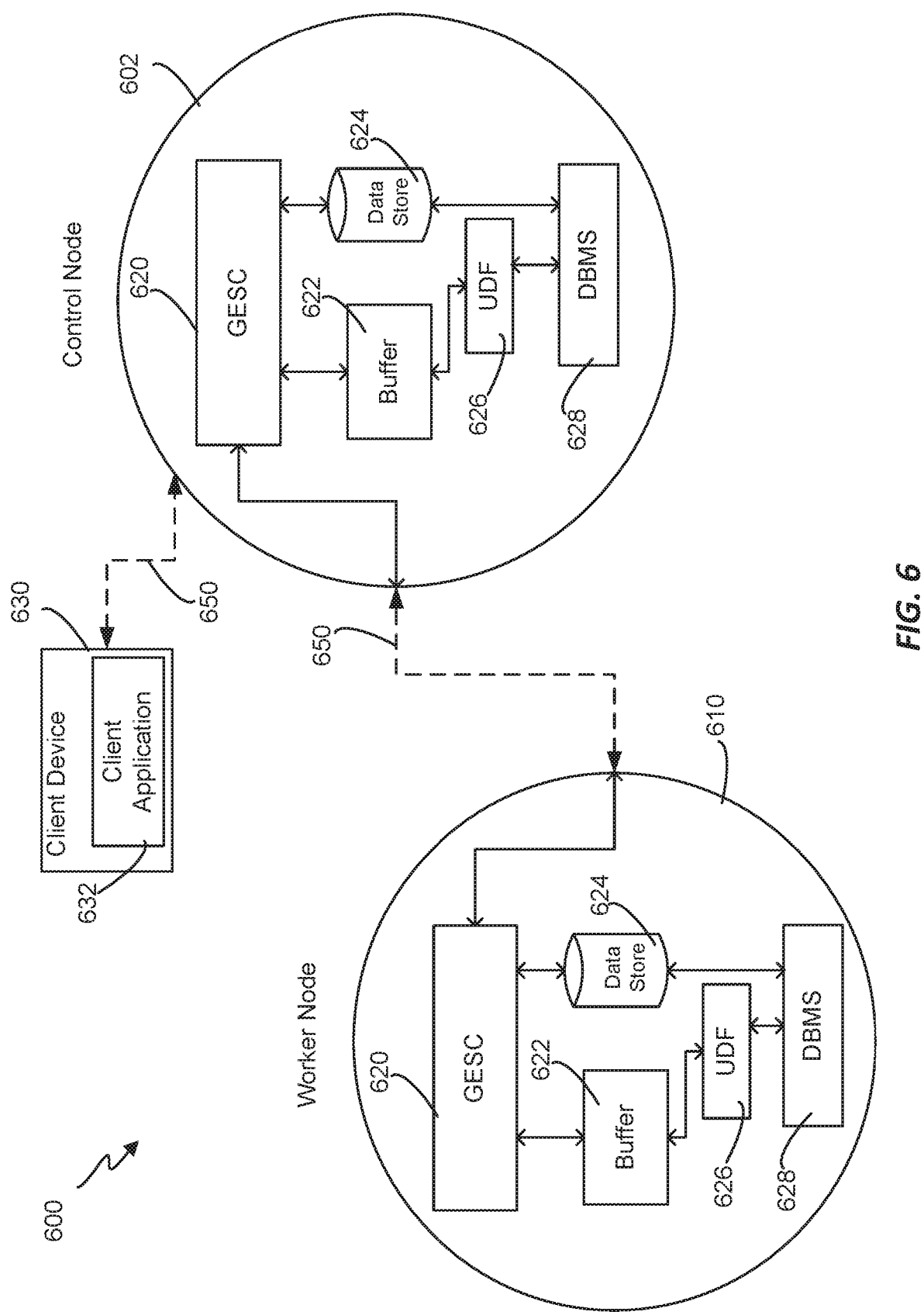
FIG. 6 illustrates a portion of a communications grid computing system including a control node and a worker node, according to at least one embodiment of the present technology.

FIG. 6 illustrates a portion of a communications grid computing system 600 including a control node and a worker node, according to embodiments of the present technology. Communications grid 600 computing system includes one control node (control node 602) and one worker node (worker node 610) for purposes of illustration, but may include more worker and/or control nodes. The control node 602 is communicatively connected to worker node 610 via communication path 650. Therefore, control node 602 may transmit information (e.g., related to the communications grid or notifications), to and receive information from worker node 610 via path 650.

Similar to in FIG. 4, communications grid computing system (or just "communications grid") 600 includes data processing nodes (control node 602 and worker node 610). Nodes 602 and 610 include multi-core data processors. Each node 602 and 610 includes a grid-enabled software component (GESC) 620 that executes on the data processor associated with that node and interfaces with buffer memory 622 also associated with that node. Each node 602 and 610 includes a database management software (DBMS) 628 that executes on a database server (not shown) at control node 602 and on a database server (not shown) at worker node 610.

Each node also includes a data store 624. Data stores 624, similar to network-attached data stores 110 in FIG. 1 and data stores 235 in FIG. 2, are used to store data to be processed by the nodes in the computing environment. Data stores 624 may also store any intermediate or final data generated by the computing system after being processed, for example in non-volatile memory. However in certain embodiments, the configuration of the grid computing environment allows its operations to be performed such that intermediate and final data results can be stored solely in volatile memory (e.g., RAM), without a requirement that intermediate or final data results be stored to non-volatile types of memory. Storing such data in volatile memory may be useful in certain situations, such as when the grid receives queries (e.g., ad hoc) from a client and when responses, which are generated by processing large amounts of data, need to be generated quickly or on-the-fly. In such a situation, the grid may be configured to retain the data within memory so that responses can be generated at different levels of detail and so that a client may interactively query against this information.

Each node also includes a user-defined function (UDF) 626. The UDF provides a mechanism for the DMBS 628 to transfer data to or receive data from the database stored in the data stores 624 that are managed by the DBMS. For example, UDF 626 can be invoked by the DBMS to provide data to the GESC for processing. The UDF 626 may establish a socket connection (not shown) with the GESC to transfer the data. Alternatively, the UDF 626 can transfer data to the GESC by writing data to shared memory accessible by both the UDF and the GESC.

The GESC 620 at the nodes 602 and 620 may be connected via a network, such as network 108 shown in FIG. 1. Therefore, nodes 602 and 620 can communicate with each other via the network using a predetermined communication protocol such as, for example, the Message Passing Interface (MPI). Each GESC 620 can engage in point-to-point communication with the GESC at another node or in collective communication with multiple GESCs via the network. The GESC 620 at each node may contain identical (or nearly identical) software instructions. Each node may be capable of operating as either a control node or a worker node. The GESC at the control node 602 can communicate, over a communication path 652, with a client deice 630. More specifically, control node 602 may communicate with client application 632 hosted by the client device 630 to receive queries and to respond to those queries after processing large amounts of data.

DMBS 628 may control the creation, maintenance, and use of database or data structure (not shown) within a nodes 602 or 610. The database may organize data stored in data stores 624. The DMBS 628 at control node 602 may accept requests for data and transfer the appropriate data for the request. With such a process, collections of data may be distributed across multiple physical locations. In this example, each node 602 and 610 stores a portion of the total data managed by the management system in its associated data store 624.

Furthermore, the DBMS may be responsible for protecting against data loss using replication techniques. Replication includes providing a backup copy of data stored on one node on one or more other nodes. Therefore, if one node fails, the data from the failed node can be recovered from a replicated copy residing at another node. However, as described herein with respect to FIG. 4, data or status information for each node in the communications grid may also be shared with each node on the grid.

Figure 7:
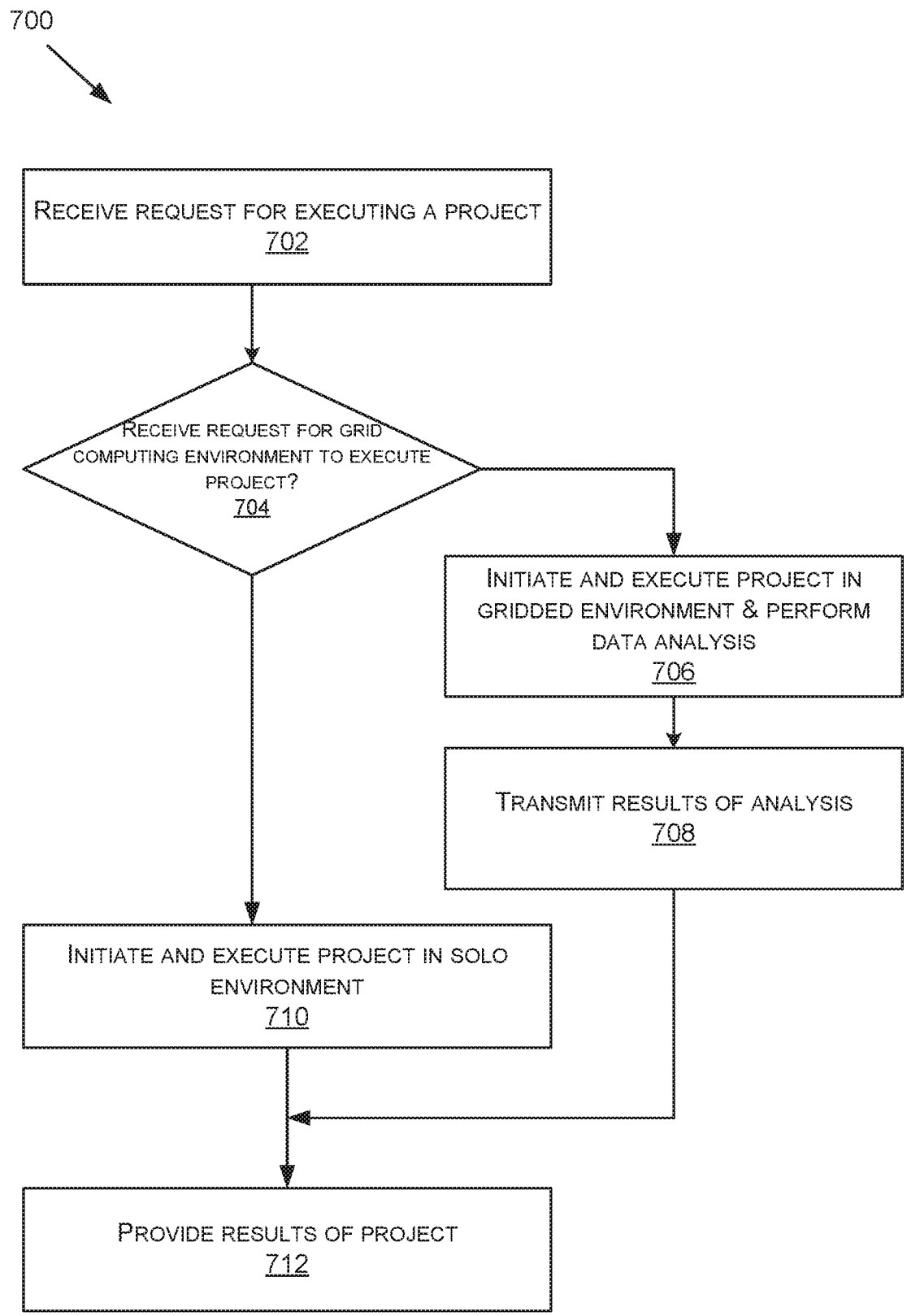
FIG. 7 illustrates a flow chart showing an example process for executing a data analysis or processing project, according to at least one embodiment of the present technology.

FIG. 7 illustrates a flow chart showing an example method for executing a project within a grid computing system, according to embodiments of the present technology. As described with respect to FIG. 6, the GESC at the control node may transmit data with a client device (e.g., client device 630) to receive queries for executing a project and to respond to those queries after large amounts of data have been processed. The query may be transmitted to the control node, where the query may include a request for executing a project, as described in operation 702. The query can contain instructions on the type of data analysis to be performed in the project and whether the project should be executed using the grid-based computing environment, as shown in operation 704.

To initiate the project, the control node may determine if the query requests use of the grid-based computing environment to execute the project. If the determination is no, then the control node initiates execution of the project in a solo environment (e.g., at the control node), as described in operation 710. If the determination is yes, the control node may initiate execution of the project in the grid-based computing environment, as described in operation 706. In such a situation, the request may include a requested configuration of the grid. For example, the request may include a number of control nodes and a number of worker nodes to be used in the grid when executing the project. After the project has been completed, the control node may transmit results of the analysis yielded by the grid, as described in operation 708. Whether the project is executed in a solo or grid-based environment, the control node provides the results of the project.

As noted with respect to FIG. 2, the computing environments described herein may collect data (e.g., as received from network devices, such as sensors, such as network devices 204-209 in FIG. 2, and client devices or other sources) to be processed as part of a data analytics project, and data may be received in real time as part of a streaming analytics environment (e.g., ESP). Data may be collected using a variety of sources as communicated via different kinds of networks or locally, such as on a real-time streaming basis. For example, network devices may receive data periodically from network device sensors as the sensors continuously sense, monitor and track changes in their environments. More specifically, an increasing number of distributed applications develop or produce continuously flowing data from distributed sources by applying queries to the data before distributing the data to geographically distributed recipients. An event stream processing engine (ESPE) may continuously apply the queries to the data as it is received and determines which entities should receive the data. Client or other devices may also subscribe to the ESPE or other devices processing ESP data so that they can receive data after processing, based on for example the entities determined by the processing engine. For example, client devices 230 in FIG. 2 may subscribe to the ESPE in computing environment 214. In another example, event subscription devices 1024a-c, described further with respect to FIG. 10, may also subscribe to the ESPE. The ESPE may determine or define how input data or event streams from network devices or other publishers (e.g., network devices 204-209 in FIG. 2) are transformed into meaningful output data to be consumed by subscribers, such as for example client devices 230 in FIG. 2.

FIG. 8 illustrates a block diagram including components of an Event Stream Processing Engine (ESPE), according to embodiments of the present technology. ESPE 800 may include one or more projects 802. A project may be described as a second-level container in an engine model managed by ESPE 800 where a thread pool size for the project may be defined by a user. Each project of the one or more projects 802 may include one or more continuous queries 804 that contain data flows, which are data transformations of incoming event streams. The one or more continuous queries 804 may include one or more source windows 806 and one or more derived windows 808.

The ESPE may receive streaming data over a period of time related to certain events, such as events or other data sensed by one or more network devices. The ESPE may perform operations associated with processing data created by the one or more devices. For example, the ESPE may receive data from the one or more network devices 204-209 shown in FIG. 2. As noted, the network devices may include sensors that sense different aspects of their environments, and may collect data over time based on those sensed observations. For example, the ESPE may be implemented within one or more of machines 220 and 240 shown in FIG. 2. The ESPE may be implemented within such a machine by an ESP application. An ESP application may embed an ESPE with its own dedicated thread pool or pools into its application space where the main application thread can do application-specific work and the ESPE processes event streams at least by creating an instance of a model into processing objects.

The engine container is the top-level container in a model that manages the resources of the one or more projects 802. In an illustrative embodiment, for example, there may be only one ESPE 800 for each instance of the ESP application, and ESPE 800 may have a unique engine name. Additionally, the one or more projects 802 may each have unique project names, and each query may have a unique continuous query name and begin with a uniquely named source window of the one or more source windows 806. ESPE 800 may or may not be persistent.

Continuous query modeling involves defining directed graphs of windows for event stream manipulation and transformation. A window in the context of event stream manipulation and transformation is a processing node in an event stream processing model. A window in a continuous query can perform aggregations, computations, pattern-matching, and other operations on data flowing through the window. A continuous query may be described as a directed graph of source, relational, pattern matching, and procedural windows. The one or more source windows 806 and the one or more derived windows 808 represent continuously executing queries that generate updates to a query result set as new event blocks stream through ESPE 800. A directed graph, for example, is a set of nodes connected by edges, where the edges have a direction associated with them.

An event object may be described as a packet of data accessible as a collection of fields, with at least one of the fields defined as a key or unique identifier (ID). The event object may be created using a variety of formats including binary, alphanumeric, XML, etc. Each event object may include one or more fields designated as a primary identifier (ID) for the event so ESPE 800 can support operation codes (opcodes) for events including insert, update, upsert, and delete. Upsert opcodes update the event if the key field already exists; otherwise, the event is inserted. For illustration, an event object may be a packed binary representation of a set of field values and include both metadata and field data associated with an event. The metadata may include an opcode indicating if the event represents an insert, update, delete, or upsert, a set of flags indicating if the event is a normal, partial-update, or a retention generated event from retention policy management, and a set of microsecond timestamps that can be used for latency measurements.

An event block object may be described as a grouping or package of event objects. An event stream may be described as a flow of event block objects. A continuous query of the one or more continuous queries 804 transforms a source event stream made up of streaming event block objects published into ESPE 800 into one or more output event streams using the one or more source windows 806 and the one or more derived windows 808. A continuous query can also be thought of as data flow modeling.

The one or more source windows 806 are at the top of the directed graph and have no windows feeding into them. Event streams are published into the one or more source windows 806, and from there, the event streams may be directed to the next set of connected windows as defined by the directed graph. The one or more derived windows 808 are all instantiated windows that are not source windows and that have other windows streaming events into them. The one or more derived windows 808 may perform computations or transformations on the incoming event streams. The one or more derived windows 808 transform event streams based on the window type (that is operators such as join, filter, compute, aggregate, copy, pattern match, procedural, union, etc.) and window settings. As event streams are published into ESPE 800, they are continuously queried, and the resulting sets of derived windows in these queries are continuously updated.

FIG. 9 illustrates a flow chart showing an example process including operations performed by an event stream processing engine, according to some embodiments of the present technology. As noted, the ESPE 800 (or an associated ESP application) defines how input event streams are transformed into meaningful output event streams. More specifically, the ESP application may define how input event streams from publishers (e.g., network devices providing sensed data) are transformed into meaningful output event streams consumed by subscribers (e.g., a data analytics project being executed by a machine or set of machines).

Within the application, a user may interact with one or more user interface windows presented to the user in a display under control of the ESPE independently or through a browser application in an order selectable by the user. For example, a user may execute an ESP application, which causes presentation of a first user interface window, which may include a plurality of menus and selectors such as drop down menus, buttons, text boxes, hyperlinks, etc. associated with the ESP application as understood by a person of skill in the art. As further understood by a person of skill in the art, various operations may be performed in parallel, for example, using a plurality of threads.

At operation 900, an ESP application may define and start an ESPE, thereby instantiating an ESPE at a device, such as machine 220 and/or 240. In an operation 902, the engine container is created. For illustration, ESPE 800 may be instantiated using a function call that specifies the engine container as a manager for the model.

In an operation 904, the one or more continuous queries 804 are instantiated by ESPE 800 as a model. The one or more continuous queries 804 may be instantiated with a dedicated thread pool or pools that generate updates as new events stream through ESPE 800. For illustration, the one or more continuous queries 804 may be created to model business processing logic within ESPE 800, to predict events within ESPE 800, to model a physical system within ESPE 800, to predict the physical system state within ESPE 800, etc. For example, as noted, ESPE 800 may be used to support sensor data monitoring and management (e.g., sensing may include force, torque, load, strain, position, temperature, air pressure, fluid flow, chemical properties, resistance, electromagnetic fields, radiation, irradiance, proximity, acoustics, moisture, distance, speed, vibrations, acceleration, electrical potential, or electrical current, etc.).

ESPE 800 may analyze and process events in motion or "event streams." Instead of storing data and running queries against the stored data, ESPE 800 may store queries and stream data through them to allow continuous analysis of data as it is received. The one or more source windows 806 and the one or more derived windows 808 may be created based on the relational, pattern matching, and procedural algorithms that transform the input event streams into the output event streams to model, simulate, score, test, predict, etc. based on the continuous query model defined and application to the streamed data.

In an operation 906, a publish/subscribe (pub/sub) capability is initialized for ESPE 800. In an illustrative embodiment, a pub/sub capability is initialized for each project of the one or more projects 802. To initialize and enable pub/sub capability for ESPE 800, a port number may be provided. Pub/sub clients can use a host name of an ESP device running the ESPE and the port number to establish pub/sub connections to ESPE 800.

FIG. 10 illustrates an ESP system 1000 interfacing between publishing device 1022 and event subscribing devices 1024*a-c*, according to embodiments of the present technology. ESP system 1000 may include ESP device or subsystem 1001, event publishing device 1022, an event subscribing device A 1024*a*, an event subscribing device B 1024*b*, and an event subscribing device C 1024*c*. Input event streams are output to ESP device 1001 by publishing device 1022. In alternative embodiments, the input event streams may be created by a plurality of publishing devices. The plurality of publishing devices further may publish event streams to other ESP devices. The one or more continuous queries instantiated by ESPE 800 may analyze and process the input event streams to form output event streams output to event subscribing device A 1024*a*, event subscribing device B 1024*b*, and event subscribing device C 1024*c*. ESP system 1000 may include a greater or a fewer number of event subscribing devices of event subscribing devices.

Publish-subscribe is a message-oriented interaction paradigm based on indirect addressing. Processed data recipients specify their interest in receiving information from ESPE 800 by subscribing to specific classes of events, while information sources publish events to ESPE 800 without directly addressing the receiving parties. ESPE 800 coordinates the interactions and processes the data. In some cases, the data source receives confirmation that the published information has been received by a data recipient.

A publish/subscribe API may be described as a library that enables an event publisher, such as publishing device 1022, to publish event streams into ESPE 800 or an event subscriber, such as event subscribing device A 1024*a*, event subscribing device B 1024*b*, and event subscribing device C 1024*c*, to subscribe to event streams from ESPE 800. For illustration, one or more publish/subscribe APIs may be defined. Using the publish/subscribe API, an event publishing application may publish event streams into a running event stream processor project source window of ESPE 800, and the event subscription application may subscribe to an event stream processor project source window of ESPE 800.

The publish/subscribe API provides cross-platform connectivity and endianness compatibility between ESP application and other networked applications, such as event publishing applications instantiated at publishing device 1022, and event subscription applications instantiated at one or more of event subscribing device A 1024*a*, event subscribing device B 1024*b*, and event subscribing device C 1024*c*.

Referring back to FIG. 9, operation 906 initializes the publish/subscribe capability of ESPE 800. In an operation 908, the one or more projects 802 are started. The one or more started projects may run in the background on an ESP device. In an operation 910, an event block object is received from one or more computing device of the event publishing device 1022.

ESP subsystem 800 may include a publishing client 1002, ESPE 800, a subscribing client A 1004, a subscribing client B 1006, and a subscribing client C 1008. Publishing client 1002 may be started by an event publishing application executing at publishing device 1022 using the publish/subscribe API. Subscribing client A 1004 may be started by an event subscription application A, executing at event subscribing device A 1024*a* using the publish/subscribe API. Subscribing client B 1006 may be started by an event subscription application B executing at event subscribing device B 1024*b* using the publish/subscribe API. Subscribing client C 1008 may be started by an event subscription application C executing at event subscribing device C 1024*c* using the publish/subscribe API.

An event block object containing one or more event objects is injected into a source window of the one or more source windows 806 from an instance of an event publishing application on event publishing device 1022. The event block object may be generated, for example, by the event publishing application and may be received by publishing client 1002. A unique ID may be maintained as the event block object is passed between the one or more source windows 806 and/or the one or more derived windows 808 of ESPE 800, and to subscribing client A 1004, subscribing client B 806, and subscribing client C 808 and to event subscription device A 1024*a*, event subscription device B 1024*b*, and event subscription device C 1024*c*. Publishing client 1002 may further generate and include a unique embedded transaction ID in the event block object as the event block object is processed by a continuous query, as well as the unique ID that publishing device 1022 assigned to the event block object.

In an operation 912, the event block object is processed through the one or more continuous queries 804. In an operation 914, the processed event block object is output to one or more computing devices of the event subscribing devices 1024*a-c*. For example, subscribing client A 804, subscribing client B 806, and subscribing client C 808 may send the received event block object to event subscription device A 1024*a*, event subscription device B 1024*b*, and event subscription device C 1024*c*, respectively.

ESPE 800 maintains the event block containership aspect of the received event blocks from when the event block is published into a source window and works its way through the directed graph defined by the one or more continuous queries 804 with the various event translations before being output to subscribers. Subscribers can correlate a group of subscribed events back to a group of published events by comparing the unique ID of the event block object that a publisher, such as publishing device 1022, attached to the event block object with the event block ID received by the subscriber.

In an operation 916, a determination is made concerning whether or not processing is stopped. If processing is not stopped, processing continues in operation 910 to continue receiving the one or more event streams containing event block objects from the, for example, one or more network devices. If processing is stopped, processing continues in an operation 918. In operation 918, the started projects are stopped. In operation 920, the ESPE is shutdown.

As noted, in some embodiments, big data is processed for an analytics project after the data is received and stored. In other embodiments, distributed applications process continuously flowing data in real-time from distributed sources by applying queries to the data before distributing the data to geographically distributed recipients. As noted, an event stream processing engine (ESPE) may continuously apply the queries to the data as it is received and determines which entities receive the processed data. This allows for large amounts of data being received and/or collected in a variety of environments to be processed and distributed in real time. For example, as shown with respect to FIG. 2, data may be collected from network devices that may include devices within the internet of things, such as devices within a home automation network. However, such data may be collected from a variety of different resources in a variety of different environments. In any such situation, embodiments of the present technology allow for real-time processing of such data.

Aspects of the current disclosure provide technical solutions to technical problems, such as computing problems that arise when an ESP device fails which results in a complete service interruption and potentially significant data loss. The data loss can be catastrophic when the streamed data is supporting mission critical operations such as those in support of an ongoing manufacturing or drilling operation. An embodiment of an ESP system achieves a rapid and seamless failover of ESPE running at the plurality of ESP devices without service interruption or data loss, thus significantly improving the reliability of an operational system that relies on the live or real-time processing of the data streams. The event publishing systems, the event subscribing systems, and each ESPE not executing at a failed ESP device are not aware of or effected by the failed ESP device. The ESP system may include thousands of event publishing systems and event subscribing systems. The ESP system keeps the failover logic and awareness within the boundaries of out-messaging network connector and out-messaging network device.

In one example embodiment, a system is provided to support a failover when event stream processing (ESP) event blocks. The system includes, but is not limited to, an out-messaging network device and a computing device. The computing device includes, but is not limited to, a processor and a computer-readable medium operably coupled to the processor. The processor is configured to execute an ESP engine (ESPE). The computer-readable medium has instructions stored thereon that, when executed by the processor, cause the computing device to support the failover. An event block object is received from the ESPE that includes a unique identifier. A first status of the computing device as active or standby is determined. When the first status is active, a second status of the computing device as newly active or not newly active is determined. Newly active is determined when the computing device is switched from a standby status to an active status. When the second status is newly active, a last published event block object identifier that uniquely identifies a last published event block object is determined. A next event block object is selected from a non-transitory computer-readable medium accessible by the computing device. The next event block object has an event block object identifier that is greater than the determined last published event block object identifier. The selected next event block object is published to an out-messaging network device. When the second status of the computing device is not newly active, the received event block object is published to the out-messaging network device. When the first status of the computing device is standby, the received event block object is stored in the non-transitory computer-readable medium.

Figure 11:
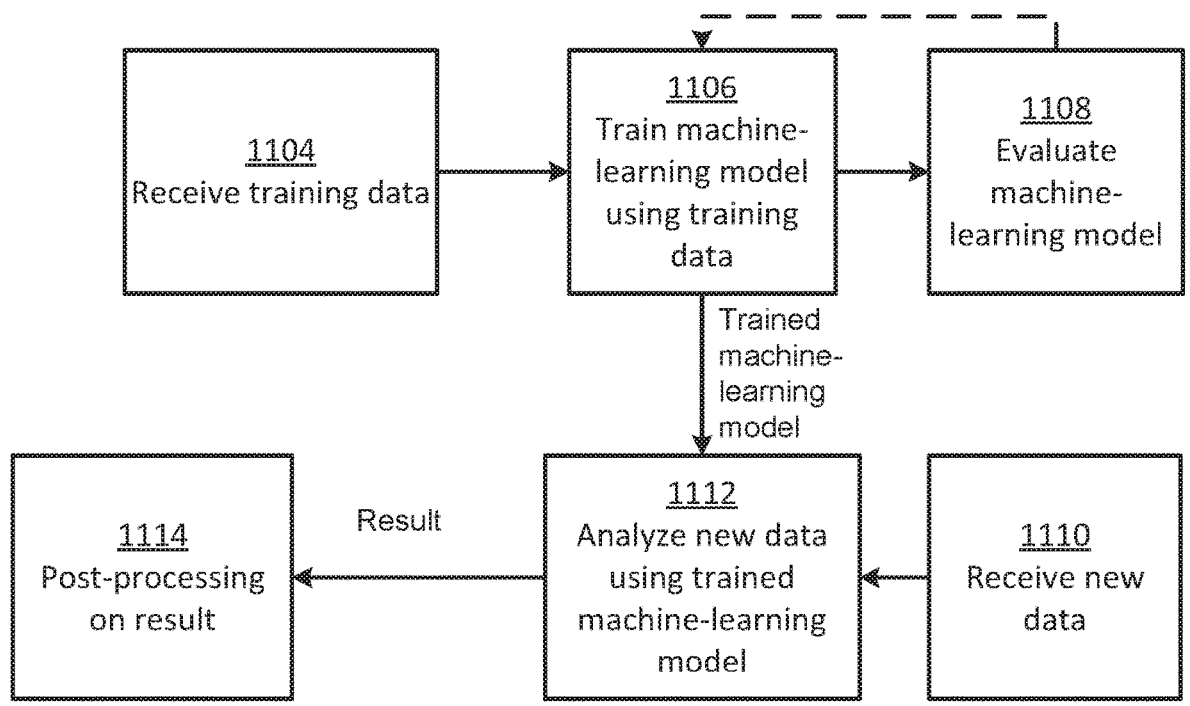
FIG. 11 illustrates a flow chart of an example of a process for generating and using a machine-learning model according to at least one embodiment of the present technology.

FIG. 11 is a flow chart of an example of a process for generating and using a machine-learning model according to some aspects. Machine learning is a branch of artificial intelligence that relates to mathematical models that can learn from, categorize, and make predictions about data. Such mathematical models, which can be referred to as machine-learning models, can classify input data among two or more classes; cluster input data among two or more groups; predict a result based on input data; identify patterns or trends in input data; identify a distribution of input data in a space; or any combination of these. Examples of machine-learning models can include (i) neural networks; (ii) decision trees, such as classification trees and regression trees; (iii) classifiers, such as Naïve bias classifiers, logistic regression classifiers, ridge regression classifiers, random forest classifiers, least absolute shrinkage and selector (LASSO) classifiers, and support vector machines; (iv) clusterers, such as k-means clusterers, mean-shift clusterers, and spectral clusterers; (v) factorizers, such as factorization machines, principal component analyzers and kernel principal component analyzers; and (vi) ensembles or other combinations of machine-learning models. In some examples, neural networks can include deep neural networks, feed-forward neural networks, recurrent neural networks, convolutional neural networks, radial basis function (RBF) neural networks, echo state neural networks, long short-term memory neural networks, bi-directional recurrent neural networks, gated neural networks, hierarchical recurrent neural networks, stochastic neural networks, modular neural networks, spiking neural networks, dynamic neural networks, cascading neural networks, neuro-fuzzy neural networks, or any combination of these.

Different machine-learning models may be used interchangeably to perform a task. Examples of tasks that can be performed at least partially using machine-learning models include various types of scoring; bioinformatics; cheminformatics; software engineering; fraud detection; customer segmentation; generating online recommendations; adaptive websites; determining customer lifetime value; search engines; placing advertisements in real time or near real time; classifying DNA sequences; affective computing; performing natural language processing and understanding; object recognition and computer vision; robotic locomotion; playing games; optimization and metaheuristics; detecting network intrusions; medical diagnosis and monitoring; or predicting when an asset, such as a machine, will need maintenance.

Any number and combination of tools can be used to create machine-learning models. Examples of tools for creating and managing machine-learning models can include SAS® Enterprise Miner, SAS® Rapid Predictive Modeler, and SAS® Model Manager, SAS Cloud Analytic Services (CAS)®, SAS Viya® of all which are by SAS Institute Inc. of Cary, N.C.

Machine-learning models can be constructed through an at least partially automated (e.g., with little or no human involvement) process called training. During training, input data can be iteratively supplied to a machine-learning model to enable the machine-learning model to identify patterns related to the input data or to identify relationships between the input data and output data. With training, the machine-learning model can be transformed from an untrained state to a trained state. Input data can be split into one or more training sets and one or more validation sets, and the training process may be repeated multiple times. The splitting may follow a k-fold cross-validation rule, a leave-one-out-rule, a leave-p-out rule, or a holdout rule. An overview of training and using a machine-learning model is described below with respect to the flow chart of FIG. 11.

In block 1104, training data is received. In some examples, the training data is received from a remote database or a local database, constructed from various subsets of data, or input by a user. The training data can be used in its raw form for training a machine-learning model or pre-processed into another form, which can then be used for training the machine-learning model. For example, the raw form of the training data can be smoothed, truncated, aggregated, clustered, or otherwise manipulated into another form, which can then be used for training the machine-learning model.

In block 1106, a machine-learning model is trained using the training data. The machine-learning model can be trained in a supervised, unsupervised, or semi-supervised manner. In supervised training, each input in the training data is correlated to a desired output. This desired output may be a scalar, a vector, or a different type of data structure such as text or an image. This may enable the machine-learning model to learn a mapping between the inputs and desired outputs. In unsupervised training, the training data includes inputs, but not desired outputs, so that the machine-learning model has to find structure in the inputs on its own. In semi-supervised training, only some of the inputs in the training data are correlated to desired outputs.

In block 1108, the machine-learning model is evaluated. For example, an evaluation dataset can be obtained, for example, via user input or from a database. The evaluation dataset can include inputs correlated to desired outputs. The inputs can be provided to the machine-learning model and the outputs from the machine-learning model can be compared to the desired outputs. If the outputs from the machine-learning model closely correspond with the desired outputs, the machine-learning model may have a high degree of accuracy. For example, if 90% or more of the outputs from the machine-learning model are the same as the desired outputs in the evaluation dataset, the machine-learning model may have a high degree of accuracy. Otherwise, the machine-learning model may have a low degree of accuracy. The 90% number is an example only. A realistic and desirable accuracy percentage is dependent on the problem and the data.

In some examples, if the machine-learning model has an inadequate degree of accuracy for a particular task, the process can return to block 1106, where the machine-learning model can be further trained using additional training data or otherwise modified to improve accuracy. If the machine-learning model has an adequate degree of accuracy for the particular task, the process can continue to block 1110.

In block 1110, new data is received. In some examples, the new data is received from a remote database or a local database, constructed from various subsets of data, or input by a user. The new data may be unknown to the machine-learning model. For example, the machine-learning model may not have previously processed or analyzed the new data.

In block 1112, the trained machine-learning model is used to analyze the new data and provide a result. For example, the new data can be provided as input to the trained machine-learning model. The trained machine-learning model can analyze the new data and provide a result that includes a classification of the new data into a particular class, a clustering of the new data into a particular group, a prediction based on the new data, or any combination of these.

In block 1114, the result is post-processed. For example, the result can be added to, multiplied with, or otherwise combined with other data as part of a job. As another example, the result can be transformed from a first format, such as a time series format, into another format, such as a count series format. Any number and combination of operations can be performed on the result during post-processing.

Figure 12:
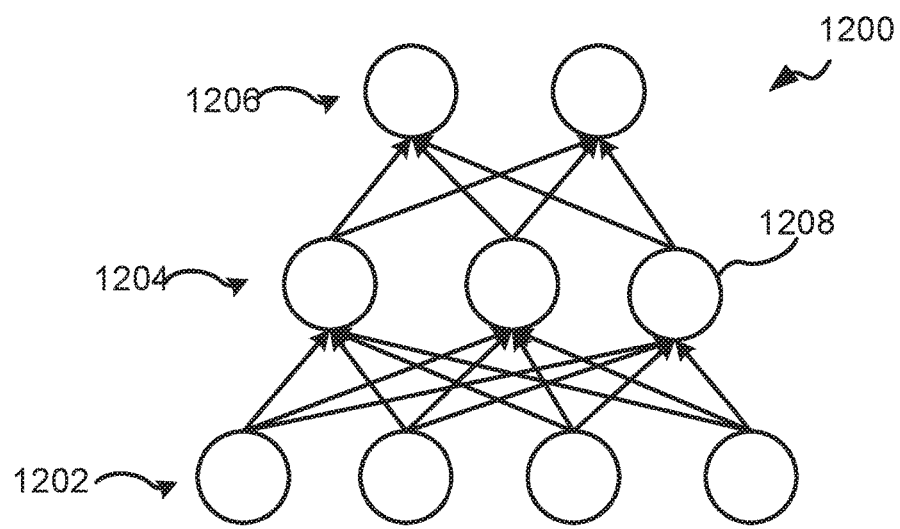
FIG. 12 illustrates an example of a machine-learning model as a neural network.

A more specific example of a machine-learning model is the neural network 1200 shown in FIG. 12. The neural network 1200 is represented as multiple layers of interconnected neurons, such as neuron 1208, that can exchange data between one another. The layers include an input layer 1202 for receiving input data, a hidden layer 1204, and an output layer 1206 for providing a result. The hidden layer 1204 is referred to as hidden because it may not be directly observable or have its input directly accessible during the normal functioning of the neural network 1200. Although the neural network 1200 is shown as having a specific number of layers and neurons for exemplary purposes, the neural network 1200 can have any number and combination of layers, and each layer can have any number and combination of neurons.

The neurons and connections between the neurons can have numeric weights, which can be tuned during training. For example, training data can be provided to the input layer 1202 of the neural network 1200, and the neural network 1200 can use the training data to tune one or more numeric weights of the neural network 1200. In some examples, the neural network 1200 can be trained using backpropagation. Backpropagation can include determining a gradient of a particular numeric weight based on a difference between an actual output of the neural network 1200 and a desired output of the neural network 1200. Based on the gradient, one or more numeric weights of the neural network 1200 can be updated to reduce the difference, thereby increasing the accuracy of the neural network 1200. This process can be repeated multiple times to train the neural network 1200. For example, this process can be repeated hundreds or thousands of times to train the neural network 1200.

In some examples, the neural network 1200 is a feed-forward neural network. In a feed-forward neural network, every neuron only propagates an output value to a subsequent layer of the neural network 1200. For example, data may only move one direction (forward) from one neuron to the next neuron in a feed-forward neural network.

In other examples, the neural network 1200 is a recurrent neural network. A recurrent neural network can include one or more feedback loops, allowing data to propagate in both forward and backward through the neural network 1200. This can allow for information to persist within the recurrent neural network. For example, a recurrent neural network can determine an output based at least partially on information that the recurrent neural network has seen before, giving the recurrent neural network the ability to use previous input to inform the output.

In some examples, the neural network 1200 operates by receiving a vector of numbers from one layer; transforming the vector of numbers into a new vector of numbers using a matrix of numeric weights, a nonlinearity, or both; and providing the new vector of numbers to a subsequent layer of the neural network 1200. Each subsequent layer of the neural network 1200 can repeat this process until the neural network 1200 outputs a final result at the output layer 1206. For example, the neural network 1200 can receive a vector of numbers as an input at the input layer 1202. The neural network 1200 can multiply the vector of numbers by a matrix of numeric weights to determine a weighted vector. The matrix of numeric weights can be tuned during the training of the neural network 1200. The neural network 1200 can transform the weighted vector using a nonlinearity, such as a sigmoid tangent or the hyperbolic tangent. In some examples, the nonlinearity can include a rectified linear unit, which can be expressed using the following equation:

$$y = \max(x, 0)$$

where y is the output and x is an input value from the weighted vector. The transformed output can be supplied to a subsequent layer, such as the hidden layer 1204, of the neural network 1200. The subsequent layer of the neural network 1200 can receive the transformed output, multiply the transformed output by a matrix of numeric weights and a nonlinearity, and provide the result to yet another layer of the neural network 1200. This process continues until the neural network 1200 outputs a final result at the output layer 1206.

Other examples of the present disclosure may include any number and combination of machine-learning models having any number and combination of characteristics. The machine-learning model(s) can be trained in a supervised, semi-supervised, or unsupervised manner, or any combination of these. The machine-learning model(s) can be implemented using a single computing device or multiple computing devices, such as the communications grid computing system 400 discussed above.

Implementing some examples of the present disclosure at least in part by using machine-learning models can reduce the total number of processing iterations, time, memory, electrical power, or any combination of these consumed by a computing device when analyzing data. For example, a neural network may more readily identify patterns in data than other approaches. This may enable the neural network to analyze the data using fewer processing cycles and less memory than other approaches, while obtaining a similar or greater level of accuracy.

Some machine-learning approaches may be more efficiently and speedily executed and processed with machine-learning specific processors (e.g., not a generic CPU). Such processors may also provide an energy savings when compared to generic CPUs. For example, some of these processors can include a graphical processing unit (GPU), an application-specific integrated circuit (ASIC), a field-programmable gate array (FPGA), an artificial intelligence (AI) accelerator, a neural computing core, a neural computing engine, a neural processing unit, a purpose-built chip architecture for deep learning, and/or some other machine-learning specific processor that implements a machine learning approach or one or more neural networks using semiconductor (e.g., silicon (Si), gallium arsenide (GaAs)) devices. Furthermore, these processors may also be employed in heterogeneous computing architectures with a number of and a variety of different types of cores, engines, nodes, and/or layers to achieve various energy efficiencies, processing speed improvements, data communication speed improvements, and/or data efficiency targets and improvements throughout various parts of the system when compared to a homogeneous computing architecture that employs CPUs for general purpose computing.

Figure 13:
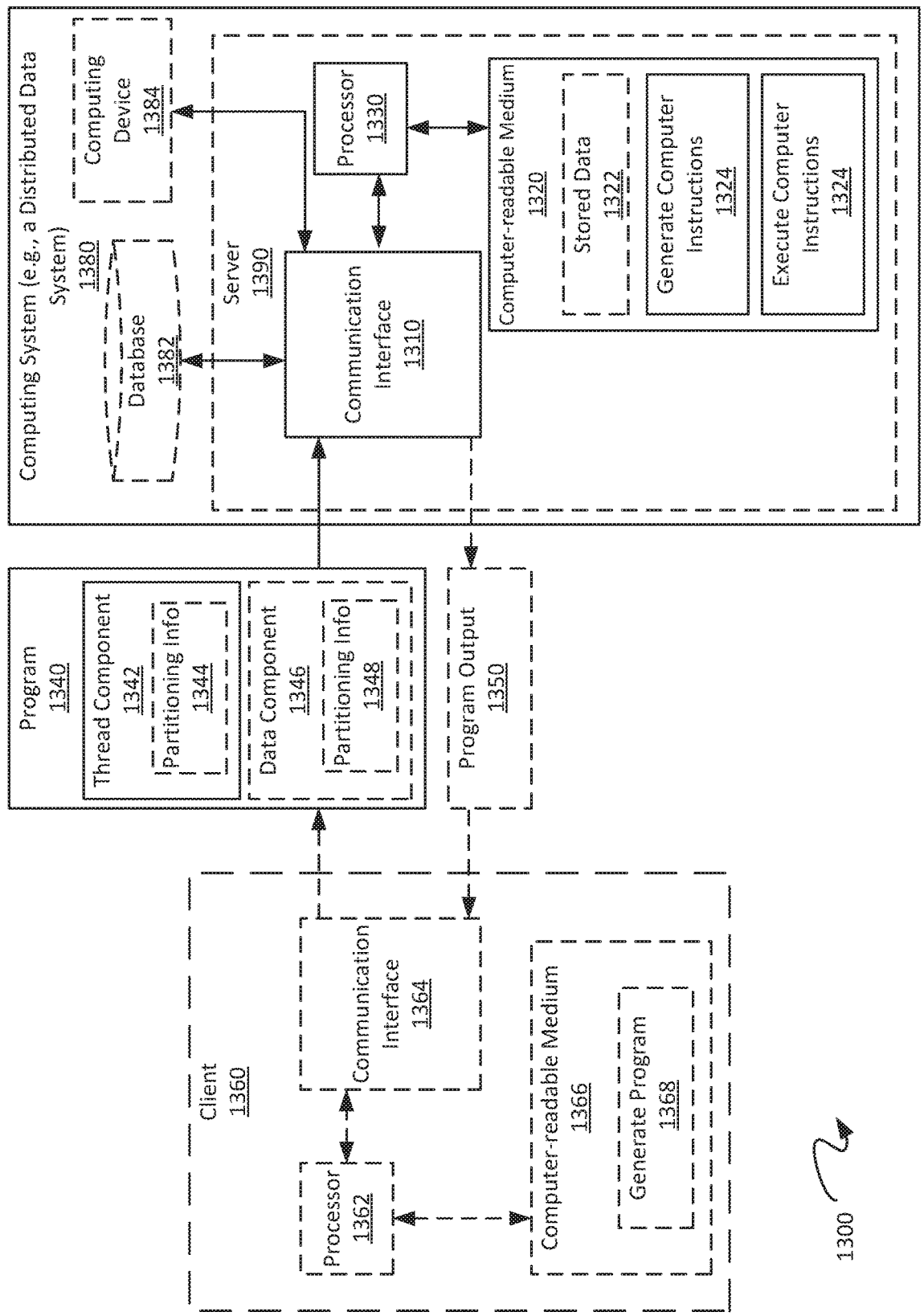
FIG. 13 illustrates a block diagram of a system in at least one embodiment of the present technology.

FIG. 13 illustrates a block diagram of a system 1300 in at least one embodiment of the present technology.

System 1300 comprises a computing system 1380 configured to receive a program 1340 from another device in the system 1300 (e.g., a program generated by client 1360 or written by a user of client 1360). For instance, in one or more embodiments the computing system 1380 comprises a server 1390 with a communication interface 1310 configured to communicate with other devices in the system 1300 (e.g., a client 1360). For instance, the server 1390 is configured to receive a program 1340 specifying computer operations. The program 1340 can be received using communication interface 1310 of the server 1390 (e.g. via wired or wireless communication). For instance, a device in the system 1300 may send the program 1340 to the computing system 1380 to execute one or more operations of the program 1340 on stored data 1322 in the computing system 1380. For example, the computing system 1380 may be a computing system capable of partitioning data and executing instructions in parallel (e.g., an Apache Spark® server has become one of the most popular and powerful platforms for distributed, in-memory parallel processing).

In one or more embodiments, the computing system 1380 is configured to provide (e.g., using the communication interface 1310) program output 1350 to one or more devices of the system 1300 (e.g., client 1360). For instance, the server 1390 is a computing device and configured to execute computer operations related to program 1340 (e.g., control or begin execution by one or more nodes of computing system 1380). The server 1390 can then provide program output 1350 indicating a result of executing the program 1340. Alternatively or additionally, other computing devices 1384 or databases 1382 are employed to execute the computer operations and provide program output 1350. For instance, in one or more embodiments, the server 1390 itself comprises or communicates with one or more databases 1382 and/or other computing devices 1384 (e.g., other servers) of computing system 1380. In such cases, the computing system 1380 collectively represents or functions as a server 1390 for communicating with and/or executing a program from another device in the system 1300 (e.g., client 1360 or an application on client 1360). For example, the computing system utilizes a distributed data system where executing of a program is conducted by different computing nodes (e.g., in parallel) or on data stored at different databases within the distributed data system.

In one or more embodiments, the server 1390 has a computer-readable medium 1320 and a processor 1330. Computer-readable medium 1320 comprises one or more electronic holding places or storage for information, programs, or data to be accessed by processor 1330. For instance, the processor can cause programs or other data received using communication interface 1310 to be stored in computer-readable medium 1320. Computer-readable medium 1320 can include, but is not limited to, any type of random access memory (RAM), any type of read only memory (ROM), any type of flash memory, etc. such as magnetic storage devices (e.g., hard disk, floppy disk, magnetic strips), optical disks (e.g., compact disc (CD), digital versatile disc (DVD)), smart cards, flash memory devices, etc.

In one or more embodiments, processor 1330 executes instructions (e.g., stored at the computer-readable medium 1320). The instructions can be carried out by a special purpose computer, logic circuits, or hardware circuits. In one or more embodiments, processor 1330 is implemented in hardware and/or firmware. Processor 1330 executes an instruction, meaning it performs or controls the operations called for by that instruction. For instance, in one or more embodiments, processor 1330 executes an instruction by performing on controlling operations on one or more nodes of computing system 1380. The computing system 1380 may comprise one or more of databases 1382, one or more of computing devices 1384 and/or server 1390. For instances, the operations may comprise operations on stored data 1322 stored at the server 1390 or elsewhere in the computing system 1380 (e.g., database 1382).

The instructions stored at the computer-readable medium 1320 can be written using one or more computer or programming language, scripting language, assembly language, etc. Processor 1330 in one or more embodiments can retrieve a set of instructions from a permanent memory device and copy the instructions in an executable form to a temporary memory device that is generally some form of RAM, for example.

In one or more embodiments, the computer-readable medium 1320 stores instructions for execution by processor 1330. For instance, in one or more embodiments, the server 1390 stores the program 1340 in the computer-readable medium 1320 or elsewhere in the computing system 1380. In one or more embodiments, the server 1390 generates for the program 1340 alternative instructions (e.g., computer-generated and/or in a computing language different than program 1340). For example, computer-readable medium 1312 comprises instructions 1324 to generate computer instructions and comprises instructions 1324 to execute computer instructions (e.g., for execution by nodes or devices of computing system 1380 of received or generated computer instructions). For instance, in one or more embodiments the received program is in a computer language not useful or convenient for execution by one or more nodes or devices of computing system 1380, and the server 1390 generates computer-generated computer instructions in a different computing language.

In one or more embodiments, the program 1340 comprises one or more components (e.g., thread program component 1342 or data program component 1346) and information (e.g., partitioning information 1344 and 1348). For instance, in one or more embodiments, the program 1340 comprises a thread program component 1342 that comprises a sequence of computer instructions that can be executed independently. For example, a program could have multiple thread components. In one or more embodiments, a particular thread program component is capable for execution in parallel on different partitioned data. Then the computing system 1380 (e.g., the server 1390) can partition the stored data 1322 and group it at particular nodes of the computing system such that each node executes instructions of the thread program component on its subset of data. In one or more embodiments, the program 1340 does not specify partitioning information 1344 for partitioning and/or grouping the stored data 1322, and the computing system 1380 uses its own criteria to partition and group the stored data 1322 (e.g., based on load considerations of nodes within the computing system). In one or more embodiments, the program 1340 does specify partitioning information 1344 for partitioning and/or grouping the stored data 1322 (e.g., using a BY operation), and the computing system 1380 considers this criteria and/or its own criteria to partition and group the stored data 1322.

In one or more embodiments, other devices in the system 1300 also comprise a communication interface for communicating via wired or wireless communication with devices in the system 1300 (e.g., communication interface 1364). Other devices may also have a processor and computer-readable medium with similar features as described with respect to processor 1330 and computer-readable medium 1320. For instance, in one or more embodiments, the computer-readable medium 1366 stores instructions for execution by processor 1362 to generate program 1340 (e.g., generate program application 1368).

In one or more embodiments, the program 1340 has a data program component 1346 that comprises computer instructions for operations on the output of the thread program component 1342. In a simple example, the operations comprise instructions for staging the output of the thread program component (e.g., a SET operation or an OUTPUT operation). In other cases, the operations comprise more complex operations on the output of the thread program component (e.g., arithmetic operations, conditional operations, relational operations, logical operations, and assignment operations). In this case, it may be advantageous to partition and group the output of the thread operations and distribute them on nodes of the computing system. In one or more embodiments, the program 1340 does not specify partitioning information 1348 for partitioning and/or grouping the output of executing the thread program component 1342, and the computing system 1380 uses its own criteria to partition and group the output (e.g., based on load considerations of nodes within the computing system). In one or more embodiments, the program 1340 does specifies partitioning information 1348 for partitioning and/or grouping the output (e.g., using a BY operation), and the computing system 1380 considers this criteria and/or its own to partition and group the output.

In one or more embodiments, the program is a user-written program. In one example, the user-written program is a user-written DS2 program using PROC DS2 programing language provided by SAS Institute Inc. of Cary, N.C. In another example, a user-supplied program (e.g., in a SCALA™ programming language) may come from one server (e.g., using a SAS® Cloud Analytics Services (CAS)) to be executed inside another server (e.g., a SPARK-compatible server). For instance, this may occur when data is stored on one server (e.g., a SPARK-compatible server), but the program comes from another server (e.g., a CAS server). In this case, computer-generated computer instructions can be generated in response to a received request from a server to execute a program on data stored at another server.

In one or more embodiments, the program could itself be computer-generated or computer-generated responsive to a user request. For example, an action to load or save a table (e.g., a CAS action or SAS® Viya Parallel Data Connector action), a request to run a scoring model (e.g., using the Scoring Accelerator macro or SAS Viya PROC SCOREAC-CEL), and/or running operations related to a Data Step Accelerator, Code Accelerator and Scoring Accelerator could generate or trigger computer instructions.

One or more embodiments enable executing the program in a computing system that may not be able to easily interpret or compile the received program (e.g., using an embedded process in a Spark® server).

Figure 14:
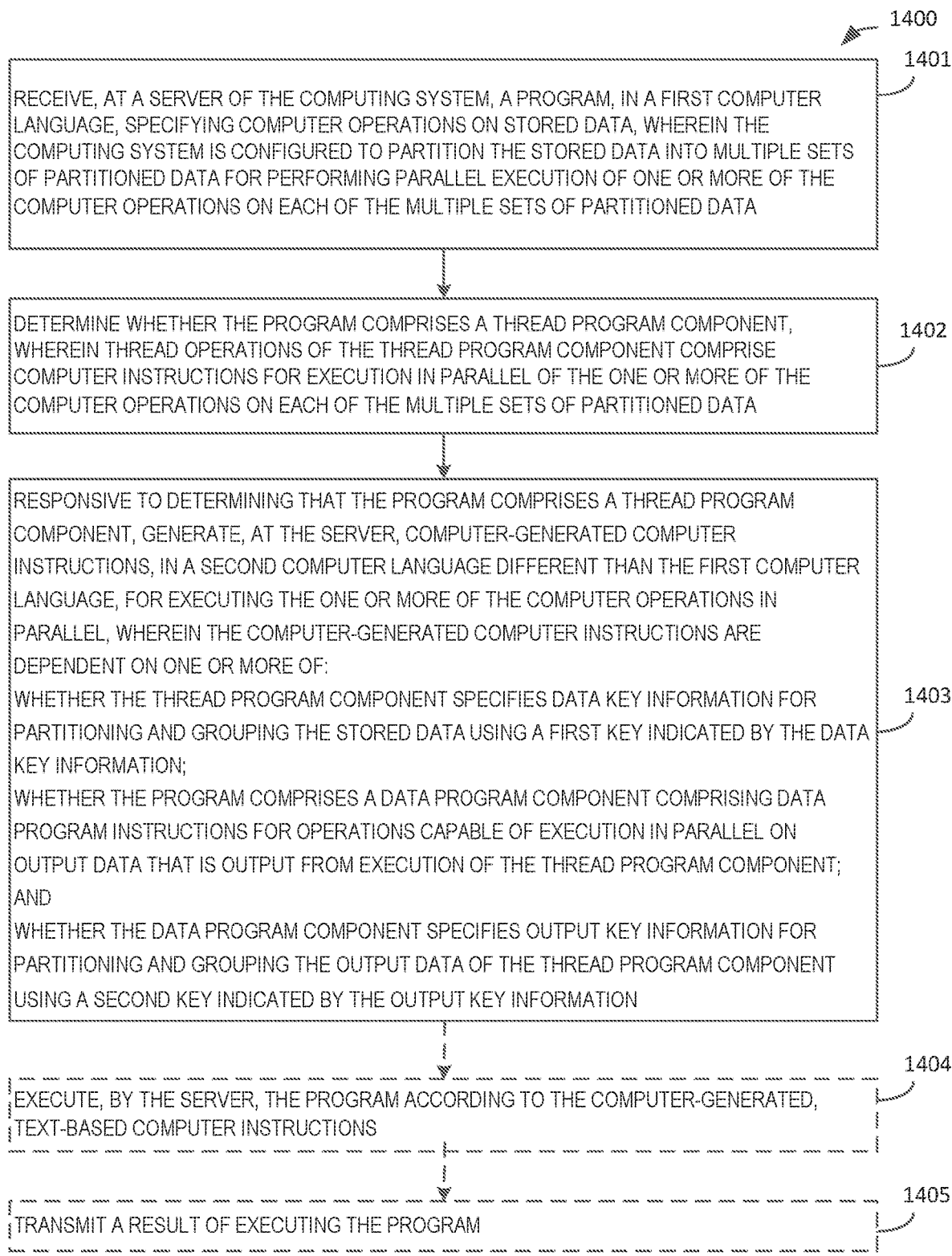
FIG. 14 illustrates a flow diagram for executing a program in at least one embodiment of the present technology.

FIG. 14 illustrates a method 1400 for executing a program (e.g., a program 1340). For example the method 1400 can be implemented by a computing system (e.g., computing system 1380) and/or a server (e.g., server 1390).

The method 1400 comprises an operation 1401 that includes receiving, at a server of a computing system, a program (e.g., program 1340) specifying computer operations on stored data. For example, the program could be received from a client remote from the server and/or a computing system of the server. The program is in a first computer language (e.g., in a DS2 programming language). For example, the first computer language could be a text-based or machine-based computer language. The computer language could be user-written computer instructions (e.g., written by a user of client 1360) or it could be generated by a machine (e.g., generated by client 1360). The computing system is configured to partition the stored data into multiple sets of partitioned data for performing parallel execution of one or more of the computer operations on each of the multiple sets of partitioned data.

The method 1400 comprises an operation 1402 that includes determining whether the program comprises a thread program component. Thread operations of the thread program component comprise computer instructions for execution in parallel of the one or more of the computer operations on each of the multiple sets of partitioned data.

The method 1400 comprises an operation 1403 that includes responsive to determining that the program comprises a thread program component, generating, at the server, computer-generated computer instructions for executing the one or more of the computer operations in parallel. The computer-generated computer instructions are in a second computer language different than the first computer language (e.g., a computer language provided by JAVA®, PYTHON™, R™ or SCALA™). For example, the first computer language could be a computer language readable by a client and the second computer language is in a computer language readable by one or more entities in the computing system.

The computer-generated computer instructions are dependent on one or more criteria. For instance, the particular instructions selected or arranged could be based on one or more criteria. The criteria could include whether the thread program component specifies data key information for partitioning and grouping the stored data using a first key indicated by the data key information. Additionally, or alternatively the criteria includes whether the program comprises a data program component comprising data program instructions for operations capable of execution in parallel on output data that is output from execution of the thread program component. Additionally, or alternatively the criteria includes whether the data program component specifies output key information for partitioning and grouping the output of the thread program component using a second key indicated by the output key information.

The method 1400 optionally comprises an operation 1404 that includes executing, by the server, the program according to the computer-generated computer instructions. Executing in this regard could include initiating execution at one or more nodes of a computing system (e.g., computing system 1380). Additionally or alternatively executing could comprise partitioning or grouping data according to the computer-generated computer instructions. Additionally or alternatively, executing comprises executing the operations at the server on data stored at the server.

As an example, operation 1404 includes requesting the computing system to partition stored data (e.g., data stored at a server in the computing system) into multiple sets of the partitioned data. As another example, operation 1404 includes requesting the computing system to distribute a respective one of the multiple sets of the partitioned data to respective ones of different computing nodes of the computing system for executing computer operations of the program.

The method 1400 optionally comprises an operation 1405 that includes transmitting a result of executing the program (e.g., the server 1390 transmits program output 1350 to client 1360. Embodiments described herein are applicable to other systems and protocols, and example systems described herein should not be construed as limiting the applicability of embodiments to other systems.

Figure 15:
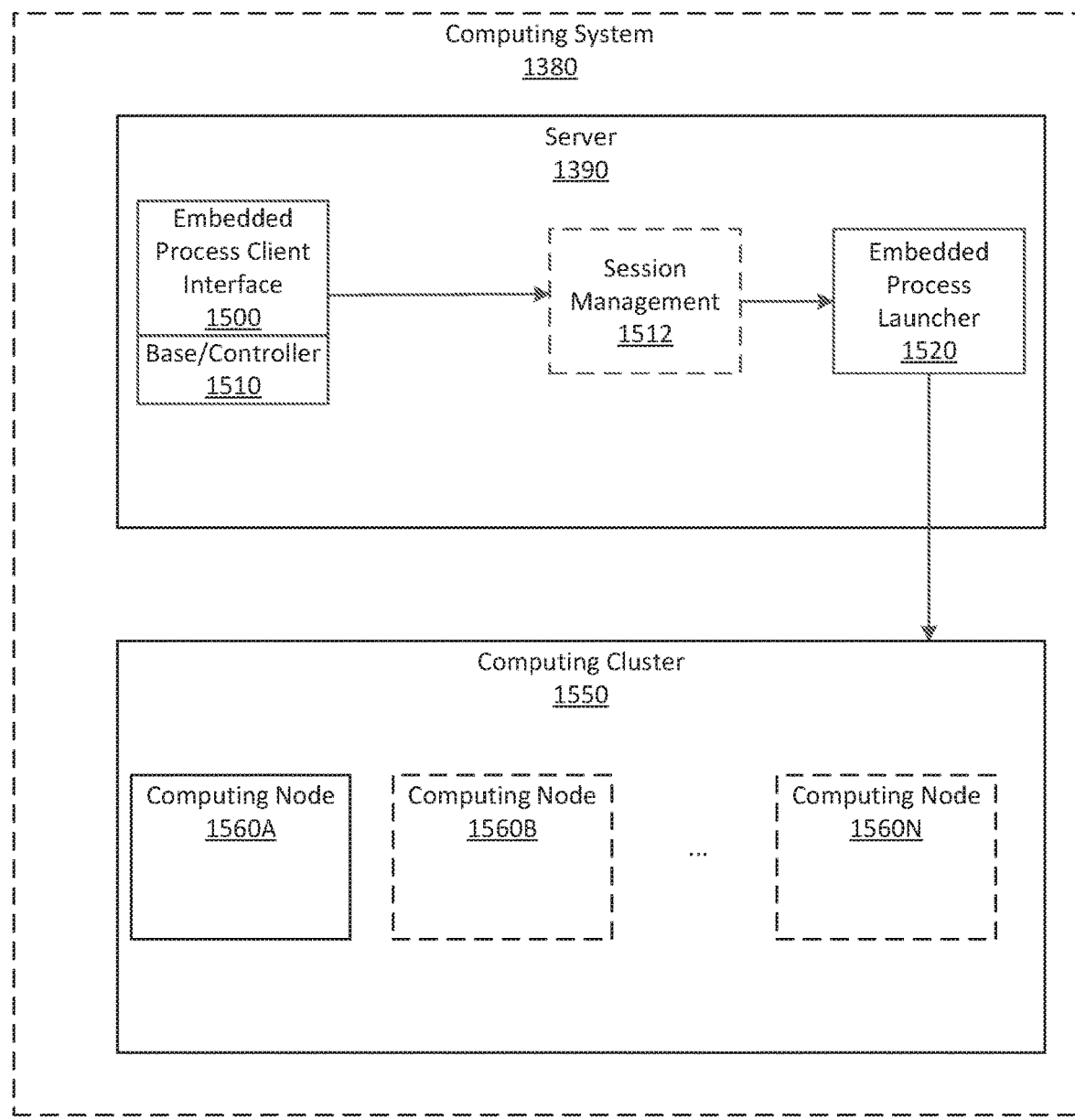
FIG. 15 illustrates a block diagram of a computing system in at least one embodiment of the present technology.

FIG. 15 illustrates a block diagram of a computing system 1380 comprising a server 1390. In this example, the server 1390 has client-side or client-facing computer architectural components. These components can be collectively referred to as an embedded process in that it is embedded on a server 1390. For example, one type of server is a Spark-compatible server (or Spark® server). A Spark® server is used as an example server because it has become one of the most popular platforms for distributed, in-memory parallel processing. A Spark® server can be useful for low cost, fast, and efficient massively parallelized data manipulation. Embodiments described herein are applicable to other types of servers. For example, embodiments are applicable to servers that provide a combination of libraries that allows database query (e.g., using Structured Query Language, SQL™), event stream processing, machine learning, and/or graph processing. Additionally or alternatively, embodiments are applicable to servers that process massive amounts of data stored on a cluster of commodity hardware (e.g., providing an open-source parallel processing framework).

In one or more embodiments, the server 1390 comprises a Base 1510 for executing processes associated with another computing system. For example, SAS® Embedded Process (EP) is a portable, lightweight execution container that allows the parallel execution of SAS processes inside Hadoop®, Spark®, Teradata®, and many other massive parallel processing (MPP) databases. In one or more embodiments, the Base 1510 is a controller or comprises a controller (e.g., a CAS controller).

SAS® Embedded Process is sufficient to support the multi-threaded SAS® proprietary DS2 language. DS2 is a procedural programming language influenced by the SAS® proprietary DATA step language. The DS2 language excels at achieving parallel execution. Most DATA step functions can be called from a DS2 program. DS2 programs can run in the Base SAS language interface using PROC DS2, SAS® High-Performance Analytics, SAS® In-Database Scoring Accelerator, SAS® In-Database Code Accelerator, and SAS® Viya® Cloud Analytic Services.

In one or more embodiments, the server 1390 comprises an Embedded Process Client Interface 1500 (e.g., to communicate with a remote client to receive a program described herein). For instance, the program can be written in a language specific to the language supported by an embedded process described herein. The Embedded Process Client Interface 1500 may be configured to receive execution requests.

The parallel syntax of the DS2 language coupled with SAS Embedded Process allows traditional developers utilizing SAS® products to create portable algorithms that are implicitly executed inside computing systems using other technology (e.g., Hadoop® MapReduce and Apache Spark®). For instance, running or executing DS2 code directly inside a Spark® server effectively leverages the massive parallel processing and native resources, rather than moving the data from the computing system to a client. Applying the process or code to the data eliminates data movement and decreases overall processing time.

SAS® Embedded Process is a part of SAS® In-Database Technology. In such a context, SAS® In-Database Technologies offers a flexible, efficient way to leverage increasing amounts of data by injecting the processing power of SAS® wherever the data lives (e.g. using a SAS® Embedded Process). SAS® In-Database Technologies can tap into the massively parallel processing (MPP) architecture of Apache Hadoop® and Apache Spark® for scalable performance. SAS® In-Database Code Accelerator for Hadoop allows the parallel execution of user-written DS2 programs using Apache Spark.

In one or more embodiments, an execution request received or process by the Embedded Process Client Interface 1500 could consist of an arbitrary program supplied by the user or a program generated by the Embedded Process Client Interface 1500 (e.g., a SCALA™ program) or another machine. Program can be generated when a user submits a CAS action—such as a request to load and save a table or a request to run score code—to be executed inside another server (e.g., a Spark-compatible server). Programs can also be generated when running SAS In-Database processes—such as Code Accelerator, Scoring Accelerator and Data Step Accelerator—inside another server (e.g., a Spark-compatible server). A generated program can be in a language interpretable or compliable by the server 1390 (e.g., a SCALA™ computer language). The received arbitrary program could be a program comprising computer instructions that are directly implemented by the server without generating additional computer-generated computer instructions related to compliance with the server. The received arbitrary program could be responsive to a user request or action at a server remote from the computing system 1380.

In one or more embodiments, programs are started from Base 1510. For example, SAS® In-Database Code Accelerator DS2 programs are started from Base SAS® using PROC DS2. When the execution platform indicates that another platform is being used (e.g., the platform is set to SPARK®), the Embedded Process Client Interface 1500 can generate a program in a platform specific language (e.g., a SCALA™ program). For instance, the server 1390 can interpret or compile the text-based computer instructions to machine language before execution.

The Embedded Process Launcher 1520 deploys the user-written code (e.g., DS2 or SCALA™) and the generated code (e.g., SCALA™ programs) to the cluster and submits the SAS Embedded Process Spark application for execution. For example the server 1390 can control executing by a computing cluster 1550. The computing cluster 1550 can comprise various computing nodes 1560 for partitioning and grouping data onto the computing nodes (e.g., computing nodes of computing system 1380).

The Embedded Process Launcher 1520 can also be used to start-up and shut down instances of an Embedded Process Continuous Session (EPCS). For example, a SAS® Spark® EPCS is an instantiation of a long-lived Embedded Process session on a particular cluster capable of serving one SAS Viya® Cloud Analytics Services session or one Base SAS session.

EPCS can process multiple execution requests without having to start and stop every time an execution request is made. For example, EPCS can be used to perform multiple SAS Viya Parallel Data Connector actions within the same session, such as save and load a table; run a scoring model, etc. EPCS can be used to run Data Step Accelerator, Code Accelerator and Scoring Accelerator.

In one or more embodiments, by bringing together data storage (e.g., of big data), processing power of servers and databases like Hadoop® and Spark®, and the intelligence of SAS® products, a user can achieve greater storage capacity, greater parallel processing capabilities, and/or faster data growth and processing time. For example, a user can write more complex algorithms to obtain more precise results. One or more embodiments may also be helpful for data management and integration in order to promote broad reuse while being compliant with Information Technology (IT) policies and procedures; and/or boost the value of analytics infrastructure while reducing the cost to maintain it.

In one or more embodiments, the server 1390 comprises a Session Management component 1512 and the Embedded Process Client Interface 1500 connects to a running instance of the EPCS, using the Session Management component 1512, and submits execution requests, receives execution responses and application events, such as task start/stop.

EPCS offers a tight integration between CAS and Spark® by allowing user-supplied SCALA™ programs submitted from CAS to be executed inside a Spark-compatible server. SCALA™ programs can be submitted as plain text and are compiled and executed by an embedded process described herein. SCALA™ programs can be compiled into a class and executed as a single unit of work or can be interpreted and executed just like in a Shell environment, where SCALA™ variables can be accessed by subsequent executions of SCALA™ code.

Users may run an arbitrary SCALA™ program that loads a Spark® Dataset into the Spark® memory and later on run a CAS action to load the in-memory Dataset into CAS. Users may also save a CAS table in Spark® as an in-memory Dataset and then apply an arbitrary SCALA™ program to process the data. Allowing arbitrary SCALA™ programs to be submitted and executed in a Spark-compatible server creates an integrated processing framework between CAS and a Spark-compatible server.

In one or more embodiments, the Embedded Process Launcher 1520 launches a driver program which runs in a driver container (e.g., at a given computing node 1560 of the computing cluster 1550). One or more embodiments, are useful for keeping data secure because the data does not need to leave the computing cluster, but instead computer programs can be executed on the data within a computing cluster (e.g., computing cluster 1550).

One or more embodiments are also compatible with Apache Spark® servers who are running on or with Apache Hadoop® technology (e.g., Yet Another Resource Negotiator, YARN). YARN is a large-scale, distributed operating system for big data applications. For instance, the embedded process components can be installed on every node of a cluster running a Spark® task. The computing resources used by the embedded process can then be managed by YARN.

Figure 16:
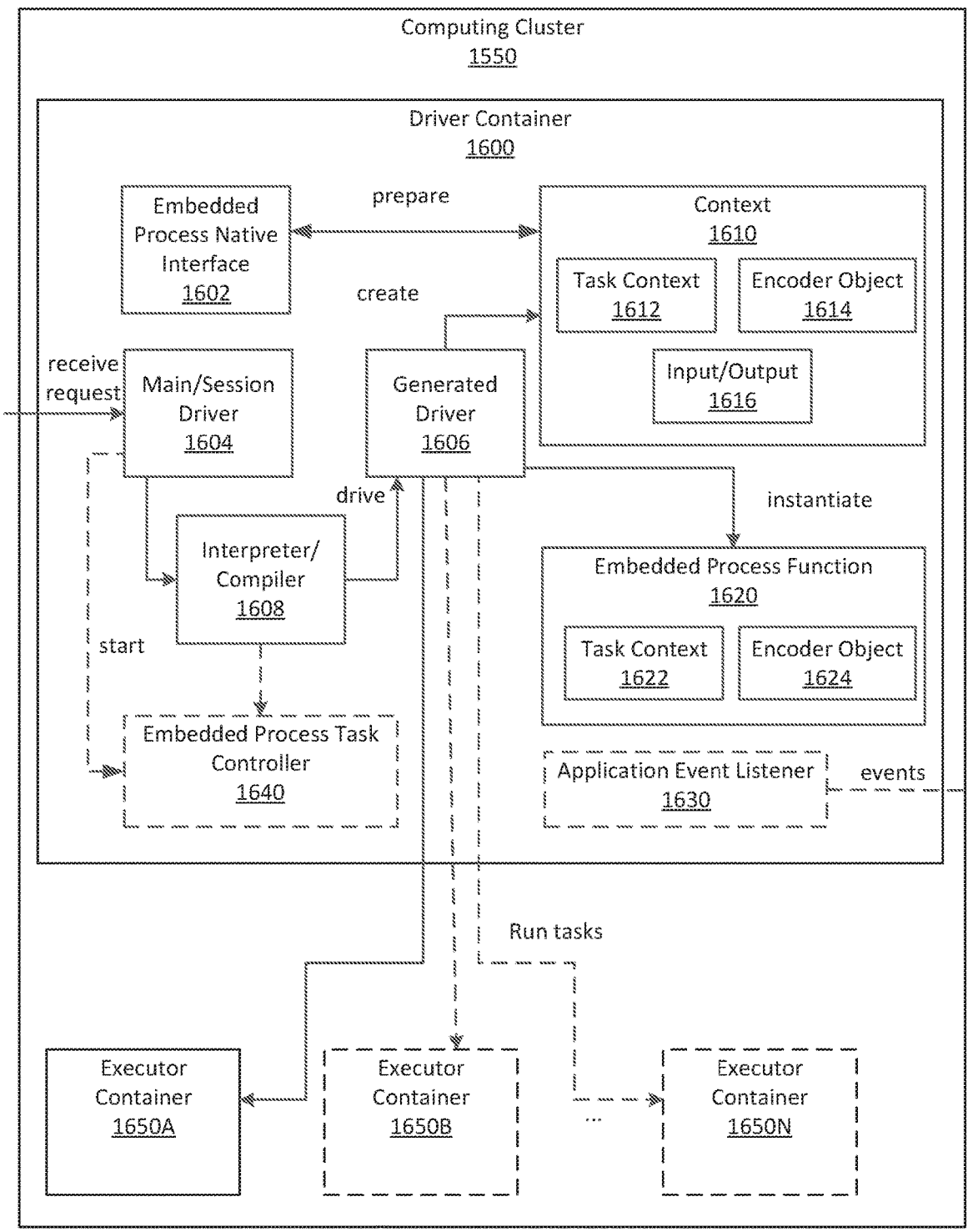
FIG. 16 illustrates a block diagram of a driver container in at least one embodiment of the present technology.

FIG. 16 illustrates a block diagram of a driver container 1600 executed in the computing cluster 1550. For example, arbitrary programs or generated programs (e.g., in a SCALA™ program language) can be executed inside a driver container 1600 (e.g., a Spark® Driver container, where the Spark® Embedded Process driver program runs).

Upon submission of an application to a server (e.g., a program described herein is submitted to a Spark-compatible server), or an EPCS launch, a driver container 1600 and one or more executor containers 1650 can be allocated in a computing cluster 1550. As an example, the driver container is capable of running a Spark® YARN Application Master process where the main (or session) driver program runs.

As shown in FIG. 16, a Main Driver 1604 can receive an execution request (e.g., from Embedded Process Launcher 1520). The execution request could comprise generated code in response to a received program as described herein. Alternatively, or additionally, the execution request comprises an arbitrary program readable by the server (e.g., an arbitrary SCALA™ code). The Main Driver 1604 can optionally request that the generated code be interpreted and/or compiled by an Interpreter/Compiler 1608. In one or more embodiments, the generated code is generated in a computer language that can be executed without compiling an entire program before executing any computer instructions in the generated code. For example, if the execution request contains generated SCALA™ program code, the SCALA™ program can be interpreted or compiled during execution (i.e. on the fly) by the Interpreter/Compiler 1608. A computing system can begin executing a program without pre-compiling all of the generated code.

In one or more embodiments, the creation of a Generated Driver 1606 is triggered. The generated driver 1606 can be the product of the generated program compilation. The compilation can be stored into a class that is stored in a JAVA® Virtual Machine class loader. The Generated Driver drives the execution of an application of an embedded process on the server (e.g., a SAS® Embedded Process Spark® application).

The Generated Driver 1606 can create a context 1610, instantiate an embedded process function 1620, and/or dispatch information to executive containers 1650 (e.g., on other nodes of the computing cluster 1550).

In one or more embodiments, the Main Driver 1604 puts the Generated Driver 1606 into execution by calling its drive( ) method. Inside the drive( ) method, the Generated Driver creates a Context 1610 (e.g., a SAS® Context), which is responsible for an early compilation of a program received by a server described herein (e.g., a user-written DS2 program) and for collecting and storing all necessary information to run the program when it is dispatched to the Executor Containers 1650. For instance, the Context 1610 comprises a Task Context 1612 (e.g., a SAS® Context for holding a SAS® Embedded Process Task Context), Input/Output 1616 (e.g., an input and output file or table metadata or INPUT OUTPUT HDMD), and an Output Encoder Object (ENC) 1614.

In the same or different embodiments, an arbitrary program component may not trigger the creation of a Generated Driver 1606 because the program can be executed directly.

In one or more embodiments an embedded process task controller 1640 is used to maintain a connection between a driver container 1600 and an executor container 1650.

In one or more embodiments, a computing cluster (e.g., computing cluster 1550) is used for a Spark® server running a SAS Embedded Process consisting of a Spark® driver program that runs in the Spark® application master container (e.g., driver container 1600) and a set of specialized functions that run in the Spark executors' containers (e.g., executor containers 1650).

In one or more embodiments, input in the Input/Output 1616 comes from reading data from a Hadoop® Distributed File System (HDFS) file. The input metadata can be, for example, passed by PROC DS2 during application submission or as part of an execution request described herein. When reading data from a Hive table, the input metadata is retrieved from a server's dataset schema (e.g., returned from a SQL™ statement execution request). Task Context 1612 creates the output metadata (e.g., Hadoop® metadata, HDMD) based on the early compilation of the user-written DS2 program inside the Embedded Process Native Interface 1602. The output metadata is used to create the Output Encoder Object 1614. The Output Encoder Object 1614 is used to create the schema of the output Distributed Data Set (DDS) that comes out of the Embedded Process Function 1620. For instance, types of DDS include a Dataset or RDD (Resilient Distributed Dataset).

In one or more embodiments, a specialized Embedded Process Function 1620 is instantiated by the Generated Driver 1606 and applied to a DDS (e.g., a Spark® Dataset or RDD). There are many types of specialized Embedded Process functions. For instance, their instantiations can depend on the many different ways to run SAS® In-Database Code Accelerator inside a Spark-compatible server.

The driver program can be written in one or more computer languages. One example driver program is a SAS® Embedded Process Spark Main Driver program. The driver program according to this example can have components that are written in C language where all the interactions with an execution container happen (e.g., according to a DS2 code). The driver program can also have components written in JAVA® and/or SCALA™ computer language where interactions with the Spark® environment happen because these are language readable by a Spark® server. For instance, JAVA® code can be used for extracting data from Hive tables or HDFS files and passing them to an execution container (e.g., a DS2 execution container). The SCALA™ code can drive the Spark® application. C, JAVA®, and SCALA™ code can run on the same JAVA® Virtual Machine (JVM) process that is allocated by the Spark application master and executors' containers. In order to eliminate multiple copies of the input data, JAVA® and C code can access shared memory buffers allocated by native code. In order to minimize JAVA® garbage collections, the shared native buffers can be allocated outside of the JVM heap space. Shared native memory allocations and CPU consumption can be managed by YARN resource management and can be compliant with resource constraints imposed by YARN. Journaling messages generated by C and DS2 code components of the driver program can be written to the Spark standard output (stdout) or standard error (stderr) logs. Messages generated by the JAVA® and SCALA™ code can be written to the Spark application log (syslog). Further, the driver program can comprise other languages (e.g., a PYTHON® or R™ computer languages).

In one or more embodiments, the driver container contains other components (e.g., an application event listener 1630). An application event listener 1630 can be used to receive notifications from an executor container 1650 when a task is started or ended.

Figure 17A:
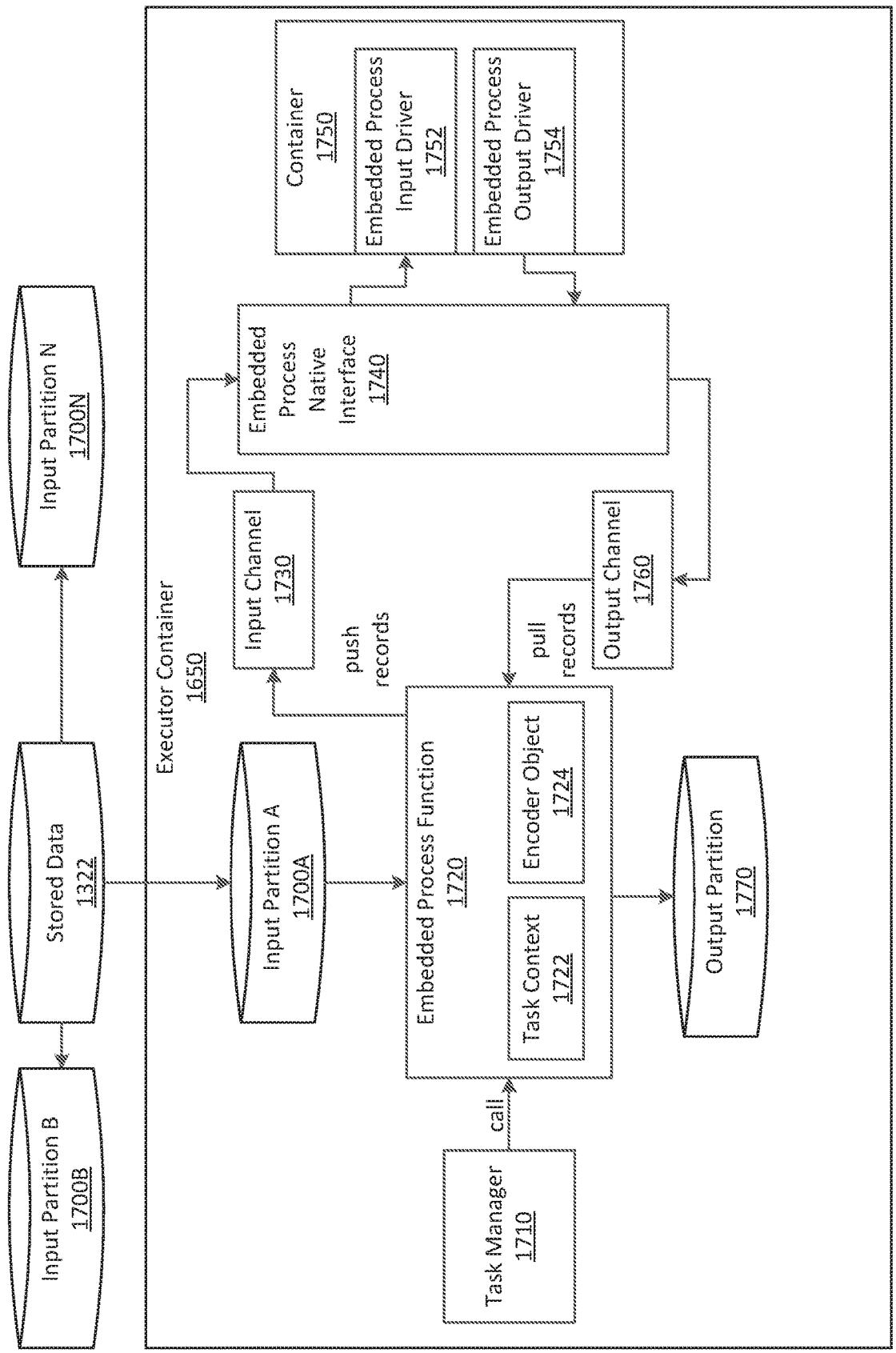
FIG. 17A illustrates a block diagram of an executor container for partitioned data in at least one embodiment of the present technology.

FIG. 17A illustrates a block diagram of an Executor Container 1650 for input partition data 1700A grouped from stored data 1322. There could be other partitioned data (e.g., 1700B and 1700N) processed in other executor containers. Each executor container is executing a given task or unit of work. There could be several tasks within an application. For instance, there could be one or more stages in a given task that are a set of tasks that depend on each other.

In one or more embodiments, a task manager 1710 manages the execution of a given task (e.g., the execution of a specialized Embedded Process Function 1720 instantiated by the generated driver 1606). For instance, Spark® tasks run in the executor container process. Each task is assigned an input partition, which might come, for example, from a Hive table or an HDFS file. Each task produces an output partition 1770. When all tasks are finished, the Generated Driver 1606 sees all output partitions as a single abstract unit called output Distributed Data Set (DDS) (e.g., an RDD). The output DDS in a Spark® Server can be persisted to a Hive table or to an HDFS file or remain in Spark memory for further use.

Figure 17B:
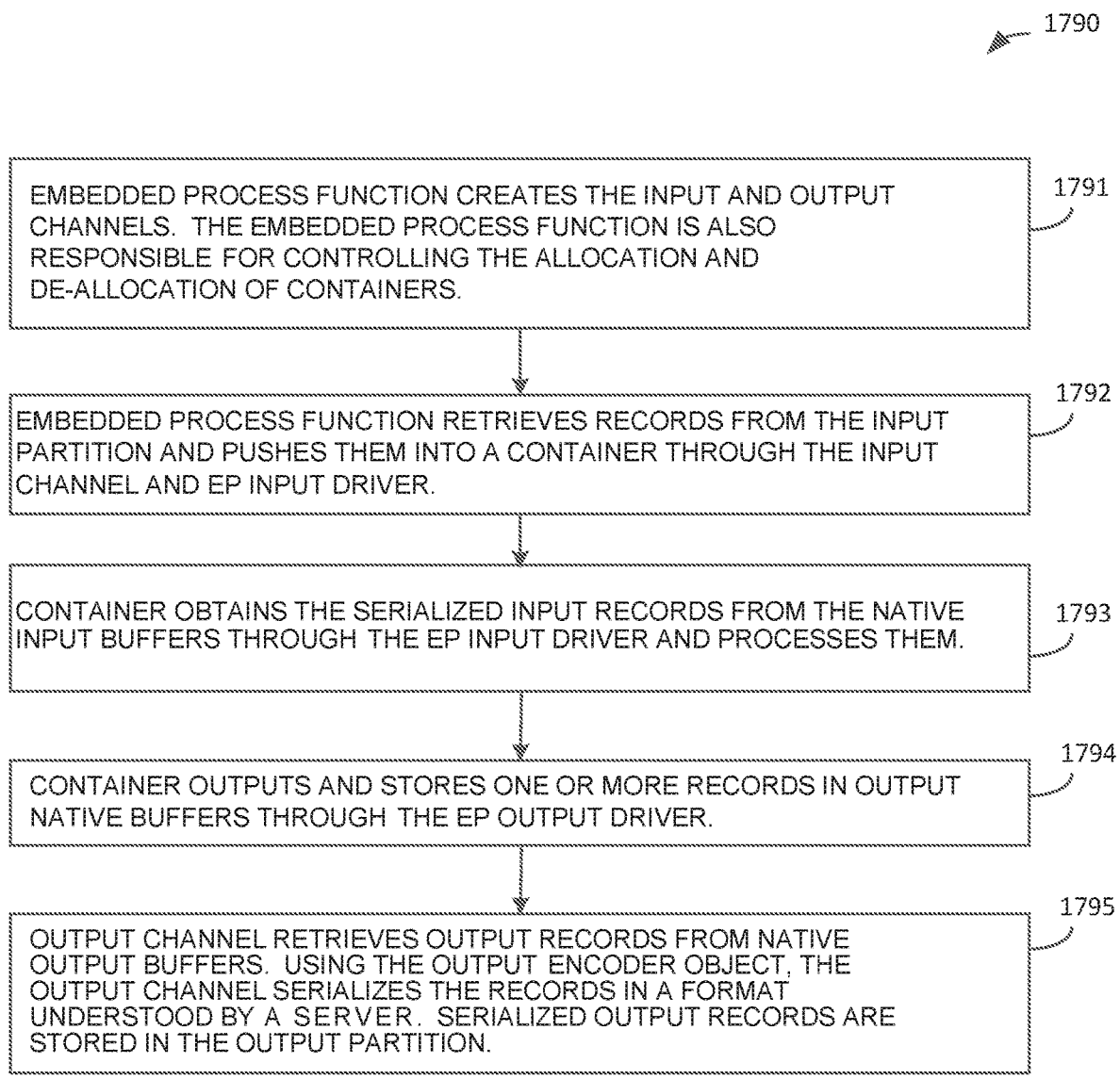
FIG. 17B illustrates a flow diagram for an executor container in at least one embodiment of the present technology.

FIG. 17B illustrates a flow diagram for a method implemented in an Executor Container 1650 for producing an output partition. In an operation 1791, the Embedded Process Function 1720 creates the input channel 1730 and output channel 1760. The Embedded Process Function 1720 is also responsible for controlling the allocation and de-allocation of one or more containers 1750 (e.g., a DS2 container).

In an operation 1792, Embedded Process Function 1720 retrieves records from the input partition data 1700A and pushes them into a container 1750 through the input channel 1730 and Embedded Process Input Driver 1752. Input data are serialized in a format that is understood by the program of the container (e.g., a DS2 program) and stored in native input buffers. The Embedded Process Native Interface 1740 is the frontier between the language of the Container 1750 and the language of the Executor Container 1650 (e.g., a JAVA® and/or C code language).

In an operation 1793, the Container 1750 obtains the serialized input records from the Embedded Process native input buffers through the Embedded Process Input Driver 1752 and processes them.

In an operation 1794, Container 1750 outputs and stores one or more records in output native buffers through the Embedded Process Output Driver 1754.

In an operation 1795, output channel 1760 retrieves output records from native output buffers. Using the Output Encoder Object 1724, the output channel 1760 serializes the records in a format understood by a server (e.g., a server described herein). Serialized output records are stored in the Output Partition 1770.

Method 1790 is merely an example; operations or sub-operations could be completed in a different order then specified in method 1790.

One or more embodiments described herein are applicable for use of a SAS® In-Database Code Accelerator™ to implement a combination of generated SCALA™ programs, Spark® SQL statements, HDFS files access, and DS2 programs on a Spark® server.

Parallel execution of SAS In-Database Code Accelerator inside the SAS Embedded Process on Spark consists of one Spark application. A Spark application consists of one or more jobs. Jobs consist of one or more stages that are a set of tasks that depend on each other. By generating SCALA™ programs that integrates with the SAS Embedded Process program interface in a Spark server, the many phases of a SAS In-Database Code Accelerator job can be comprised of one single Spark job.

The degree of parallelism implemented by a computing system depends on how the data is partitioned. Therefore, the number of tasks depends on the number of input data partitions. For instance, a Spark® server assigns one partition per task. The number of parallel tasks depends on the number of available executors, the number of cores per executor, and the number of cores per task. There are many performance tuning properties that can be used to control the application execution. For example, some tuning properties may be set when EPCS is started. Additional tuning properties can include Spark® properties set in the spark-default.conf configuration file. Examples of such Spark configuration properties are:
  (1) spark.executor.instances: specifies the number of executors allocated per application;
  (2) spark.executor.cores: specifies the number of cores allocated per executor; and
  (3) spark.task.cpus: specifies the number of cores to allocate for each task.

SAS® Embedded Process on Spark® provides two sets of specialized functions that are capable of reading data from an input partition and applying them to the DS2 program:
  (1) File functions: applied when the input data is read from a file stored in HDFS; and
  (2) Dataset functions: applied when the input data is read from a table stored in Hive.

The functions are categorized as transformations or actions. Transformation functions consume data from a DDS (e.g., a Dataset or RDD) and produce another DDS (e.g., a Dataset or RDD). Action functions consume data from a DDS (e.g., a Dataset or RDD) and write the output data directly to a file stored in HDFS.

SAS® In-Database Code Accelerator™ for Hadoop® enables the publishing of user-written DS2 thread or data programs to Spark®, where they can be executed in parallel exploiting the massively parallel processing power of a Spark® server. Examples of DS2 thread programs include large transpositions, computationally complex programs, scoring models, and BY-group processing.

To use Spark® as the execution platform, the DS2ACCEL option in the PROC DS2 statement is set to YES or the DS2ACCEL system option is set to ANY; the HADOOP-PLATFORM system option is set to SPARK; the Hive table or HDFS file used as input resides on the cluster; and SAS® Embedded Process is installed on all the nodes of the Hadoop® cluster that are capable of running a Spark® Executor.

Data is distributed on different nodes of the computing cluster. For instance, different databases can be used for storing and distributing data (e.g., sequel databases). There are several providers of database products and services for storing and distributing data including those identified by SQL™, Natisa™, SAP HANA®, Oracle®, Teradata®, and DB2.

The server breaks down the input data into distributed data set (DDS) partitions. For instance a Spark-compatible server breaks down input from a table into a Dataset and input from file into a RDD partition. Data partitions are also known as file blocks or file splits. Each partition is assigned to a Spark task, where the DS2 program runs. Each DS2 program has access to its own data partition.

Embodiments herein are applicable to other servers and computing systems beside Spark-compatible servers. However, when running complex user-written DS2 programs inside other database systems, executing a SAS® In-Database Code Accelerator™ may require multiple phases. For example: when running inside Hadoop® MapReduce, SAS® In-Database Code Accelerator™ exploits the map and reduce phases in order to get to the final result; in some cases, multiple MapReduce jobs may be required.

In one or more embodiments, CAS actions are used to provide CAS actions to a server described herein (e.g., server 1390). For example CASSPARKEP is an action set that provides CAS actions to interact with the SAS® Spark Embedded Process Continuous Session. STARTSPARKEP (Start Embedded Process Action), starts the SAS® EPCS on a particular cluster of a computing system (e.g., computing system 1380). The action can take one or more of the following parameters including other parameters not listed here:

1) username: specifies the Hadoop® user name that owns the EPCS Spark application.
2) password: specifies the Hadoop® user's password.
3) trace: specifies if the Embedded Process will run with traces.
4) timeout: specifies the number of seconds the Spark® Embedded Process waits for execution requests. If the timeout period is reached the Embedded Process terminates.
5) properties: specifies a list of additional Spark® or Hadoop® configuration properties and their values. Property name and value are separated by '=' sign.
6) classpath: specifies the class path used in the Hadoop® call context. The class path contains a folder or individual JAR files. The Hadoop® configuration folder is included in the class path if, for instance, the configpath argument is not specified. This argument is required if the caslib argument is not specified.
7) configpath: specifies a single folder where all the Hadoop and Spark configuration files reside. When the configpath argument is specified, the configuration folder does not need to be added to the classpath argument. This argument is required if the caslib argument is not specified.
8) executorInstances: specifies the number of Spark® executors allocated per Embedded Process instance.
9) executorCore: specifies the number of cores per Spark executor.
10) executorMemory: specifies the maximum amount of memory, e.g., in gigabytes (GB), that can be allocated by a Spark® executor (e.g. 2, 8).
11) taskCores: specifies the number of cores allocated for each task.
12) customJar specifies a list of local folders containing files, individual JAR files or individual files that are added to the application distributed cache. Folders and files must be separated by "," or ":" or ";" or " " (space).

The arguments username, password, classpath and configpath overwrite what was specified in CAS Library data source argument.

The following LUA example starts the Embedded Process on a cluster using the data source arguments provided by the CAS Library hive:

```
session:startsparkep    { caslib="hive",
                          executorInstances=4, executorCores=2,
                          executorMemory=16, taskCores=1
                        }
```

The following LUA example starts the Embedded Process on a cluster without specifying the data source options from a CAS Library:

```
session:startsparkep    { username="daghaz",
                          classpath="/tmp/hadoopjars",
                          configpath="/tmp/hadoopcfg",
                          executorInstances=4, executorCores=2,
                          executorMemory=16, taskCores=1,
                          properties={"a=b", "c=d"},
                          timeout=60
                        }
```

FIG. 18 illustrates an example program and program indicators. In one or more embodiments, a computing system parses a program and sets one or more indicators (e.g., indicators 1820, 1822, 1824, and 1826) for possible features of a program (e.g., features 1810, 1812, 1814, and 1816). For example, FIG. 18 shows a program 1890 for calculating an average manufacturer's suggested retail price (MSRP) from stored vehicle information. The computing system determines whether a program comprises a thread program component feature 1810 (e.g., thread program component 1832). An indicator 1820 (e.g., a first indicator) is set indicating whether the program comprises the thread program component. In this case, the program 1890 comprises a thread program component, so the first indicator 1820 is set to indicate the presence of this component.

Additionally, or alternatively, the computing system determines whether a program comprises a data program component feature 1814 (e.g., data program component 1836). An indicator 1824 (e.g., a second indicator) is set indicating whether the program comprises the data program component. In this case, the program 1890 comprises a data program component, so the second indicator 1824 is set to indicate the presence of this component.

Additionally, or alternatively, the computing system determines whether a thread program component comprises a feature 1812 specifying information for partitioning and grouping stored data (e.g., the instruction 1830). An indicator 1822 (e.g., a third indicator) is set indicating that the thread program component specifies the information for partitioning and grouping the stored data using the first key. For instance, in the program 1890, the thread program component 1832 includes an instruction 1830 (a BY statement) for partitioning and grouping the data by car make type using a key related to car make type. In one or more embodiments, a computing system determines whether the thread program component specifies information for partitioning and grouping by parsing the thread program component for a BY statement.

Additionally, or alternatively, the computing system determines whether a data program component comprises a feature 1816 specifying information for partitioning and grouping the output of the thread program component (e.g., the instruction 1834). An indicator 1826 (e.g., a fourth indicator) is set indicating whether the data program component specifies the information for partitioning and grouping the output of the thread program component using the second key. In one or more embodiments, a computing system determines whether the data program component specifies information for partitioning and grouping by parsing the data program component for a BY statement (e.g., instruction 1834). In this case, the output of the thread program component 1832 is also partitioned and grouped by car make type using a key related to car make type indicated by a BY statement. However, in other embodiments, different keys could be used in the data program component and thread program component. Further, other types of indicators could be used then shown here (e.g., flags or number values). In one or more embodiments, indicators are set in an order different than the order set here or not at all. Additional indicators could also be set to indicate other information for generating computer instructions (e.g., computer instructions readable by a Spark-compatible server).

FIGS. 19-24 indicate flow diagrams for generating components of computer-generated computer instructions for a received program. A program generated according to the flow diagram 1900 can be executed by a computing system (e.g., computing system 1380) or server (e.g., server 1390) described herein. The examples are written with respect to a program written in a DS2 program, but are applicable to programs in other languages. The generation of the computer instructions in these examples (e.g., a SCALA™ program by the Embedded Process Client Interface) depends on how a received program (e.g., a DS2 program) is written. The main factors considered in generating the code in these examples:

(1) Is there a thread program?
(2) Is there a thread program with a BY statement?
(3) Is there a data program with logic worth accelerating?
(4) Is there a data program with a BY statement?

For example, these factors could be indicated or considered by checking one or more indicators described herein (e.g., indicators corresponding to features 1810, 1812, 1814, and 1816).

In regards to factor (3), this factor may relate to considering whether a received program has instructions for operations capable of execution in parallel on output of a thread program or acceleration. For instance, a simple SET statement or OUTPUT statement in the data program may not trigger acceleration. Alternatively, other operators in a data program component may indicate logic worth accelerating (e.g., instructions capable of execution in parallel). For example, the data program may comprise arithmetic operators indicating mathematical operations (e.g., addition, subtraction, multiplication, and division) for executing on data of the output of a thread program component. Additionally or alternatively, the data program may comprise conditional operators (e.g. operators that request a data program returning one value if the condition is true and another if it is false). Additionally or alternatively, the data program may comprise relational operators used to compare program variables. Additionally or alternatively, the data program may comprise logical operators to perform logical operations on program variables (e.g., AND, OR, NOT statements). Additionally or alternatively, the data program may comprise assignment operators to assign values for program variables.

In one or more embodiments, a computing system determines whether the program comprises a data program component comprising the data program instructions for the operations capable of execution in parallel on the output of the thread program component by parsing the program for one or more of arithmetic operators, conditional operators, relational operators, logic operators, and assignment operators.

A received program can be executed on data retrieved from, for example, an electronic file type system or an electronic table. For example, the data can be stored on a server receiving a program for executing on the data. In one example embodiment, a Spark-compatible server provides the ability to read HDFS files and query structured data from within a Spark® application. With Spark® SQL, data can be retrieved from a table stored in Hive using an SQL statement and the Spark® Dataset Application Programming Interface (API). Spark® SQL provides ways to retrieve information about columns and their data types and supports the HiveQL syntax as well as Hive SerDes (Serializers and De-serializers).

The generated code depends on how the received program (e.g., in a DS2 language) is written. Six scenarios or cases are presented as non-limiting examples.

(1) There is a thread program component with no BY statement; there is no data program component.
(2) There is a thread and a data program component, none of them with a BY statement.
(3) There is a thread program component with no BY statement and a data program component with a BY statement.
(4) There is a thread program component with a BY statement and no data program component.
(5) There is a thread program component with a BY statement and a data program with no BY statement component.
(6) There is a thread and data program component, neither with a BY statement.

Figure 19A:
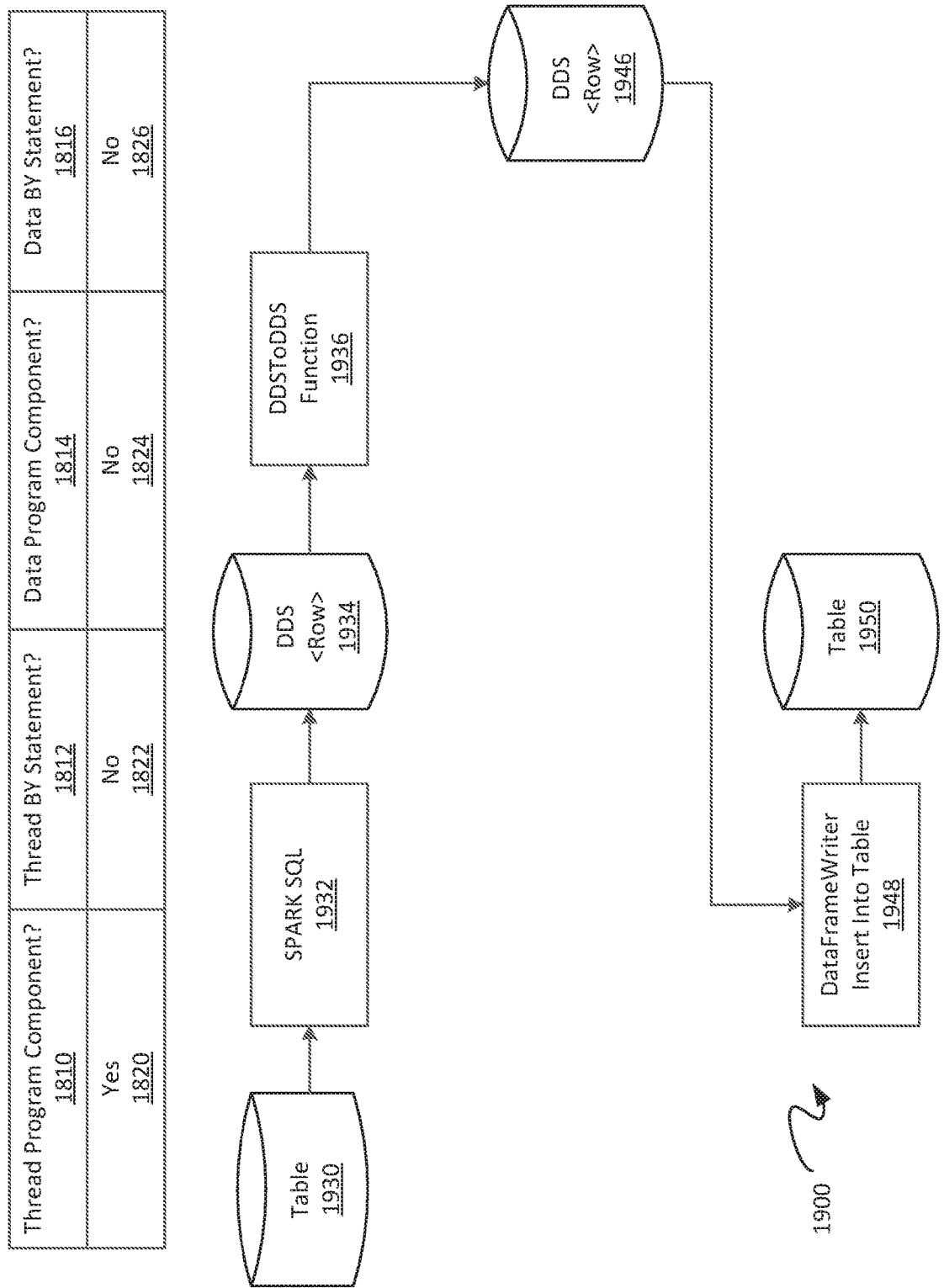
FIG. 19A illustrates a flow diagram for a data table according to program indicators in at least one embodiment of the present technology.

FIG. 19A illustrates a flow diagram for a data table 1930 according to program indicators corresponding to case (1). An example DS2 thread program 1990 according to case (1) is shown in FIG. 19C with a thread program component 1992. This DS2 thread program 1990 runs in a single phase and tasks are executed in parallel.

In one or more embodiments, a computing system determines there is a thread program component (e.g., thread program component 1992) and determines whether the thread program component specifies information for partitioning and grouping the stored data using a first key. In this example, indicator 1820 indicates there is a thread program component. Indicator 1822 indicates the thread program component had no key provide for partitioning and grouping data (e.g., no BY statement).

In one or more embodiments, when the thread program component does not specify information for partitioning and grouping the stored data using a key, the computer-generated computer instructions are generated to extract the stored data from the electronic table (e.g., table 1930). In this example, a SPARK SQL operation 1932 is used to query a database and extract the stored data. However, other database operations or databased products described herein could be used in examples describing a SPARK SQL operation. In this example, that data is extracted into a DDS that is a single object record (DDS 1934). Alternatively, other types of DDS could be used for example, there is a kind of DDS that contains a key field and value field or (DDS<K,V>). The key field is for indexing data of the value field. Another kind of DDS is one that utilizes rows (DDS<row>). An example DDS is a SPARK® Resilient Distributed Dataset (RDD).

For ease of explanation a particular kind of DDS is selected for each of examples described in FIGS. 19-24. However, it should be understood either of these kinds of DDS can be implemented in embodiments described herein regardless of whether there is a key provided by a program or not. For instance, when there is no BY statement, a key can be ignored by assigning NULL to its value. Alternatively, the key is stored in the DDS<K,V> when there is a BY statement. With a DDS<row> there is already no key associated with a row object. However, when there is a BY statement, all the rows with the same key can be stored on the same DDS. Thus multiple DDS can be used to represent different data associated with different keys.

In one or more embodiments, a computing system determines whether the program has a data program component comprising data program instructions for operations worth accelerating (e.g., capable of execution in parallel on the output of the thread program component). In this case, parsing the program 1990 would reveal a data program component 1994 that contains a set and output statement for the output of the thread and is deemed as not worth accelerating. In this case, where the program does not comprise the relevant data program component (i.e., one worth accelerating), the output of the thread program component can be written directly to an electronic table 1950. In the examples, shown in FIGS. 19-24, output is placed into a format that is the same as input for ease of explanation. It should be understood that output could be written in other formats (e.g., output could be directly written to an electronic file).

In this example, indicator 1824 indicated there is no relevant data program component (i.e. one worth accelerating). Additionally, an explicit indicator 1826 could be used to show that there was no key provided for partitioning and grouping data in the data component. However, this could also be inferred implicitly from checking the indicator 1824 without the use of an indicator 1826.

As shown in the flow diagram 1900, using Spark SQL 1932, the data are read from a table 1930 into a DDS of row objects (e.g., Spark row objects) 1934. Each Row object represents a record. The DDS 1934 is applied to the specialized Embedded Process function DatasetToDatasetFunction 1936, where the thread program is executed in parallel. The output produced by the thread program is stored in the output DDS 1946 of one or more row objects. The output DDS 1946 are inserted into the output table 1950 using a DataFrameWriter interface 1948.

Figure 19B:
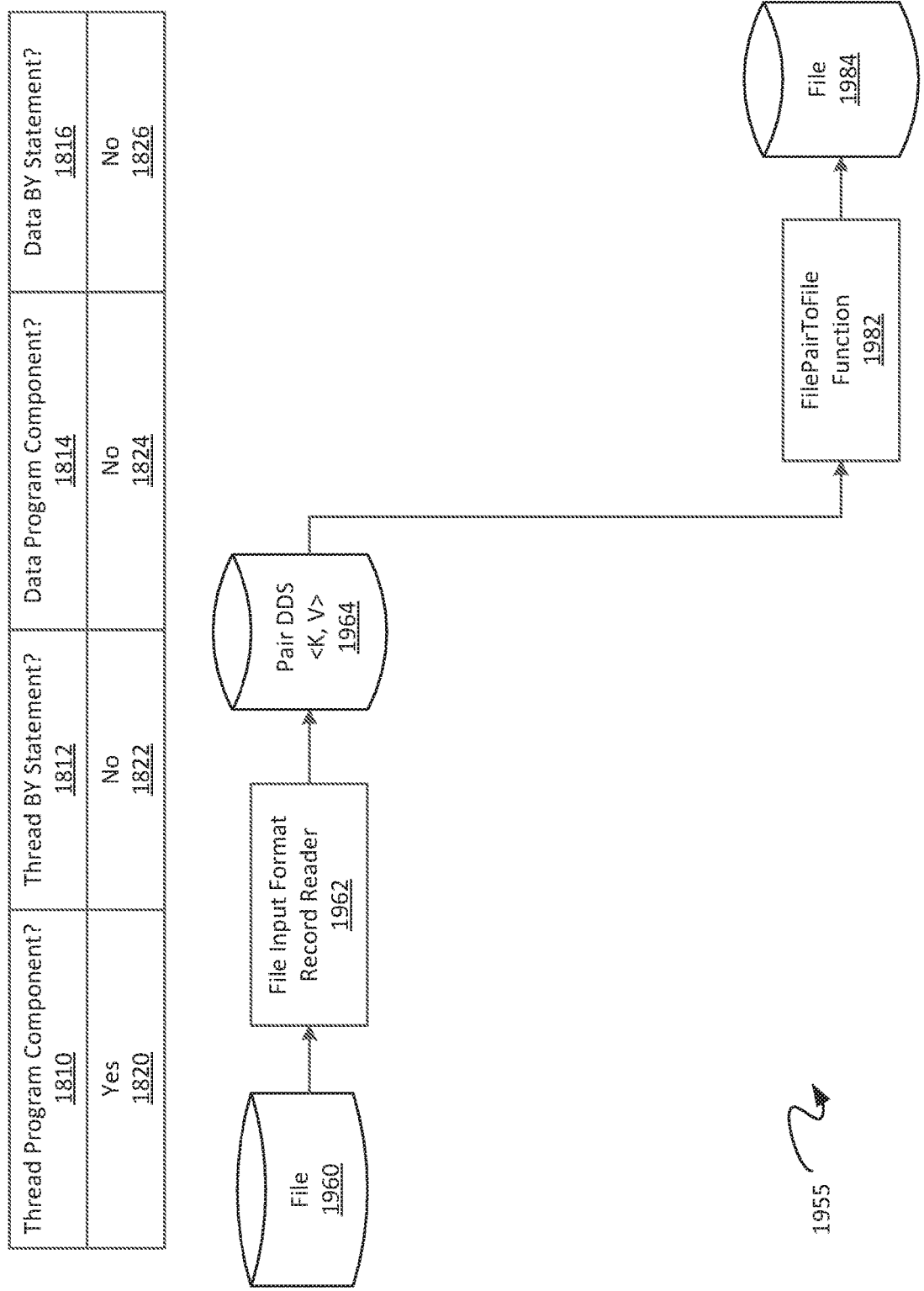
FIG. 19B illustrates a flow diagram for a data file according to program indicators in at least one embodiment of the present technology.

FIG. 19B illustrates a flow diagram 1955 for a data file 1960 according to program indicators corresponding to case (1). In this example, the stored data is stored at the server in an electronic file 1960.

In one or more embodiments, a computing system determines whether the thread program component specifies information for partitioning the stored data. When the thread program component does not specify information for partitioning the stored data, generate the computer-generated computer instructions to set a value for a key for the DDS. In this case the value can be disregarded (e.g., by setting it to a NULL value). This can indicate to the computing system to distribute the data amongst partitions based on other considerations (e.g., distributing load amongst available computing nodes). As explained other alternative DDS could be used (e.g., DDS <row>).

In the code generated according to flow diagram 1955, data is read from file 1960 into a key/value pair DDS 1964 using a File Input Format and Record Reader 1962 (e.g. a type of File Input Format and Record Reader can be provided by Hadoop®). The record key is ignored, and the value contains the record data. The pair DDS 1964 is applied to the specialized Embedded Process function FilePairToFileFunction 1982, where the DS2 thread program is executed in parallel. The output produced by the thread program component is written directly to a file 1984 (e.g., one stored in HDFS).

Figure 20A:
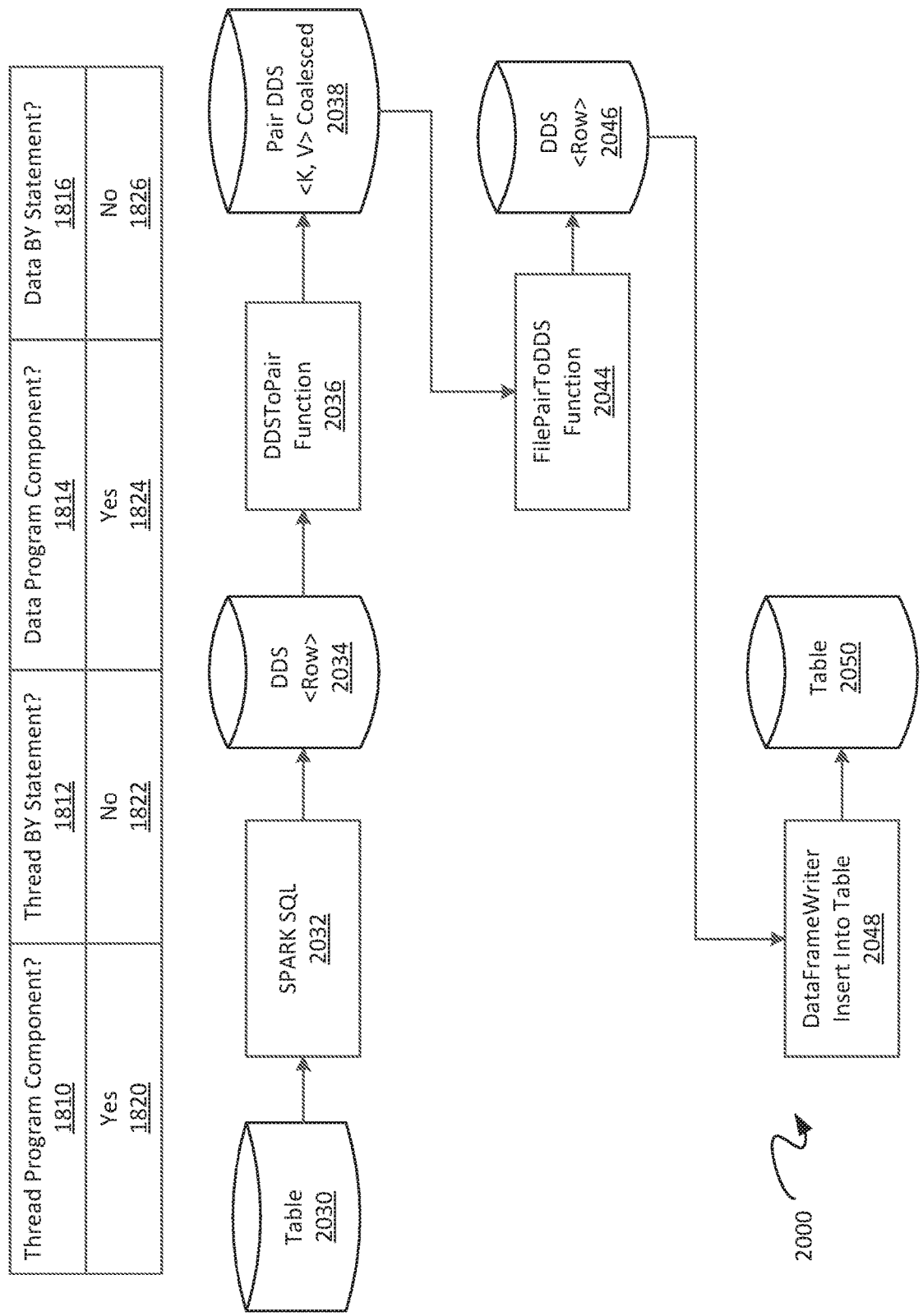
FIG. 20A illustrates a flow diagram for a data table according to program indicators in at least one embodiment of the present technology.

FIG. 20A illustrates a flow diagram 2000 for a data table 2030 according to program indicators corresponding to case (2). In case (2) there is a thread and a data program component, none of them with a BY statement. An example DS2 thread program 2090 according to case (2) is shown in FIG. 20C. This DS2 thread program 2090 runs in two phases. The DS2 thread program component 2092 runs in phase one and its tasks are executed in parallel. The DS2 data program component 2094 runs in phase two using one single task.

In one or more embodiments, a computer system determines whether the program comprises a relevant data program component capable of execution in parallel (e.g., data program component 2094). For instance, in this case parsing the code would reveal mathematical operations 2098 in the data program component. Responsive to determining that the program comprises the relevant data program component, the computer system generates the computer-generated computer instructions to specify partitioning and grouping the output of the thread program component into multiple sets of partitioned output. The computer-generated computer instructions specify to distribute the multiple sets of partitioned output on computing nodes for performing parallel execution of the data program instructions of the data program component for each of the multiple sets of partitioned output (e.g., as part of a second phase).

As an example, in phase one, using Spark SQL 2032, data is read from a table 2030 into DDS 2034 (e.g., a data set of row objects where row object represents a record). The DDS 2034 is applied to the specialized Embedded Process function DatasetToPairFunction 2036 where a received thread program component (e.g., thread program component 2092) is executed in parallel. The data produced by the thread program is coalesced into a key/value pair DDS 2038.

In phase two, the coalesced pair DDS 2038 is applied to the specialized Embedded Process function FilePairToDatasetFunction 2044, where the data program component (e.g., data program component 2094) is executed as a single task. The output produced by the data program component is stored in the output DDS 2046 (e.g., a DDS of row objects). The output DDS 2046 (i.e. rows) are inserted into the output table 2050 using the DataFrameWriter interface 2048.

As mentioned with respect to other examples any DDS implemented in a pair or row style in examples, could be implemented in an alternative DDS structure with appropriate corrections to generated functions. For example, DDS 2038 is shown as a DDS with <K, V>, but it could alternatively be implemented with rows where all the rows with the same key are stored on the same DDS. In this case the Embedded Process function on either end would be used to do a dataset-to-dataset type function.

In one or more embodiments, a computing system determines whether the data program component specifies the information for partitioning and grouping the output of the thread program component using a key. In one or more embodiments, when the data program component does not specify information for partitioning and grouping the output of the thread program component using a key (e.g., in FIG. 20A), a single DDS is created for executing the data program on the single DDS (e.g., DDS 2046).

Figure 20B:
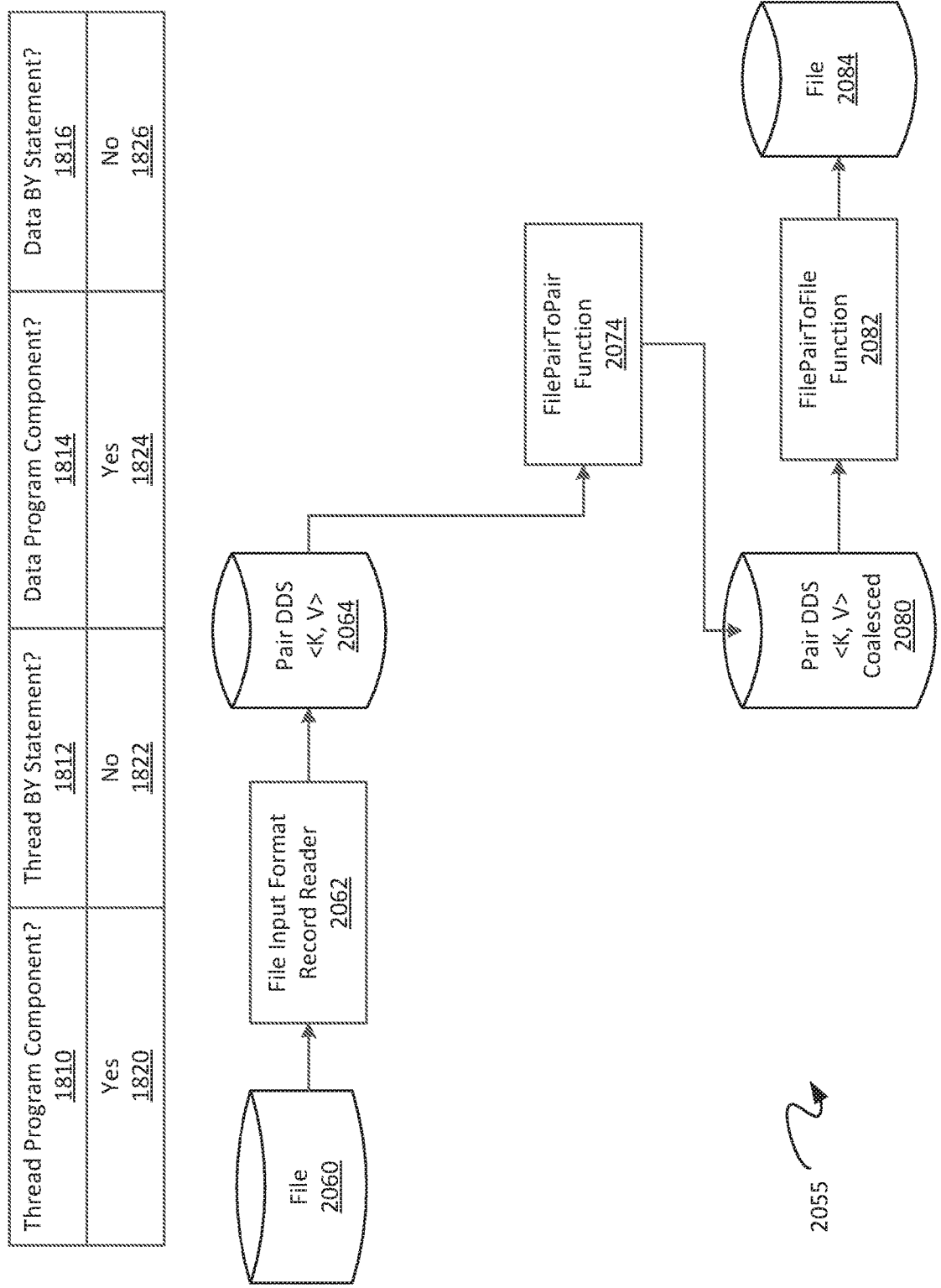
FIG. 20B illustrates a flow diagram for a data file according to program indicators in at least one embodiment of the present technology.

FIG. 20B illustrates a flow diagram 2055 for a file 2060 according to program indicators corresponding to case (2).

In phase one, data are read from file 2060 into a key/value pair DDS 2064 using a File Input Format and Record Reader (e.g., a type of File Input Format and Record Reader is provided by Hadoop®). The record key is ignored, and the value contains the record data. The pair DDS 2064 is applied to the specialized Embedded Process function FilePairToPairFunction 2074, where the thread program component (e.g., thread program component 2092) is executed in parallel. The output produced by the thread program component is coalesced into a key/value pair DDS 2080.

In phase two, the coalesced pair DDS 2080 is applied to the specialized Embedded Process function, FilePairToFileFunction 2082 where the data program component is executed as a single task. The output produced by the data program component is written directly to an electronic file 2084 (e.g., one stored in HDFS).

Figure 21A:
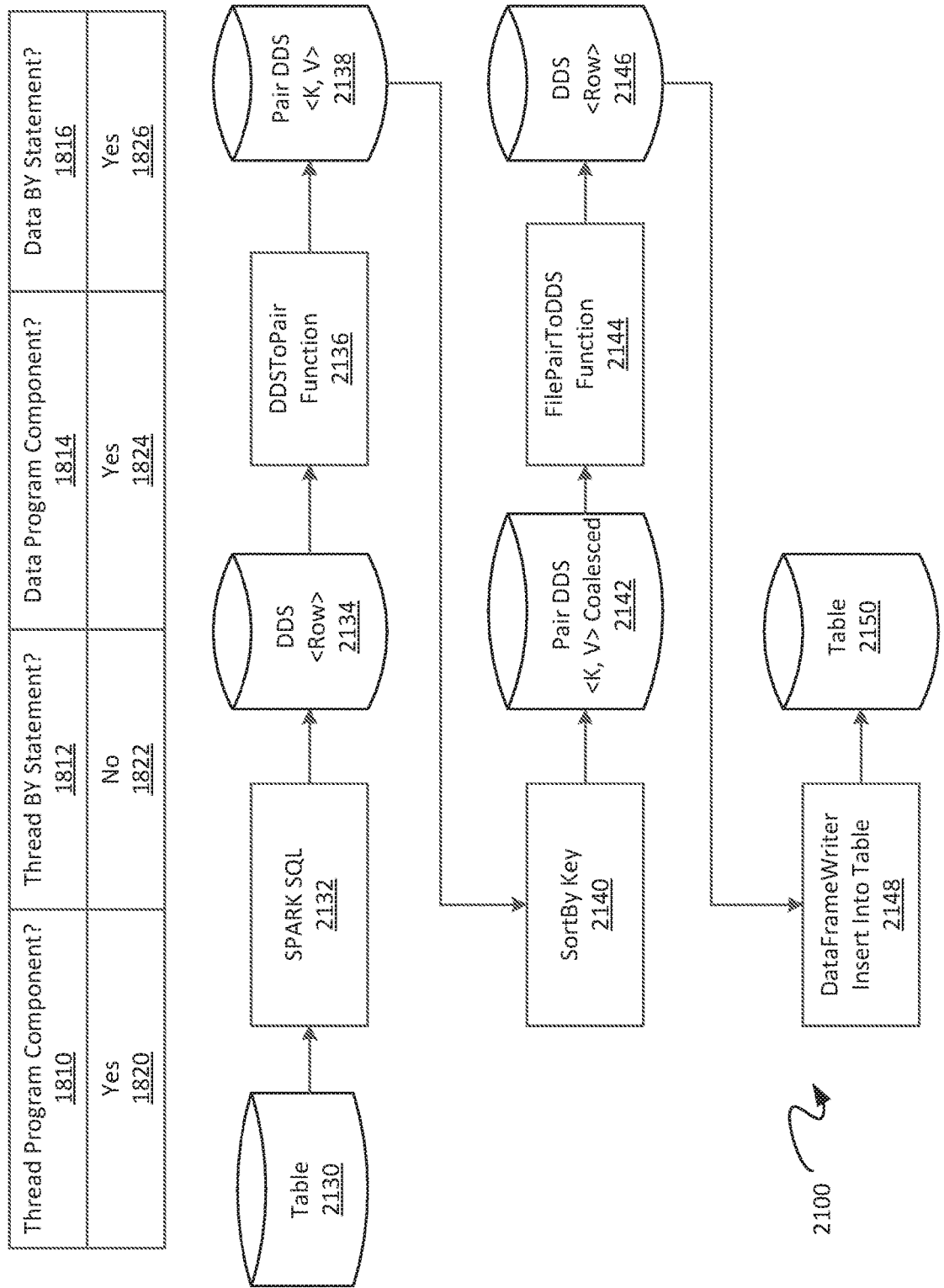
FIG. 21A illustrates a flow diagram for a data table according to program indicators in at least one embodiment of the present technology.

FIG. 21A illustrates a flow diagram 2100 for a data table 2130 according to program indicators according to case (3). In case (3), there is a thread program component with no BY statement and a data program component with a BY statement. An example DS2 thread program 2190 according to case (3) is shown in FIG. 21C with a thread program component 2192 and a data program component 2194. The data program component 2914 contains a BY statement 2196 and computer instructions 2188 comprising logical operators. The entire DS2 thread program 2190 runs in two phases. The thread program component 2192 runs in phase one and its tasks are executed in parallel. Output data from the thread program component can be sorted by the columns specified in the BY statement 2196 of the data program component 2194. The DS2 data program 2190 runs in phase two using one single task.

In phase one, using Spark SQL 2132, the data is read from a table 2130 into a DDS 2134 (e.g., of row objects, where each row object represents a record). The DDS 2134 is applied to the specialized Embedded Process function DatasetToPairFunction 2136, where the thread program component is executed in parallel. The output produced by the thread program component is stored in a key/value pair DDS 2138. The DDS 2138 key is the columns specified in the BY statement (e.g., BY statement 2196) of the data program component (e.g., data program component 2194). The pair DDS 2138 is sorted (e.g., SortBy Key function 2140) and coalesced into another pair DDS 2142 that is used as input for the next phase.

In phase two, the coalesced pair DDS 2142 is applied to the specialized Embedded Process function FilePairToDatasetFunction 2144, where the data program component is executed as a single task. The output produced by the data program component is stored in the output DDS 2146 (e.g., of row objects). Output rows are inserted into the output table 2150 using the DataFrameWriter interface 2148.

In one or more embodiments, a computing device determines whether the data program component specifies information for partitioning and grouping the output of the thread program component (e.g., by parsing the data program component and discovering BY statement 2196). Responsive to determining that the data program component specifies information for partitioning and grouping the output of the thread program component using a particular key, a computing system described herein generates the computer-generated computer instructions to specify sorting the output of the thread program component according to the information for partitioning the output of the thread program component. For instance, output data from the thread program component can be sorted by car make as specified in the BY statement 2196 of the data program component 2194. Additionally, or alternatively, when the data program component specifies the information for partitioning and grouping the output of the thread program component using a key, the key of the DDS (e.g., pair DDS 2138) is set by the computing system using the information for partitioning output of the thread program component, and data of the DDS is sorted into another DDS (e.g., DDS 2142) for executing the data program.

Figure 21B:
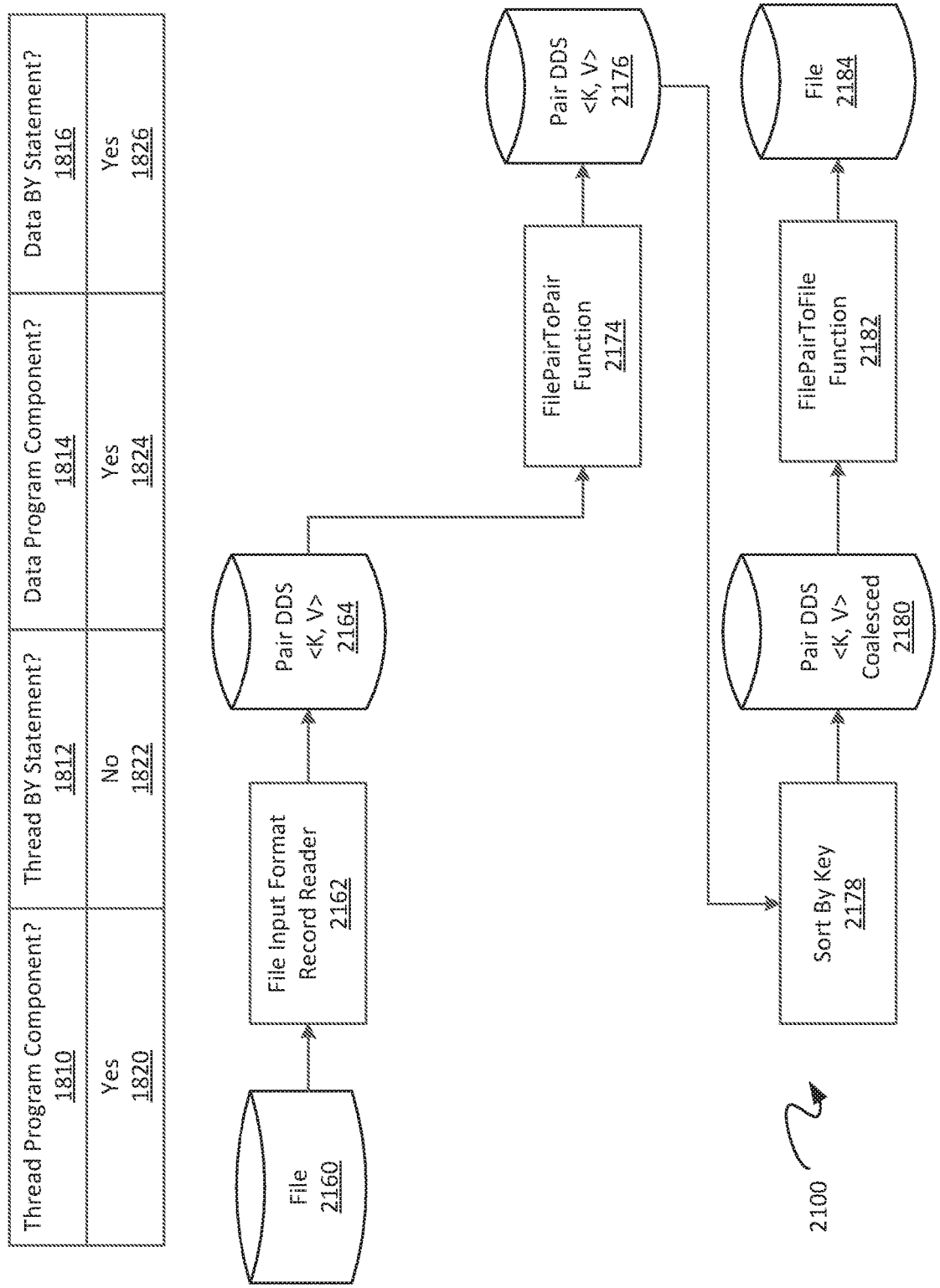
FIG. 21B illustrates a flow diagram for a data file according to program indicators in at least one embodiment of the present technology.

FIG. 21B illustrates a flow diagram for a data file according to program indicators according to case (3).

As shown in phase one, data is read from a file 2160 into a key/value pair DDS 2164 using a File Input Format and Record Reader 2162. The key is ignored, and the value contains the record data. The pair DDS 2164 is applied to the specialized Embedded Process function FilePairToPairFunction 2174, where the thread program component (e.g., thread program component 2192) is executed in parallel. The output produced by the thread program component is stored in a key/value pair DDS 2176. The key is the columns specified in the BY statement of the data program component (e.g., by statement 2196 of data program component 2194). The pair DDS 2176 is sorted (e.g., by SortBy Key 2178) and coalesced into another pair DDS 2180 that is used as input for the next phase.

In phase two, the coalesced pair DDS 2180 is applied to the specialized Embedded Process function FilePairToFileFunction 2182, where the data program component (e.g., data program component 2194) is executed as a single task. The output produced by the data program component is written directly to a file 2184 (e.g., stored in HDFS).

Figure 22A:
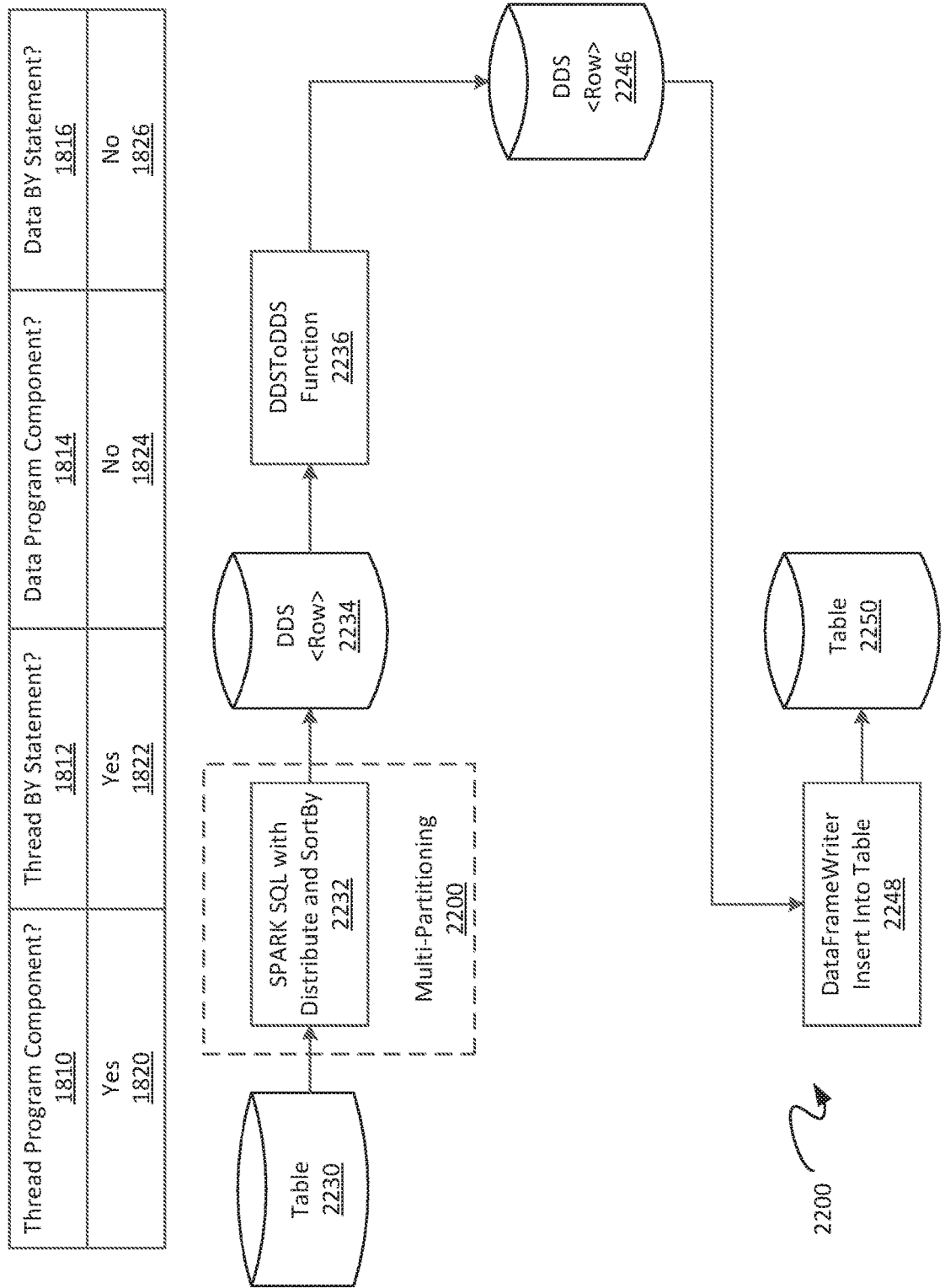
FIG. 22A illustrates a flow diagram for a data table according to program indicators in at least one embodiment of the present technology.

FIG. 22A illustrates a flow diagram for a data table 2230 according to program indicators corresponding to case (4). In case (4) there is a thread program with a BY statement and no data program. An example DS2 thread program 2290 according to case (4) is shown in FIG. 22C. The thread component 2292 comprises a BY statement 2296. The input data are partitioned and sorted within the partition by the columns specified in the BY statement 2296 of the thread program component 2292. All records with a same key end up in the same partition. The thread program component runs in parallel using multiple tasks. However, the data program component 2294 in DS2 thread program 2290 does not contain logic worth accelerating. For instance, it contains merely SET and OUTPUT operators in the data program component 2294. Therefore, the data program component 2294 is not executed in accelerated mode inside a Spark® server.

The columns specified in the BY statement of the DS2 thread program are used in the Spark SQL 2232 that uses a SELECT statement with the DISTRIBUTE BY and SORT BY clauses. Data is read from a table 2230 into a partitioned, and sorted within partition, DDS 2234 (e.g., a DDS of row objects). Accordingly, the sorting within partition specifies a multi-partitioning scheme 2200. The DDS 2234 is applied to the specialized Embedded Process function DatasetToDatasetFunction 2236, where the thread program component (e.g., thread program component 2292) is executed in parallel. The output produced by the thread program component is stored in the output DDS 2246 (e.g., of row objects). The output rows are inserted into the output table 2250 using the DataFrameWriter interface 2248.

In one or more embodiments, a computing system determines whether a thread program component (e.g., thread program component 2292) specifies information for partitioning and grouping the stored data using a key. For instance, when the thread program component specifies information for partitioning and grouping the stored data using a key, the computing system can generate the computer-generated computer instructions to extract the stored data from the electronic table into multiple object records (e.g., into DDS 2234) based on the key. Additionally, or alternatively, responsive to determining that the thread program component specifies the information for partitioning and grouping the stored data using a key, the computing system can generate the computer-generated computer instructions to specify a multi-partitioning scheme 2200 (e.g., performed by a Spark server).

Figure 22B:
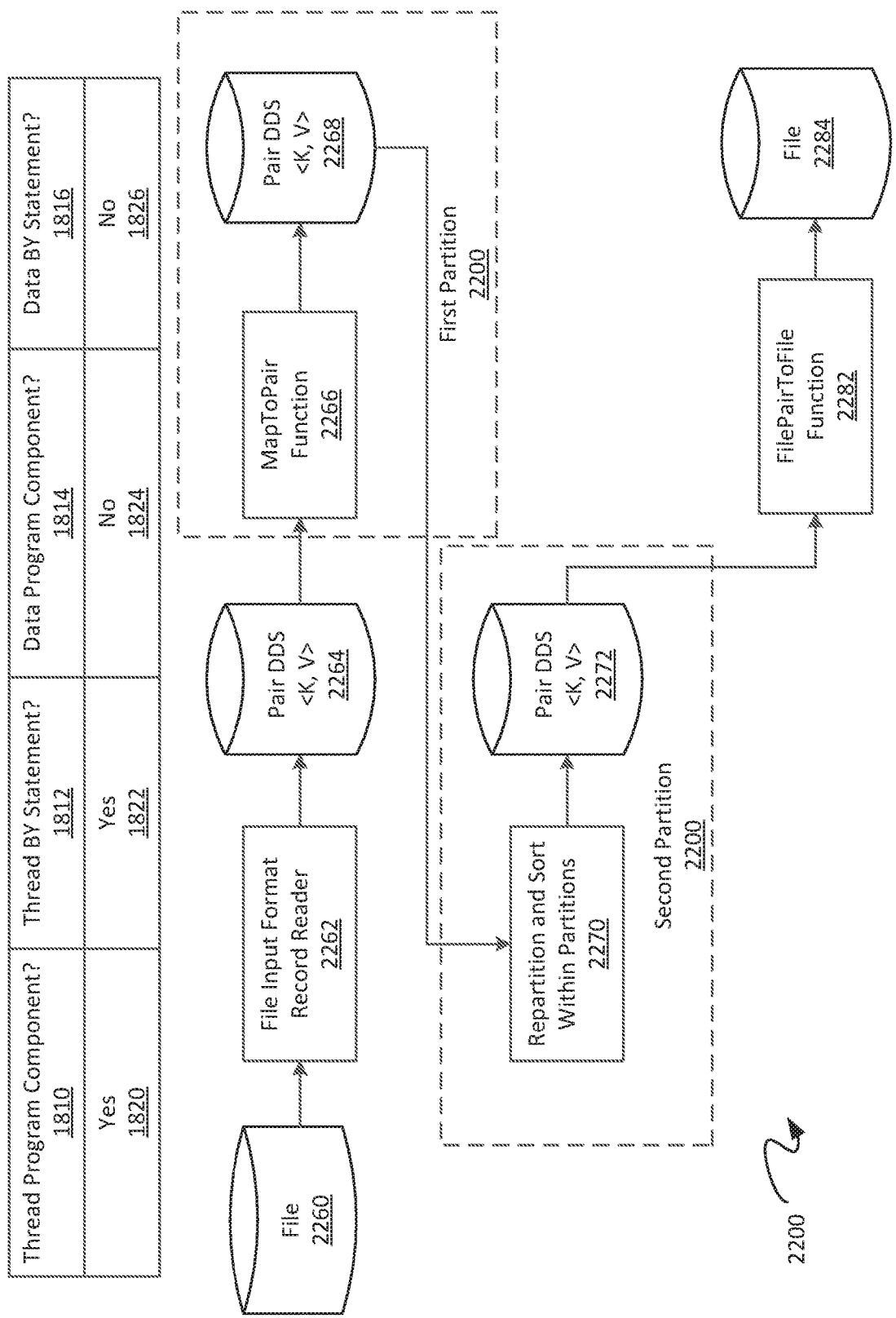
FIG. 22B illustrates a flow diagram for a data file according to program indicators in at least one embodiment of the present technology.

FIG. 22B illustrates a flow diagram for a data file according to program indicators corresponding to case (4). Data is read from a file 2260 into a key/value pair DDS 2264 using the File Input Format and Record Reader 2262.

In one or more embodiments, a computing system determines whether the thread program component specifies information for partitioning the stored data. When the thread program component specifies information for partitioning the stored data, the computing system generates the computer-generated computer instructions to extract data from the electronic file into a DDS comprising a key and value. The key is set using a key indicated by the information.

As shown in FIG. 22B, using the columns specified in the thread program BY statement (e.g., BY statement 2296), the pair DDS 2264 is applied to the specialized function MapToPairFunction to create a mapped pair DDS 2268 (e.g. with proper key and value pair) or a first partition. Using the key, the mapped pair DDS 2268 is repartitioned with sorting within partitions 2270, specifying a second different partition of a multi-partitioning scheme. This results in a new pair DDS 2272 partitioned by the key, where the keys within the partitions are sorted. The stored data is distributed onto computing nodes for performing the execution in parallel of the one or more of the computer operations of the thread program component on each of the multiple sets of partitioned data. For instance, the partitioned pair DDS 2272 is applied to the specialized Embedded Process function FilePairToFileFunction 2282, where the thread program component runs in parallel. The output produced by the thread program component is written directly to a file 2284 (e.g., a file stored in HDFS). This is because the data program component does not have any logic worth accelerating.

Figure 23A:
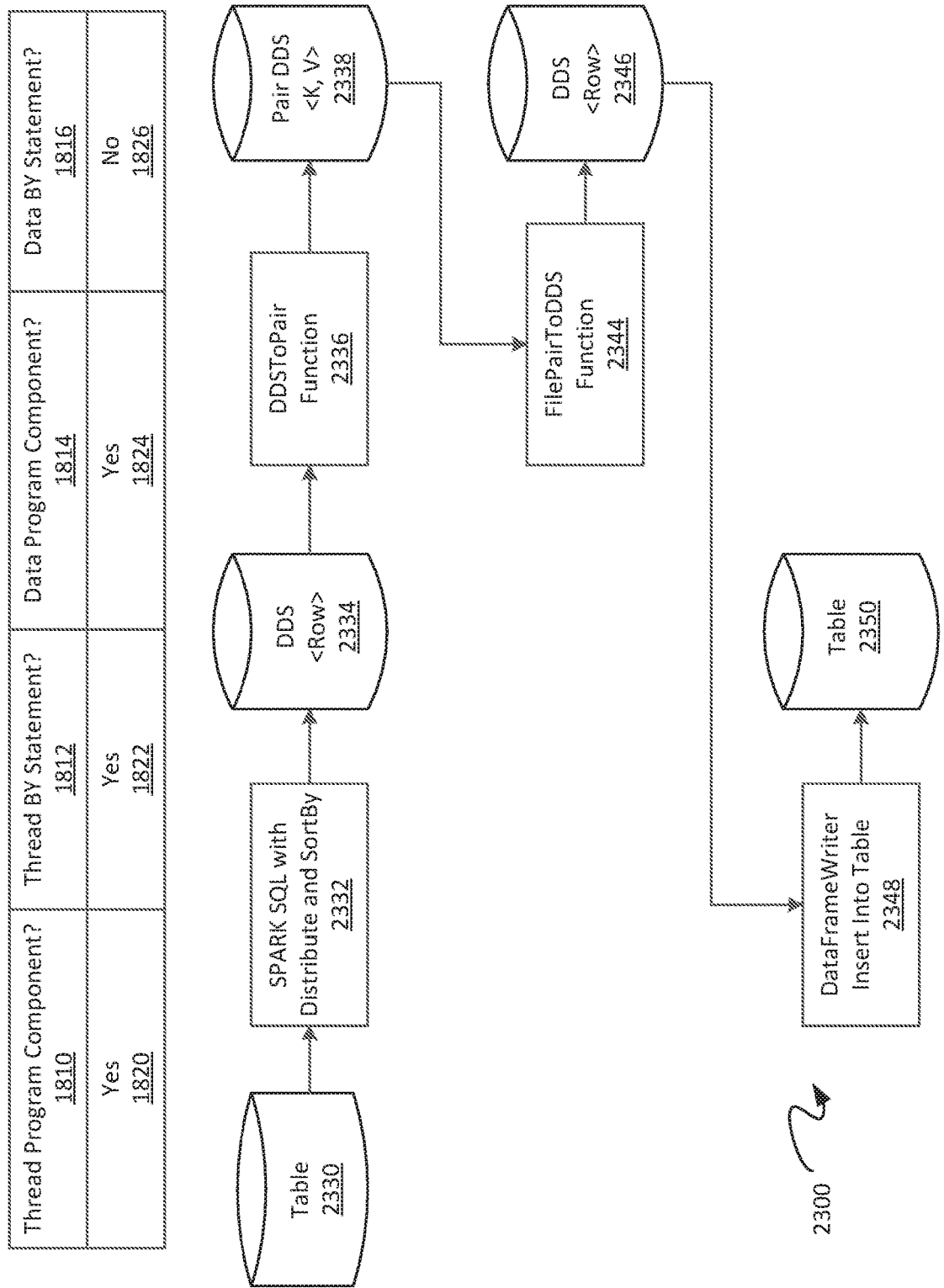
FIG. 23A illustrates a flow diagram for a data table according to program indicators in at least one embodiment of the present technology.

FIG. 23A illustrates a flow diagram for a data table according to program indicators corresponding to case (5). In case (5) there is a thread program component with a BY statement and a data program component with no BY statement. An example DS2 thread program 2390 according to case (5) is shown in FIG. 23C. The thread program component 2392 comprises a BY statement 2396. This DS2 thread program 2390 runs in two phases. The DS2 thread program component 2392 runs in phase one and its tasks are executed in parallel. The DS2 data program component 2394 runs in phase two using one single task.

In phase one, the columns specified in the BY statement of the thread program component (e.g., BY statement 2396 of thread program component 2392) are used in the Spark® SQL 2332 that uses a SELECT statement with the DISTRIBUTE BY and SORT BY clauses. Data is read from a table 2330 into a partitioned, and sorted within partition, DDS 2334 (e.g., a DDS of row objects). Accordingly, the sorting within partition specifies a multi-partitioning scheme. The DDS 2334 is applied to the specialized Embedded Process function DatasetToDatasetFunction 2336, where the thread program component (e.g., thread program component 2392) is executed in parallel.

In phase two, the pair DDS 2338 produced by the thread program component is applied to the specialized Embedded Process function FilePairToDatasetFunction 2344, where the data program component (e.g., data program component 2394) runs a single task. The rows in the output DDS 2246 produced by the data program component are inserted into the output table 2350 using the DataFrameWriter Insert into Table interface 2348.

Figure 23B:
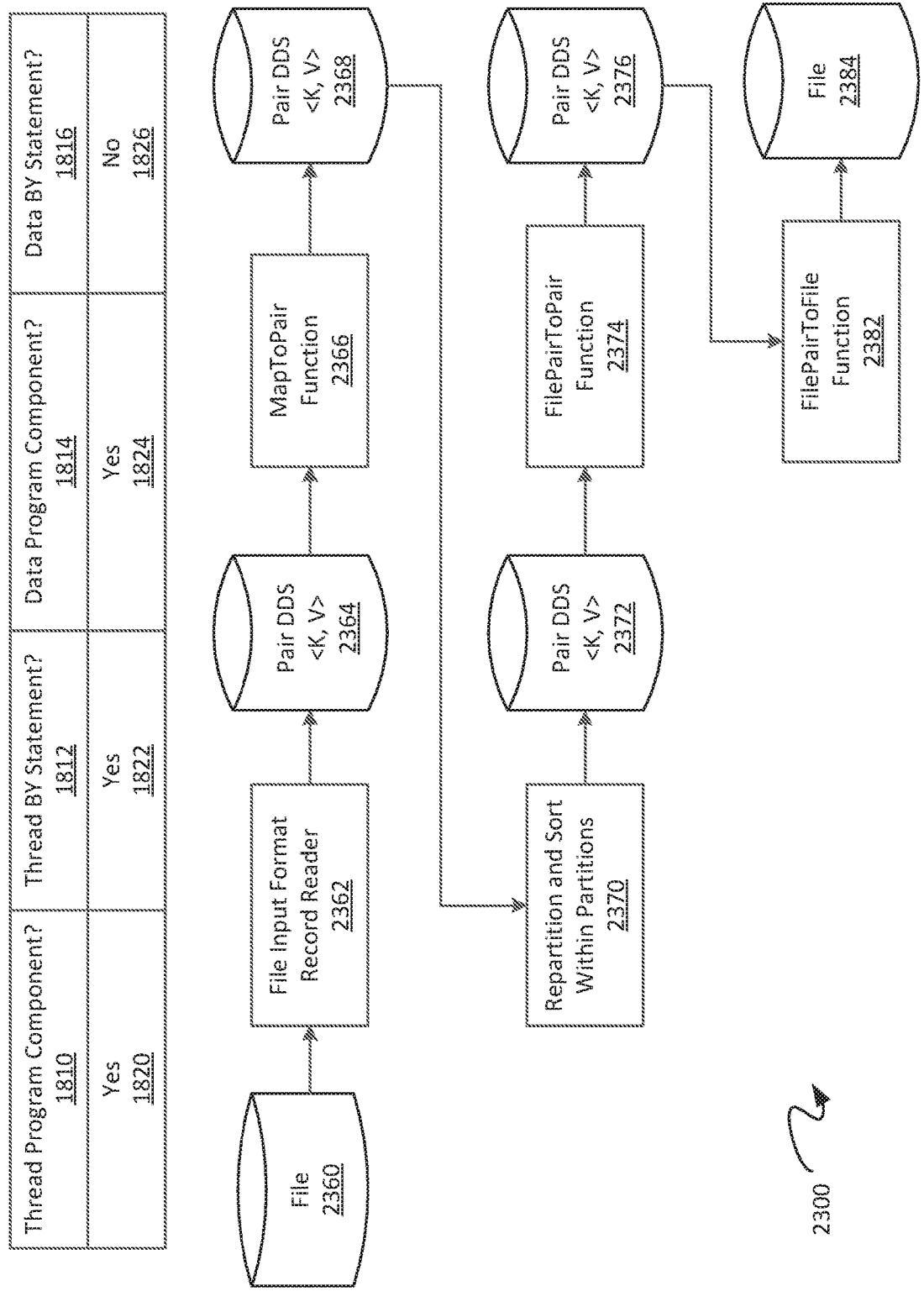
FIG. 23B illustrates a flow diagram for a data file according to program indicators in at least one embodiment of the present technology.

FIG. 23B illustrates a flow diagram for a data file according to program indicators corresponding to case (5).

In phase one, data is read from a file 2360 using the File Input Format and Record Reader 2362 into a key/value pair DDS 2364. Using the columns specified in the BY statement of the thread program component (e.g., thread program component 2392), the pair DDS 2364 is applied to the specialized function MapToPairFunction 2366 to create a mapped pair DDS 2368 with proper key and value pair of a first partition of a multi-partitioning scheme. Using the key, the mapped pair DDS 2368 is repartitioned into a second partition of the multi-partitioning scheme with Sort within Partitions 2370 resulting in a new pair DDS 2372 partitioned by the key, where the keys within the partitions are sorted. The partitioned pair DDS 2372 is applied to the specialized Embedded Process function FilePairToPairFunction 2374, where the thread program component runs in parallel.

In phase two, the pair DDS 2376 produced by the thread program component is applied to the specialized Embedded Process function FilePairToFileFunction 2382, where the data program runs a single task. The output produced by the data program component (e.g., data program component 2394) is written directly to a file 2384 (e.g., stored in HDFS).

Figure 24A:
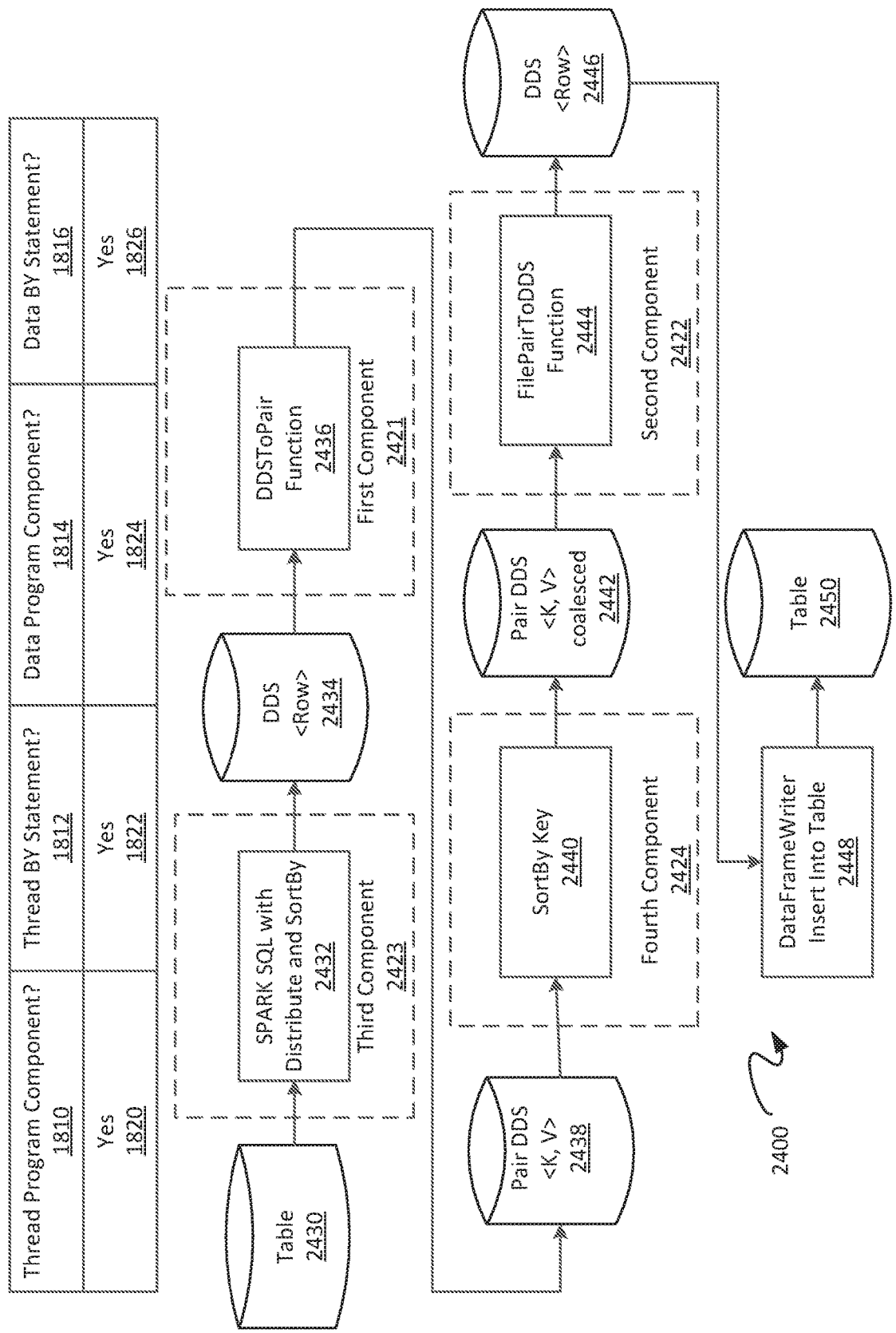
FIG. 24A illustrates a flow diagram for a data table according to program indicators in at least one embodiment of the present technology.

FIG. 24A illustrates a flow diagram for a data table according to program indicators corresponding to case (6). In case (6) there is a thread program component and a data program component, neither of them with a BY statement. An example thread program 1890 according to case (6) is shown in FIG. 18. This thread program 1890 runs in two phases. The thread program component 1832 runs in phase one and its tasks are executed in parallel. The data program component 1836 runs in phase two using one single task.

In this example, indicators 1820, 1822, 1824, and 1826 are all positive indicating the presence of features 1810, 1812, 1814, and 1816 described herein.

In one or more embodiments, a computing system generates a first component (e.g., first component 2421) of the computer-generated computer instructions when a first indicator 1820 indicates the program comprises the thread program component. Additionally, the computing system can generate a second component (e.g., second component 2422) of the computer-generated computer instructions when a second indicator 1824 indicates the program comprises the data program component. Additionally, the computing system can generate a third component (e.g., third component 2423) of the computer-generated computer instructions when the third indicator 1822 indicates the thread program component specifies the information for partitioning and grouping the stored data using a first key. Additionally, the computing system can generate a fourth component (e.g., fourth component 2424) of the computer-generated computer instructions when the fourth indicator 1826 indicates whether the data program component specifies the information for partitioning and grouping the output of the thread program component using the second key. The first component, the second component, the third component and the fourth component can all comprise different sets of computer instructions.

In phase one, the columns specified in the BY statement of the thread program component (e.g., instruction 1830 of thread program component 1832) are used in the Spark® SQL 2432 that uses a SELECT statement with the DISTRIBUTE BY and SORT BY clauses. Data is read from a table 2430 into a partitioned, and sorted within partition, DDS 2434 (e.g., a DDS of row objects). Accordingly, the sorting within partition specifies a multi-partitioning scheme. The DDS 2434 is applied to the specialized Embedded Process function DatasetToPairFunction 2436, where the thread program component (e.g., thread program component 1832) is executed in parallel.

In phase two, the pair DDS 2438 produced by the thread program component is sorted 2440 into a new coalesced pair DDS 2442, which is applied to the specialized Embedded Process function FilePairToDatasetFunction 2444, where the data program component (e.g., data program component 1836) runs a single task. The rows in the output DDS 2446 produced by the data program component are inserted into the output table 2450 using the DataFrameWriter interface 2448.

Figure 24B:
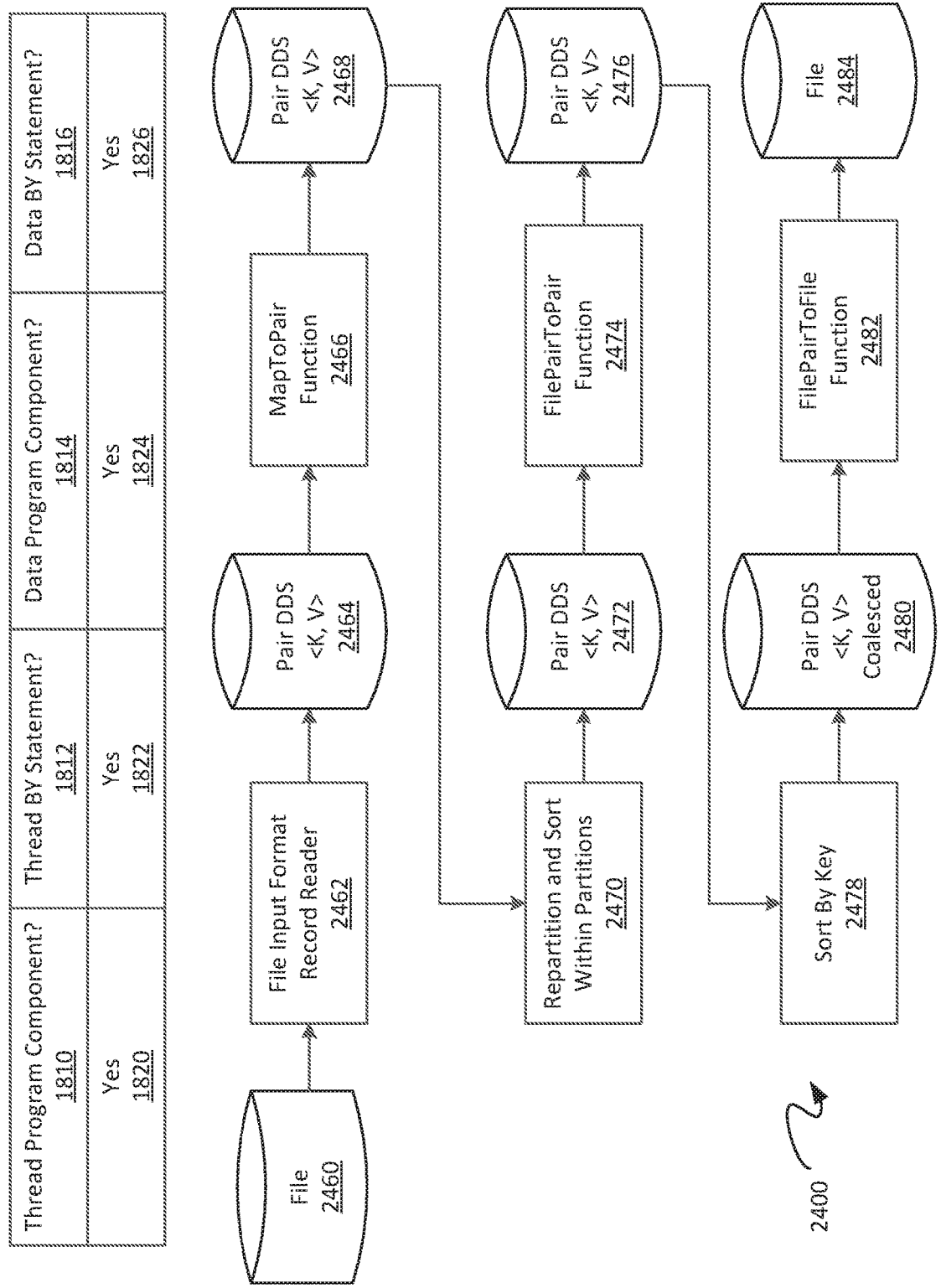
FIG. 24B illustrates a flow diagram for a data file according to program indicators in at least one embodiment of the present technology.

FIG. 24B illustrates a flow diagram for a data file 2460 according to program indicators corresponding to case (6).

In phase one, data are read from a file 2460 using the File Input Format and Record Reader 2462 into a key/value pair DDS 2464. Using the columns specified in the thread program (e.g., instruction 1830), the pair DDS 2464 is applied to the specialized function MapToPairFunction 2466 to create a mapped pair DDS 2468 with proper key and value pair.

Using the key, the mapped pair DDS 2468 is repartitioned with sorting within partitions 2470 resulting in a new pair DDS 2472 partitioned by the key, where the keys within the partitions are sorted. The partitioned pair DDS 2472 is applied to the specialized Embedded Process function FilePairToPairFunction 2474, where the thread program component (e.g., thread program component 1832) runs in parallel.

In phase two, the pair DDS 2476 produced by the thread program component is sorted 2478 and coalesced into a new pair DDS 2480, which is applied to the specialized Embedded Process function FilePairToFileFunction 2482, where the data program component (e.g., data program component 1836) runs a single task. The output produced by the data program component is written directly to a file 2484 (e.g., stored in HDFS).

What is claimed is:

1. A computer-program product tangibly embodied in a non-transitory machine-readable storage medium, the computer-program product including system instructions operable to cause a computing system to:
   receive, at a server of the computing system, a program, in a first computer language, specifying computer operations on stored data, wherein the computing system is configured to partition the stored data into multiple sets of partitioned data for performing parallel execution of one or more of the computer operations on each of the multiple sets of partitioned data;
   determine whether the program comprises a thread program component, wherein thread operations of the thread program component comprise computer instructions for execution in parallel of the one or more of the computer operations on each of the multiple sets of partitioned data;
   responsive to determining that the program comprises the thread program component, generate, at the server, computer-generated computer instructions in a second computer language by selecting from multiple possible options, wherein the multiple possible options are for generating computer instructions for executing, in the second computer language that is different than the first computer language, the one or more of the computer operations in parallel, wherein the selecting from the multiple options is dependent on at least two of:
      whether the thread program component specifies data key information for partitioning and grouping the stored data using a first key indicated by the data key information;
      whether the program comprises a data program component comprising data program instructions for operations capable of execution in parallel on output data that is output from execution of the thread program component; and
      whether the data program component specifies output key information for partitioning and grouping the output data of the thread program component using a second key indicated by the output key information; and
   execute, by the server, the program according to the computer-generated computer instructions in the second computer language.

2. The computer-program product of claim 1, wherein the system instructions are operable to cause the computing system to:
   receive the program from a client remote from the server and the computing system, the program comprising text-based, user-written computer instructions written by a user of the client;
   execute the program on the stored data stored in the computing system; and
   transmit a result of executing the program to the client; and
   wherein the first computer language is a computer language readable by the client, and the second computer language is a computer language readable by the computing system.

3. The computer-program product of claim 1, wherein the system instructions are operable to cause the computing system to execute the program according to the computer-generated computer instructions in the second computer language by requesting the computing system to:
   partition the stored data into the multiple sets of the partitioned data; and
   distribute a respective one of the multiple sets of the partitioned data to a respective one of different computing nodes of the computing system for executing the one or more of the computer operations on the respective one of the multiple sets of the partitioned data.

4. The computer-program product of claim 1, wherein the system instructions are operable to cause the computing system to:

set a first indicator indicating whether the program comprises the thread program component;
set a second indicator indicating whether the program comprises the data program component;
set a third indicator indicating whether the thread program component specifies the information for partitioning and grouping the stored data using the first key;
set a fourth indicator indicating whether the data program component specifies the information for partitioning and grouping the output data of the thread program component using the second key; and
generate, based on checking the first indicator, the second indicator, the third indicator, and the fourth indicator, the computer-generated computer instructions in the second computer language by:
generating a first component of the computer-generated computer instructions in the second computer language when the first indicator indicates the program comprises the thread program component;
generating a second component of the computer-generated computer instructions in the second computer language when the second indicator indicates the program comprises the data program component;
generating a third component of the computer-generated computer instructions in the second computer language when the third indicator indicates the thread program component specifies the information for partitioning and grouping the stored data using the first key; and
generating a fourth component of the computer-generated computer instructions in the second computer language when the fourth indicator indicates whether the data program component specifies the information for partitioning and grouping the output of the thread program component using the second key,
wherein the first component, the second component, the third component and the fourth component comprise different sets of computer instructions.

5. The computer-program product of claim 1, wherein the system instructions are operable to cause the computing system to:
determine whether the thread program component specifies the data key information for partitioning and grouping the stored data using the first key;
responsive to determining that the thread program component specifies the information for partitioning and grouping the stored data using the first key, generate the computer-generated computer instructions in the second computer language to specify a multi-partitioning scheme comprising:
a first partition in which the stored data is partitioned and grouped according to the first key; and
a second partition, different from the first partition, in which the stored data is distributed onto computing nodes for performing the execution in parallel of the one or more of the computer operations of the thread program component on each of the multiple sets of partitioned data.

6. The computer-program product of claim 1, wherein the system instructions are operable to cause the computing system to:
determine whether the program comprises the data program component; and
responsive to determining that the program comprises the data program component, generate the computer-generated computer instructions in the second computer language to specify:
partitioning and grouping the output data of the thread program component into multiple sets of partitioned output; and
distributing the multiple sets of partitioned output on computing nodes for performing parallel execution of the data program instructions of the data program component for each of the multiple sets of partitioned output.

7. The computer-program product of claim 6, wherein the system instructions are operable to cause the computing system to:
determine whether the program comprises a data program component comprising the data program instructions for the operations capable of execution in parallel on the output data of the thread program component by parsing the program for one or more of arithmetic operators, conditional operators, relational operators, logical operators, and assignment operators.

8. The computer-program product of claim 6, wherein the system instructions are operable to cause the computing system to:
determine whether the data program component specifies information for partitioning and grouping the output data of the thread program component using the second key; and
responsive to determining that the data program component specifies information for partitioning and grouping the output of the thread program component using the second key, generate the computer-generated computer instructions in the second computer language to specify sorting the output of the thread program component according to the information for partitioning the output of the thread program component.

9. The computer-program product of claim 1,
wherein the stored data is stored at the server in an electronic file; and
wherein the system instructions are operable to cause the computing system to:
determine whether the thread program component specifies information for partitioning the stored data;
when the thread program component specifies information for partitioning the stored data, generate the computer-generated computer instructions in the second computer language to extract data from the electronic file into a distributed data set (DDS) set comprising a set key and value, the set key for indexing data of the value, wherein the set key is set using the first key;
when the thread program component does not specify information for partitioning the stored data, generate the computer-generated computer instructions in the second computer language to indicate to distribute the data amongst partitions based on load considerations; and
execute the program according to the computer-generated computer instructions in the second computer language by generating the DDS.

10. The computer-program product of claim 1,
wherein the stored data is stored at the server in an electronic table; and
wherein the system instructions are operable to cause the computing system to:
determine whether the thread program component specifies information for partitioning and grouping the stored data using the first key;
when the thread program component specifies information for partitioning and grouping the stored data using the first key, generate the computer-generated computer instructions in the second computer language to extract the stored data from the electronic table into multiple object records based on the first key;

when the thread program component does not specify information for partitioning and grouping the stored data using the first key, generate the computer-generated computer instructions in the second computer language to extract the stored data from the electronic table into a single object record; and execute the program according to the computer-generated computer instructions in the second computer language by generating one or more object records.

11. The computer-program product of claim 1,
wherein the stored data is stored at the server in a first electronic file or table; and
wherein the system instructions are operable to cause the computing system to:
  determine whether the program comprises a data program component comprising data program instructions for operations capable of execution in parallel on the output data of the thread program component;
  when the program comprises the data program component:
    distribute the output of the thread program into a distributed data set (DDS) set; and
    write the output of the data program component directly to a second electronic file or table;
  when the program does not comprises the data program component, write the output of the thread program component directly to the second electronic file or table; and
  execute the program according to the computer-generated computer instructions in the second computer language by generating the second electronic file or table.

12. The computer-program product of claim 11, wherein the system instructions are operable to cause the computing system to:
  determine whether the data program component specifies the output key information for partitioning and grouping the output data of the thread program component using the second key;
  when the data program component specifies the information for partitioning and grouping the output of the thread program component using the second key:
    a set key of the DDS is set using the information for partitioning output of the thread program component; and
    data of the DDS is sorted into another DDS for executing the data program on the another DDS; and
  when the data program component does not specify information for partitioning and grouping the output of the thread program component using the second key, a single DDS is created for executing the data program on the single DDS.

13. The computer-program product of claim 1, wherein the system instructions are operable to cause the computing system to determine whether the thread program component or the data program component specifies information for partitioning and grouping by parsing the respective program component for a BY statement.

14. The computer-program product of claim 1, wherein the server is a server configured to perform event stream processing, machine learning, and database query.

15. The computer-program product of claim 14, wherein the server is a SPARK-compatible server; and
wherein the system instructions are operable to cause the computing system to execute the text-based computer instructions by the SPARK-compatible server interpreting or compiling the computer-generated computer instructions in the second computer language.

16. The computer-program product of claim 1, wherein the computer-generated computer instructions in the second computer language are generated in a computer language that can be executed without compiling an entire program before executing any computer instructions, and system instructions are operable to cause the computing system to begin executing the program without pre-compiling all of the computer-generated computer instructions in the second computer language.

17. The computer-program product of claim 16, wherein the computer language is one of JAVA, PYTHON, R or SCALA.

18. The computer-program product of claim 1, wherein the system instructions are operable to cause the computing system to:
  receive a request to execute the program on data stored at another server; and
  generate the computer-generated computer instructions in the second computer language in response to the request.

19. The computer-program product of claim 1, wherein the system instructions are operable to cause the computing system to:
  receive other computer instructions that are directly implemented by the server without generating additional computer-generated computer instructions in the second computer language related to compliance with the server; and
  execute the other computer instructions.

20. The computer-program product of claim 19, wherein the other computer instructions are responsive to a user request or action in a server remote from the computing system.

21. The computer program product of claim 1, wherein the system instructions are operable to cause the computing system to generate the computer-generated computer instructions in the second computer language by:
  generating, responsive to determining that the program comprises the thread program component, a first component of the computer-generated computer instructions in the second computer language;
  determining that the thread program component specifies data key information for partitioning and grouping the stored data using a first key indicated by the data key information; and
  generating, responsive to determining that the thread program component specifies data key information for partitioning and grouping the stored data using a first key indicated by the data key information, a second component of the computer-generated computer instructions in the second computer language,
  wherein the first component and the second component comprise different sets of computer instructions.

22. The computer program product of claim 1,
wherein the system instructions are operable to cause the computing system to further determine whether the program comprises the data program component;
wherein generation, at the server, of the computer-generated computer instructions is further responsive to determining whether the program comprises the data program component; and wherein the selecting from the multiple possible options comprises selecting from a first option of the multiple possible options for when the program comprises the data program component, and a second option of the multiple options for when the program does not comprise the data program component.

23. The computer program product of claim 22,
wherein the system instructions are operable to cause the computing system to further determine the program comprises the data program component;
wherein generation, at the server, of the computer-generated computer instructions is further responsive to determining the program comprises the data program component; and
wherein the selecting from the multiple possible options comprises selecting the first option.

24. The computer program product of claim 22,
wherein the system instructions are operable to cause the computing system to further determine the program does not comprise the data program component;
wherein generation, at the server, of the computer-generated computer instructions is further responsive to determining the program does not comprise the data program component; and
wherein the selecting from the multiple possible options comprises selecting the second option.

25. The computer program product of claim 22,
wherein the selecting from the multiple possible options comprises:
 selecting, based on a format type of the stored data, from a first plurality of options for when the program comprises the data program component, and
 selecting, based on the format type of the stored data, from a second plurality of options for when the program does not comprise the data program component; and
wherein the first plurality of options and the second plurality of options comprise no options in common; and
wherein the format type of the stored data comprises one or more of an electronic file and electronic table.

26. The computer program product of claim 1,
wherein the system instructions are operable to cause the computing system to further determine whether the thread program component of the program specifies the data key information for partitioning and grouping the stored data using the first key indicated by the data key information;
wherein generation, at the server, of the computer-generated computer instructions is further responsive to determining whether the thread program component of the program specifies the data key information; and
wherein the selecting from the multiple possible options comprises selecting from a first option of the multiple possible options for when the thread program component of the program specifies the data key information, and a second option of the multiple options for when the thread program component of the program does not specify the data key information.

27. The computer program product of claim 26,
wherein the system instructions are operable to cause the computing system to further determine the thread program component of the program specifies the data key information for partitioning and grouping the stored data using the first key indicated by the data key information;
wherein generation, at the server, of the computer-generated computer instructions is further responsive to determining the thread program component of the program specifies the data key information; and
wherein the selecting from the multiple possible options comprises selecting the first option.

28. The computer program product of claim 26,
wherein the system instructions are operable to cause the computing system to further determine the thread program component of the program does not specify the data key information for partitioning and grouping the stored data using the first key indicated by the data key information;
wherein generation, at the server, of the computer-generated computer instructions is further responsive to determining the thread program component of the program does not specify the data key information; and
wherein the selecting from the multiple possible options comprises selecting the second option.

29. The computer program product of claim 26,
wherein the selecting from the multiple possible options comprises:
 selecting, based on a format type of the stored data, from a first plurality of options of the multiple possible options for when the thread program component of the program specifies the data key information, and
 selecting, based on a format type of the stored data, from a second plurality of options of the multiple options for when the thread program component of the program does not specify the data key information;
wherein the first plurality of options and the second plurality of options comprise no options in common; and
wherein the format type of the stored data comprises one or more of an electronic file and electronic table.

30. The computer-program product of claim 1, wherein the system instructions are operable to cause the computing system to:
 set a first indicator indicating whether the program comprises the thread program component;
 set a second indicator, different from the first indicator, indicating whether the program comprises the data program component;
 generate, based on checking the first indicator and the second indicator, the computer-generated computer instructions in the second computer language by:
  generating a first component of the computer-generated computer instructions in the second computer language when the first indicator indicates the program comprises the thread program component;
  generating a second component of the computer-generated computer instructions in the second computer language when the second indicator indicates the program comprises the data program component,
  wherein the first component and the second component comprise different sets of computer instructions.

31. The computer-program product of claim 1, wherein the system instructions are operable to cause the computing system to:
 set a first indicator indicating whether the program comprises the thread program component;
 set a second indicator, different from the first indicator, indicating whether the thread program component specifies the information for partitioning and grouping the stored data using the first key; and generate, based on checking the first indicator and the second indicator, the computer-generated computer instructions in the second computer language by:
generating a first component of the computer-generated computer instructions in the second computer language when the first indicator indicates the program comprises the thread program component;
generating a second component of the computer-generated computer instructions in the second computer language when the second indicator indicates the thread program component specifies the information for partitioning and grouping the stored data using the first key; and
wherein the first component and the second component comprise different sets of computer instructions.

32. A computer-implemented method comprising:
receiving, at a server of the computing system, a program, in a first computer language, specifying computer operations on stored data, wherein the computing system is configured to partition the stored data into multiple sets of partitioned data for performing parallel execution of one or more of the computer operations on each of the multiple sets of partitioned data;
determining whether the program comprises a thread program component, wherein thread operations of the thread program component comprise computer instructions for execution in parallel of the one or more of the computer operations on each of the multiple sets of partitioned data;
responsive to determining that the program comprises the thread program component, generating, at the server, computer-generated computer instructions in a second computer language by selecting from multiple possible options, wherein the multiple possible options are for generating computer instructions for executing, in the second computer language that is different than the first computer language, the one or more of the computer operations in parallel, wherein the-selecting from the multiple possible options is dependent on at least two of:
whether the thread program component specifies data key information for partitioning and grouping the stored data using a first key indicated by the data key information;
whether the program comprises a data program component comprising data program instructions for operations capable of execution in parallel on output data that is output from execution of the thread program component; and
whether the data program component specifies output key information for partitioning and grouping the output data of the thread program component using a second key indicated by the output key information; and
executing, by the server, the program according to the computer-generated computer instructions in the second computer language.

33. The computer-implemented method of claim 32,
wherein the receiving the program comprises receiving the program from a client remote from the server and the computing system, the program comprising text-based, user-written computer instructions written by a user of the client;
wherein the executing the program comprises executing the program on the stored data stored in the computing system;
wherein the first computer language is a computer language readable by the client, and the second computer language is a computer language readable by the computing system; and
wherein the method further comprises transmitting a result of executing the program to the client.

34. The computer-implemented method of claim 32,
wherein the method further comprises the computing system:
setting a first indicator indicating whether the program comprises the thread program component;
setting a second indicator indicating whether the program comprises the data program component;
setting a third indicator indicating whether the thread program component specifies the information for partitioning and grouping the stored data using the first key;
setting a fourth indicator indicating whether the data program component specifies the information for partitioning and grouping the output data of the thread program component using the second key; and
wherein the generating the computer-generated computer instructions in the second computer language comprises generating, based on checking the first indicator, the second indicator, the third indicator, and the fourth indicator, the computer-generated computer instructions in the second computer language by:
generating a first component of the computer-generated computer instructions in the second computer language when the first indicator indicates the program comprises the thread program component;
generating a second component of the computer-generated computer instructions in the second computer language when the second indicator indicates the program comprises the data program component;
generating a third component of the computer-generated computer instructions in the second computer language when the third indicator indicates the thread program component specifies the information for partitioning and grouping the stored data using the first key; and
generating a fourth component of the computer-generated computer instructions in the second computer language when the fourth indicator indicates whether the data program component specifies the information for partitioning and grouping the output of the thread program component using the second key; and
wherein the first component, the second component, the third component and the fourth component comprise different sets of computer instructions.

35. The computer-implemented method of claim 32,
wherein the generating the computer-generated computer instructions in the second computer language comprises:
determining whether the thread program component specifies the data key information for partitioning and grouping the stored data using the first key;
responsive to determining that the thread program component specifies the information for partitioning and grouping the stored data using the first key, generating the computer-generated computer instructions in the second computer language to specify a multi-partitioning scheme comprising:
a first partition in which the stored data is partitioned and grouped according to the first key; and a second partition, different from the first partition, in which the stored data is distributed onto computing nodes for performing the execution in parallel of the one or more of the computer operations of the thread program component on each of the multiple sets of partitioned data.

36. The computer-implemented method of claim 32, wherein the generating the computer-generated computer instructions in the second computer language comprises:
   determining whether the program comprises the data program component; and
      responsive to determining that the program comprises the data program component, generating the computer-generated computer instructions in the second computer language to specify:
         partitioning and grouping the output data of the thread program component into multiple sets of partitioned output; and
         distributing the multiple sets of partitioned output on computing nodes for performing parallel execution of the data program instructions of the data program component for each of the multiple sets of partitioned output.

37. The computer-implemented method of claim 32,
   wherein the stored data is stored at the server in an electronic file;
   wherein the generating the computer-generated computer instructions in the second computer language comprises:
      determining whether the thread program component specifies information for partitioning the stored data;
      when the thread program component specifies information for partitioning the stored data, generating the computer-generated computer instructions in the second computer language to extract data from the electronic file into a distributed data set (DDS) set comprising a set key and value, the set key for indexing data of the value, wherein the set key is set using the first key; and
      when the thread program component does not specify information for partitioning the stored data, generating the computer-generated computer instructions in the second computer language to indicate to distribute the data amongst partitions based on load considerations; and
   wherein the executing the program comprises generating the DDS.

38. A computing system comprising processor and memory, the memory containing instructions executable by the processor wherein the computing system is configured to:
   receive, at a server of the computing system, a program, in a first computer language, specifying computer operations on stored data, wherein the computing system is configured to partition the stored data into multiple sets of partitioned data for performing parallel execution of one or more of the computer operations on each of the multiple sets of partitioned data;
   determine whether the program comprises a thread program component, wherein thread operations of the thread program component comprise computer instructions for execution in parallel of the one or more of the computer operations on each of the multiple sets of partitioned data;
   responsive to determining that the program comprises the thread program component, generate, at the server, computer-generated computer instructions in a second computer language by selecting from multiple possible options, wherein the multiple possible options are for generating computer instructions for executing, in the second computer language that is different than the first computer language, the one or more of the computer operations in parallel, wherein the selecting from the multiple options is dependent on at least two of:
      whether the thread program component specifies data key information for partitioning and grouping the stored data using a first key indicated by the data key information;
      whether the program comprises a data program component comprising data program instructions for operations capable of execution in parallel on output data that is output from execution of the thread program component; and
      whether the data program component specifies output key information for partitioning and grouping the output data of the thread program component using a second key indicated by the output key information; and
   execute, by the server, the program according to the computer-generated computer instructions in the second computer language.

* * * * *